(12) United States Patent
Kozuma

(10) Patent No.: US 10,390,075 B2
(45) Date of Patent: Aug. 20, 2019

(54) SEMICONDUCTOR DEVICE, BROADCASTING SYSTEM, AND ELECTRONIC DEVICE

(71) Applicant: Semiconductor Energy Laboratory Co., Ltd., Atsugi-shi, Kanagawa-ken (JP)

(72) Inventor: Munehiro Kozuma, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/729,191

(22) Filed: Oct. 10, 2017

(65) Prior Publication Data

US 2018/0109835 A1    Apr. 19, 2018

(30) Foreign Application Priority Data

Oct. 14, 2016 (JP) .................................. 2016-202597

(51) Int. Cl.
*H04N 19/42* (2014.01)
*H04N 19/44* (2014.01)
(Continued)

(52) U.S. Cl.
CPC ..... *H04N 21/42607* (2013.01); *G09G 3/2092* (2013.01); *H04N 19/42* (2014.11);
(Continued)

(58) Field of Classification Search
CPC ....... H04N 21/42607; H04N 21/42615; H04N 21/42623; H04N 21/4263;
(Continued)

(56) References Cited

U.S. PATENT DOCUMENTS 7,126,989 B2    10/2006    Hagai et al.
7,583,731 B2    9/2009    Hagai et al.
(Continued)

FOREIGN PATENT DOCUMENTS

CN    102057575 A    5/2011
JP    2002-009613    *    6/2000
(Continued)

OTHER PUBLICATIONS

International Search Report (Application No. PCT/IB2017/056058) dated Nov. 28, 2017.
(Continued)

*Primary Examiner* — Patrick C Chen
(74) *Attorney, Agent, or Firm* — Fish & Richardson P.C.

(57) ABSTRACT

A semiconductor device that is suitable for high-speed operation is provided. The semiconductor device includes a decoder. The decoder includes a first circuit. The first circuit is configured to operate in synchronization with a clock signal. The first circuit is configured to perform image processing. A circuit configuration of the first circuit can be changed. Clock gating is performed on the first circuit to prevent the clock signal from being input to the first circuit when the circuit configuration of the first circuit is being changed. A broadcasting system including the semiconductor device is also provided.

10 Claims, 26 Drawing Sheets

(51) Int. Cl.
*H04N 21/44* (2011.01)
*H04N 21/426* (2011.01)
*G09G 3/20* (2006.01)
*H04N 19/80* (2014.01)

(52) U.S. Cl.
CPC ....... *H04N 19/44* (2014.11); *H04N 21/42692* (2013.01); *H04N 21/44* (2013.01); *G09G 2300/0857* (2013.01); *G09G 2310/08* (2013.01); *G09G 2360/12* (2013.01); *H04N 19/80* (2014.11)

(58) Field of Classification Search
CPC ............. H04N 21/42638; H04N 19/42; H04N 19/423; H04N 19/426; H04N 19/427; H04N 19/428; H04N 19/44; H04N 19/45; H04N 21/44; H04N 21/44004; H04N 21/44008; H04N 21/44012; H04N 21/44016; H04N 21/4402
USPC ........................................................ 327/407
See application file for complete search history.

(56) References Cited

U.S. PATENT DOCUMENTS

| | | | |
|---|---|---|---|
| 8,207,756 B2 | 6/2012 | Shionoiri et al. | |
| 8,542,034 B2 | 9/2013 | Kato | |
| 8,547,753 B2 | 10/2013 | Takemura et al. | |
| 8,952,722 B2 | 2/2015 | Ikeda et al. | |
| 8,952,723 B2 | 2/2015 | Aoki et al. | |
| 8,970,251 B2 | 3/2015 | Kurokawa | |
| 8,970,253 B2 | 3/2015 | Kurokawa | |
| 9,385,720 B2 | 7/2016 | Okamoto et al. | |
| 9,509,314 B2 | 11/2016 | Kurokawa | |
| 9,722,615 B2 | 8/2017 | Kurokawa | |
| 2011/0101351 A1 | 5/2011 | Yamazaki | |
| 2011/0216247 A1* | 9/2011 | Nishida | H03K 19/17756 348/725 |
| 2012/0293200 A1 | 11/2012 | Takemura | |
| 2013/0147518 A1 | 6/2013 | Shionoiri et al. | |
| 2013/0314124 A1 | 11/2013 | Ikeda et al. | |
| 2013/0321025 A1 | 12/2013 | Kurokawa et al. | |
| 2014/0159771 A1 | 6/2014 | Ikeda et al. | |
| 2014/0176185 A1 | 6/2014 | Kurokawa | |
| 2015/0008958 A1 | 1/2015 | Kurokawa | |
| 2015/0263735 A1 | 9/2015 | Kurokawa | |

FOREIGN PATENT DOCUMENTS

| | | |
|---|---|---|
| JP | 2002-009613 A | 1/2002 |
| JP | 2003-179933 A | 6/2003 |
| JP | 2006-163531 A | 6/2006 |
| JP | 2009-147539 A | 7/2009 |
| JP | 2010-166255 A | 7/2010 |
| JP | 2014-068132 A | 4/2014 |
| JP | 2015-188211 A | 10/2015 |
| WO | WO-2009/147849 | 12/2009 |

OTHER PUBLICATIONS

Written Opinion (Application No. PCT/IB2017/056058) dated Nov. 28, 2017.
Kawashima.S et al., "13.3-in. 8K×4K 664-ppi OLED Display Using CAAC-OS FETs", SID Digest '14 : SID International Symposium Digest of Technical Papers, Jun. 3, 2014, pp. 627-630.
Waidyasooriya.H et al., "Implementation of a Partially Reconfigurable Multi-Context FPGA Based on Asynchronous Architecture", IEICE Trans. Electron. (IEICE Transactions on Electronics), Apr. 1, 2009, vol. E92-C, No. 4, pp. 539-549

\* cited by examiner

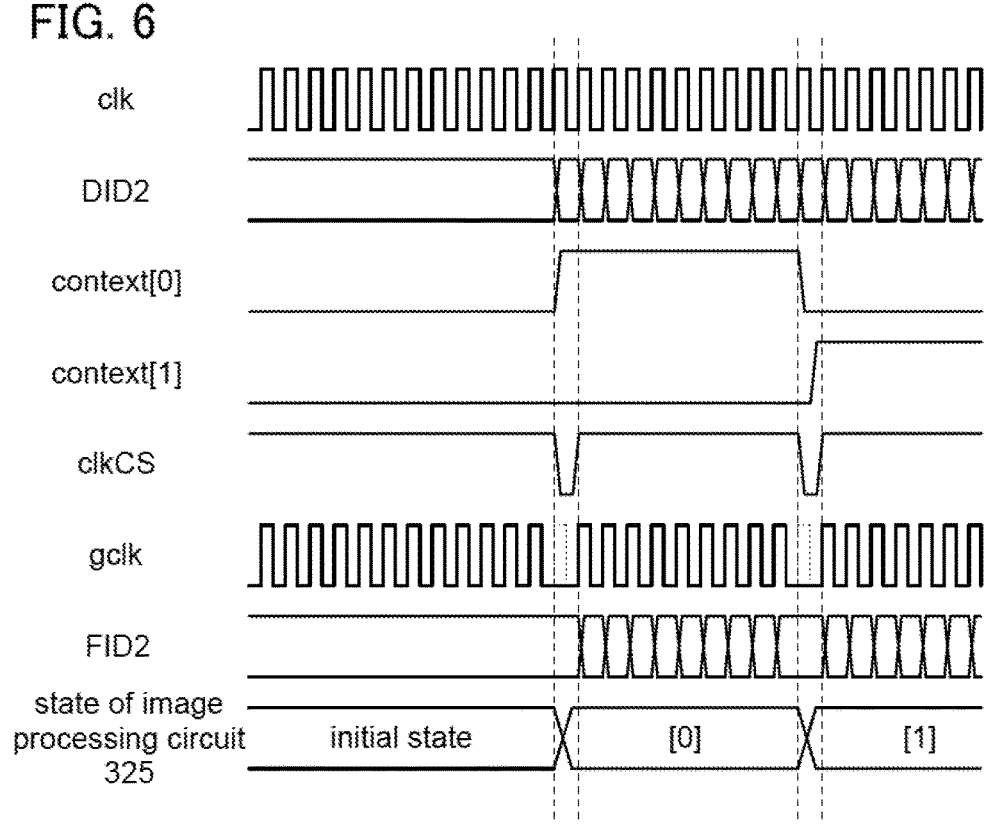

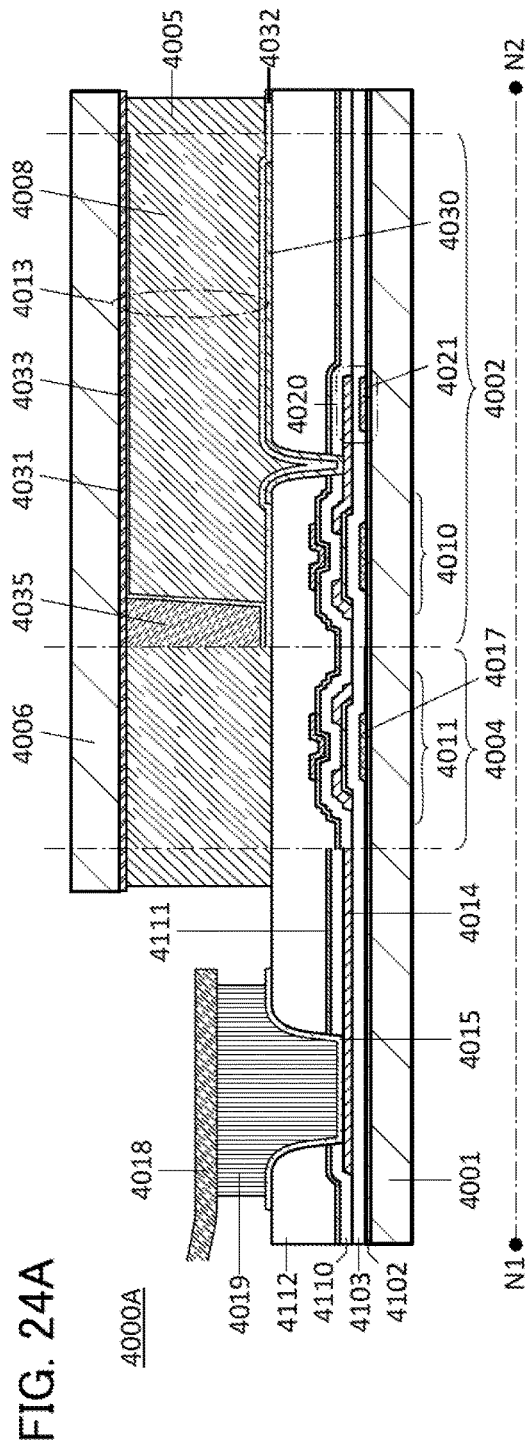
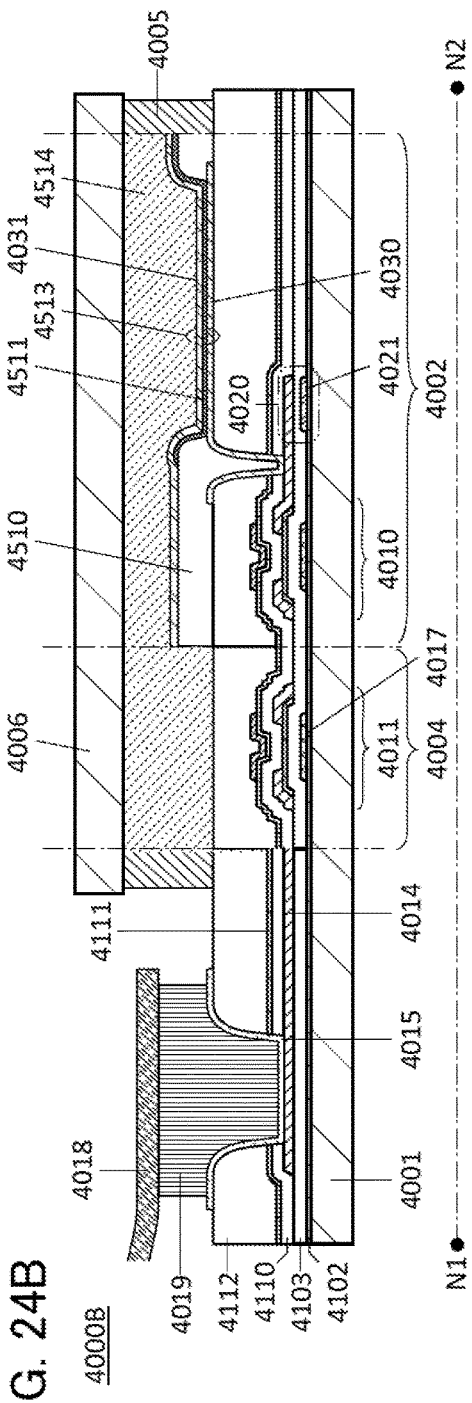
FIG. 24A
FIG. 24B

SEMICONDUCTOR DEVICE, BROADCASTING SYSTEM, AND ELECTRONIC DEVICE

TECHNICAL FIELD

One embodiment of the present invention relates to a semiconductor device, a broadcasting system, and an electronic device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specific examples of the technical field of one embodiment of the present invention disclosed in this specification and the like include a semiconductor device, a display device, a liquid crystal display device, a light-emitting device, a lighting device, a power storage device, a memory device, an imaging device, a method for driving any of them, and a method for manufacturing any of them.

In this specification and the like, a semiconductor device generally means a device that can function by utilizing semiconductor characteristics. A transistor and a semiconductor circuit are embodiments of semiconductor devices. In some cases, a memory device, a display device, an imaging device, or an electronic device includes a semiconductor device.

BACKGROUND ART

As a screen of a television (TV) becomes larger, a demand for the option to watch high-definition images has been created. For this reason, ultra-high definition TV (UHDTV) broadcast has been increasingly put into practical use. Japan started 4K broadcast services utilizing a communication satellite (CS) and an optical line in 2015. The test broadcast of UHDTV (4K and 8K) by a broadcast satellite (BS) will start in the future. Therefore, various electronic devices which are compatible with 8K broadcast have been developed (e.g., Non-Patent Document 1). In practical 8K broadcasts, 4K broadcasts and 2K broadcasts (full-high vision broadcast) will be also employed.

The 8K broadcast and the like require high-definition image data to be processed, which increases the amount of image data and definitely needs encoding and decoding of image data. Inter-frame prediction generates prediction image data to encode and decode a difference between input image data and the prediction image data, leading to a high compression efficiency. The input image data that has been decoded can be subjected to image processing by an image processing circuit. When a plurality of image processing circuits are provided and selected by a switch for use, different image processing can be performed in accordance with the circumstances, e.g., the image quality required for an image to be displayed (Patent Document 1).

REFERENCE

Patent Document

[Patent Document 1] Japanese Published Patent Application No. 2003-179933

Non-Patent Document

[Non-Patent Document 1] S. Kawashima, et al., "13.3-In. 8K×4K 664-ppi OLED Display Using CAAC-OS FETs," SID 2014 DIGEST, pp. 627-630

DISCLOSURE OF INVENTION

With an increase in the amount of image data processed by an image processing circuit in the 8K broadcast and the like, the image processing circuit needs to operate at a high speed, i.e., the clock frequency increases. In that case, the switching of the image processing circuit might not be completed in one clock period, which might cause wrong image processing by the image processing circuit.

An object of one embodiment of the present invention is to provide a semiconductor device that can change the configuration of an image processing circuit with no failure even when the clock frequency increases. Another object of one embodiment of the present invention is to provide a semiconductor device that is suitable for high-speed operation. Another object of one embodiment of the present invention is to provide a highly reliable semiconductor device. Another object of one embodiment of the present invention is to provide a semiconductor device with reduced power consumption. Another object of one embodiment of the present invention is to provide a novel semiconductor device, a novel electronic device, and the like.

Note that the objects of one embodiment of the present invention are not limited to the above objects. The objects described above do not preclude the existence of other objects. The other objects are the ones that are not described above and will be described below. The other objects will be apparent from and can be derived from the description of the specification, the drawings, and the like by those skilled in the art. One embodiment of the present invention solves at least one of the above objects and the other objects.

One embodiment of the present invention is a semiconductor device including a decoder. The decoder includes a first circuit. The first circuit is configured to operate in synchronization with a clock signal. The first circuit is configured to perform image processing. A circuit configuration of the first circuit can be changed. Clock gating is performed on the first circuit to prevent the clock signal from being input to the first circuit when the circuit configuration of the first circuit is being changed.

The above embodiment may have a structure in which the decoder includes a second circuit and a third circuit, the second circuit is configured to output a clock signal to the first circuit, the second circuit is configured to perform clock gating, the third circuit is configured to output a first signal to the first circuit, and the first circuit has a circuit configuration corresponding to a logic of the first signal.

The above embodiment may have a structure in which the decoder includes a configuration memory, the configuration memory is configured to retain configuration data, the configuration memory is configured to generate a second signal corresponding to the configuration data, and the second circuit performs clock gating for the number of clocks that is determined on the basis of a logic of the second signal.

The above embodiment may have a structure in which the decoder includes first to m-th (m is a natural number) configuration memories, the first to m-th configuration memories are configured to generate first to m-th output signals corresponding to configuration data retained in their respective configuration memories, the second circuit is configured to generate binary integer data on the basis of logics of the first to m-th output signals, and the second circuit performs clock gating for an integer number of clocks.

The above embodiment may have a structure in which the first circuit includes a programmable logic element, and the programmable logic element includes a flip-flop circuit.

Another embodiment of the present invention is a broadcasting system including the semiconductor device of one embodiment of the present invention and a display device. The semiconductor device is configured to receive a broadcasting signal and generate image data on the basis of the broadcasting signal. The display device is configured to display an image corresponding to the image data.

Another embodiment of the present invention is an electronic device including the semiconductor device of one embodiment of the present invention and a display portion.

One embodiment of the present invention can provide a semiconductor device that can change the configuration of an image processing circuit with no failure even when the clock frequency increases. Another embodiment of the present invention is to provide a semiconductor device that is suitable for high-speed operation. Another embodiment of the present invention is to provide a highly reliable semiconductor device. Another embodiment of the present invention is to provide a semiconductor device with reduced power consumption. Another embodiment of the present invention is to provide a novel semiconductor device, a novel electronic device, and the like.

Note that the effects of one embodiment of the present invention are not limited to the above effects. The effects described above do not preclude the existence of other effects. The other effects are the ones that are not described above and will be described below. The other effects will be apparent from and can be derived from the description of the specification, the drawings, and the like by those skilled in the art. One embodiment of the present invention has at least one of the above effects and the other effects. Therefore, one embodiment of the present invention does not have the effects described above in some cases.

BRIEF DESCRIPTION OF DRAWINGS

FIG. 6 is a timing chart showing an operation example of a decoder.

FIGS. 24A and 24B are cross-sectional views illustrating structure examples of a display panel.

BEST MODE FOR CARRYING OUT THE INVENTION

Figure 1:
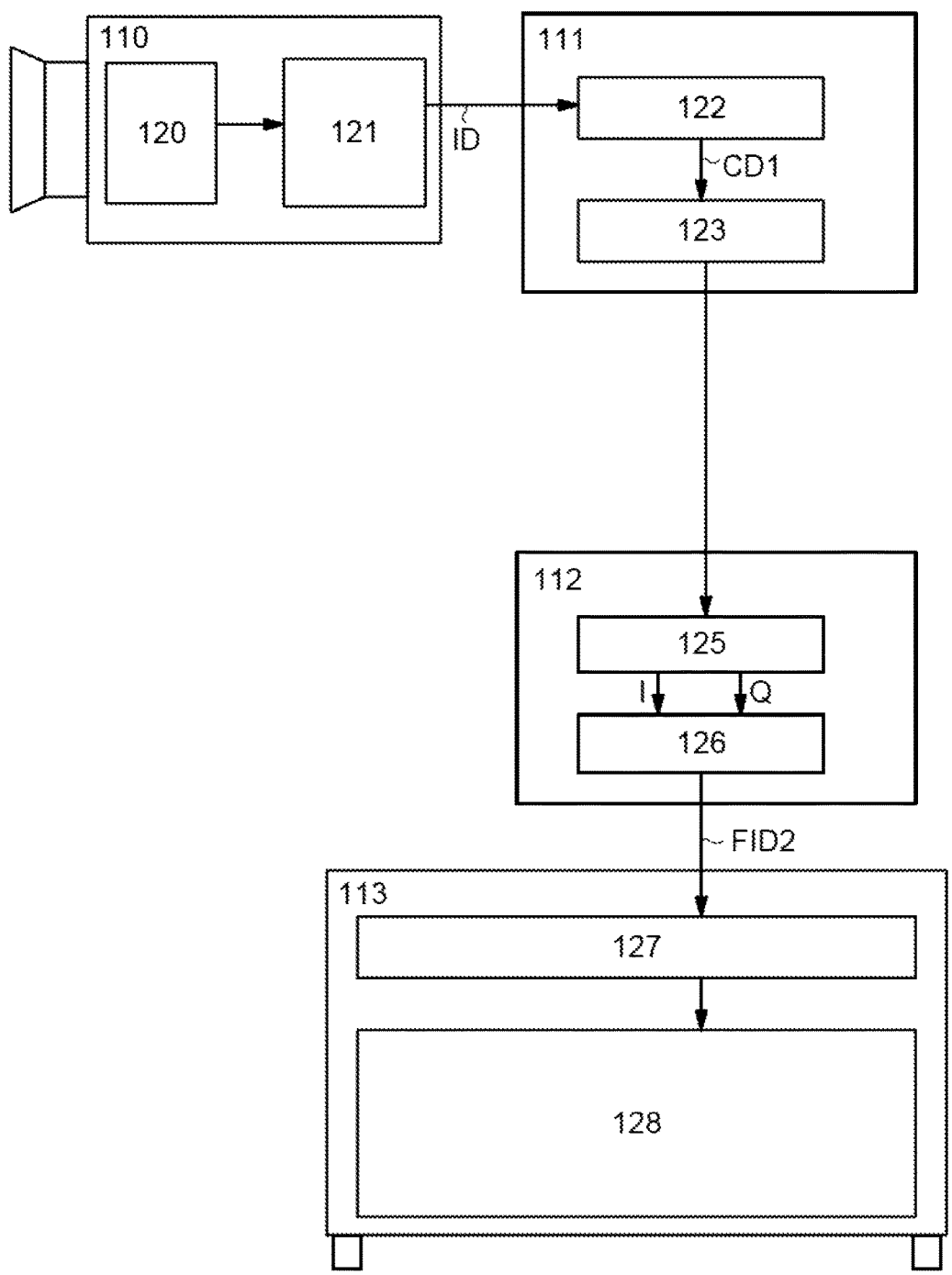
FIG. 1 is a block diagram illustrating a configuration example of a broadcasting system.

Embodiments will be described in detail with reference to the drawings. Note that the present invention is not limited to the following description, and it will be readily appreciated by those skilled in the art that modes and details can be modified in various ways without departing from the spirit and scope of the present invention. Therefore, the present invention should not be interpreted as being limited to the description of the embodiments below. Note that in structures of the present invention described below, the same portions or portions having similar functions are denoted by the same reference numerals in different drawings, and description thereof is not repeated in some cases. In some cases, the same components are denoted by different hatching patterns in different drawings, or the hatching patterns are omitted.

In this specification and the like, a transistor is an element having at least three terminals of a gate, a drain, and a source. The transistor has a channel region between a drain (a drain terminal, a drain region, or a drain electrode) and a source (a source terminal, a source region, or a source electrode), and current can flow through the drain, the channel region, and the source.

Here, since the source and the drain are interchangeable depending on a structure, operating conditions, or the like of the transistor, it is difficult to define which is a source or a drain. Thus, the terms "source" and "drain" can be interchanged with each other depending on the situation or circumstances.

In this specification and the like, an explicit description "X and Y are connected" means that X and Y are electrically connected, X and Y are functionally connected, and X and Y are directly connected. Accordingly, without being limited to a predetermined connection relation, for example, a connection relation shown in drawings or texts, another connection relation is regarded as being included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows electrical connection between X and Y (e.g., a switch, a transistor, a capacitor, an inductor, a resistor, a diode, a display element, a light-emitting element, or a load) is not connected between X and Y, and the case where X and Y are connected without an element that allows electrical connection between X and Y provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. Note that a switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generator circuit; a memory circuit; and/or a control circuit) can be connected between X and Y. For instance, even if another circuit is provided between X and Y, X and Y are functionally connected when a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., X and Y are connected with another element or circuit provided therebetween), X and Y are functionally connected (i.e., X and Y are functionally connected with another element or circuit provided therebetween), and X and Y are directly connected (i.e., X and Y are connected without another element or circuit provided therebetween). That is, in this specification and the like, the term "electrically connected" is substantially the same as the term "connected."

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include "X, Y, and a source (or a first terminal or the like) and a drain (or a second terminal or the like) of a transistor are electrically connected to each other, and X, the source (or the first terminal or the like) of the transistor, the drain (or the second terminal or the like) of the transistor, and Y are electrically connected in this order," "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected in this order," and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order." When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path," and "a source (or a first terminal or the like) of a transistor is electrically connected to X through Z1 at least with a first connection path, the first connection path does not include a second connection path, the second connection path includes a connection path through the transistor, a drain (or a second terminal or the like) of the transistor is electrically connected to Y through Z2 at least with a third connection path, and the third connection path does not include the second connection path." Still another example of the expression is "a source (or a first terminal or the like) of a transistor is electrically connected to X through Z1 on at least a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through Z2 on at least a third electrical path, the third electrical path does not include a fourth electrical path, and the fourth electrical path is an electrical path from the drain (or the second terminal or the like) of the transistor to the source (or the first terminal or the like) of the transistor." When the connection path in a circuit configuration is defined by an expression similar to the above examples, a source (or a first terminal or the like) and a drain (or a second terminal or the like) of a transistor can be distinguished from each other to specify the technical scope.

Note that the above expressions are examples and there is no limitation on the expressions. Here, X, Y, Z1, and Z2 each denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring functions as an electrode, one conductive film functions as the wiring and the electrode. Thus, "electrical connection" in this specification includes, in its category, such a case where one conductive film has functions of a plurality of components.

Note that in general, a potential (voltage) is a relative value and its level depends on the difference from a reference potential. Therefore, a ground potential, GND, or the like is not necessarily 0 V. For example, a ground potential or GND may be defined using the lowest potential or a substantially intermediate potential in a circuit as a reference. In those cases, a positive potential and a negative potential are set using the potential as a reference.

Embodiment 1

In this embodiment, a broadcasting system of one embodiment of the present invention and a driving method and the like of the broadcasting system will be described with reference to FIG. 1 to FIG. 17B.

One embodiment of the present invention relates to a broadcasting system including an imaging device, a transmitter, a receiver, and a display device. The transmitter includes an encoder that has a function of encoding image data generated in the imaging device. The receiver includes a decoder that has a function of decoding the image data encoded in the transmitter. The display device has a function of performing display on the basis of the image data decoded in the decoder.

The encoder and the decoder are provided with image processing circuits that have a function of processing images. In the broadcasting system of one embodiment of the present invention, a programmable logic element (PLE) is provided in the image processing circuit so that a circuit configuration can be changed. This allows changing of the type of image processing to be executed, the level of image processing, and the like. For example, in the case where filtering processing is performed as the image processing, the strength of the filter can be changed. In one embodiment of the present invention, clock gating prevents a clock signal from being input to the PLE or the like when the circuit configuration of the image processing circuit is being changed. As a result, malfunction during the changing of the configuration of the image processing circuit can be prevented even when the clock frequency increases. That is, both the operating speed and the reliability of a semiconductor device can be improved in the broadcasting system of one embodiment of the present invention.

<Broadcasting System>

FIG. 1 is a block diagram schematically illustrating a configuration example of a broadcasting system. A broadcasting system 100 includes an imaging device 110, a transmitter 111, a receiver 112, and a display device 113. Note that various devices included in the broadcasting system 100, such as the imaging device 110, the transmitter 111, the receiver 112, and the display device 113, can be referred to as semiconductor devices.

The imaging device 110 includes an image sensor 120 and an image processing circuit 121. The transmitter 111 includes an encoder 122 and a modulator 123. The receiver 112 includes a demodulator 125 and a decoder 126. The display device 113 includes an image processing circuit 127 and a display portion 128.

When the imaging device 110 is capable of capturing 8K video, the image sensor 120 has an adequate number of pixels for capturing a color image in 8K resolution. For example, when one pixel is made up of one red (R) subpixel, one green (G) subpixel, and one blue (B) subpixel, the image sensor 120 needs at least 7680×4320×3 [R, G, B] subpixels; when the imaging device 110 is a device for capturing 4K images, the image sensor 120 needs at least 3840×2160×3 subpixels; when the imaging device 110 is a device for capturing 2K images, the image sensor 120 needs at least 1920×1080×3 subpixels.

The image sensor 120 has a function of generating imaging data. The image processing circuit 121 has a function of performing image processing (such as noise rejection or interpolation processing) on the imaging data to generate image data ID. The image data ID can be output to the transmitter 111.

The transmitter 111 has a function of processing the image data ID to generate a broadcasting signal (a carrier wave) that is compliant with a broadcast band. The encoder 122 has a function of encoding the image data ID to generate encoded data CD1. Examples of the encoding processing include orthogonal conversion such as discrete cosine transform (DCT) and discrete sine transform (DST), intra-frame prediction, and motion-compensated prediction. The encoder 122 may also have a function of performing processing such as addition of data for broadcasting control (e.g., authentication data) to the image data ID, encryption, and scrambling (data rearrangement for spread spectrum).

The modulator 123 has a function of generating and outputting a broadcasting signal by performing IQ modulation (orthogonal amplitude modulation) on the encoded data CD1. The broadcasting signal is a composite signal that has an I (identical phase) component and a Q (quadrature phase) component. A TV broadcasting station is tasked with obtaining the image data ID, supplying the broadcasting signal, and the like.

The receiver 112 can receive the broadcasting signal output from the modulator 123. The receiver 112 has a function of converting the received broadcasting signal into image data FID2 that can be displayed on the display device 113. The demodulator 125 has functions of demodulating the received broadcasting signal, and decomposing the broadcasting signal to two analog signals, i.e., an I signal and a Q signal.

The decoder 126 has a function of converting the I signal and the Q signal into digital signals. The decoder 126 has a function of decoding the digital signals to generate image data FID2. Examples of the decoding processing include, like the encoding processing, orthogonal conversion such as DCT and DST, intra-frame prediction, and motion-compensated prediction. The decoder 126 may also have a function of performing various processing on the digital signals converted from the I signal and the Q signal. Examples of the processing include frame separation, low density parity check (LDPC) decoding, separation of broadcast control data, and descrambling.

The image data FID2 can be input to the image processing circuit 127 in the display device 113. The image processing circuit 127 has a function of processing the image data FID2 to generate a data signal that can be input to the display portion 128. Examples of the processing by the image processing circuit 127 include image processing (gamma processing) and digital-analog conversion processing. The display portion 128 that has received a data signal can display an image corresponding to the data signal.

Figure 2:
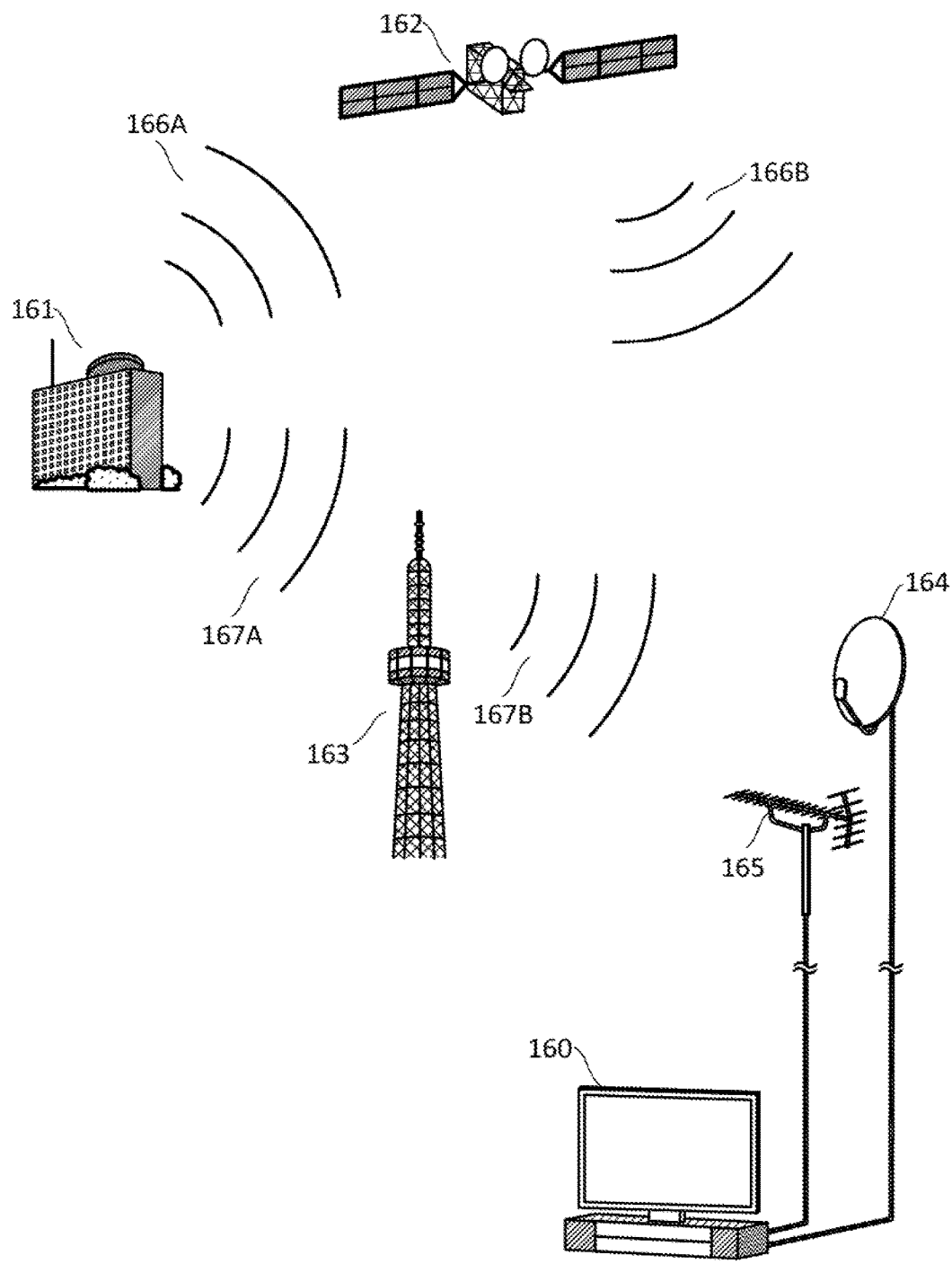
FIG. 2 is a schematic view illustrating data transmission in a broadcasting system.

FIG. 2 schematically illustrates data transmission in the broadcasting system. FIG. 2 illustrates paths that radio waves (broadcasting signals) transmitted from a broadcasting station 161 take to television receivers (TV) 160 in each household. The TV 160 is equipped with the receiver 112 and the display device 113. Examples of an artificial satellite 162 include a communication satellite (CS) and a broadcasting satellite (BS). Examples of an antenna 164 include a BS/110° CS antenna and a CS antenna. Examples of an antenna 165 include an ultra-high frequency (UHF) antenna.

Radio waves 166A and 166B are broadcasting signals for satellite broadcasting. When the artificial satellite 162 receives the radio wave 166A, the artificial satellite 162 transmits the radio wave 166B to the ground. The radio wave 166B is received by the antenna 164 in each household, which enables the viewing of satellite TV broadcasting on the TV 160.

Alternatively, the radio wave 166B is received by an antenna of another broadcasting station, where a receiver processes the radio wave 166B into a signal that can be transmitted to an optical cable. The broadcasting station then sends the broadcasting signal to the TV 160 in each household using an optical cable network. Radio waves 167A and 167B are broadcasting signals for terrestrial broadcasting. A radio tower 163 amplifies the received radio wave 167A, and transmits the radio wave 167B. Each household can view terrestrial TV broadcasting on the TV 160 by receiving the radio wave 167B with the antenna 165.

The broadcasting system according to this embodiment is not limited to a system for TV broadcasting. In addition, the image data to be distributed may be either moving image data or still image data.

<Encoder>

Figure 3A:
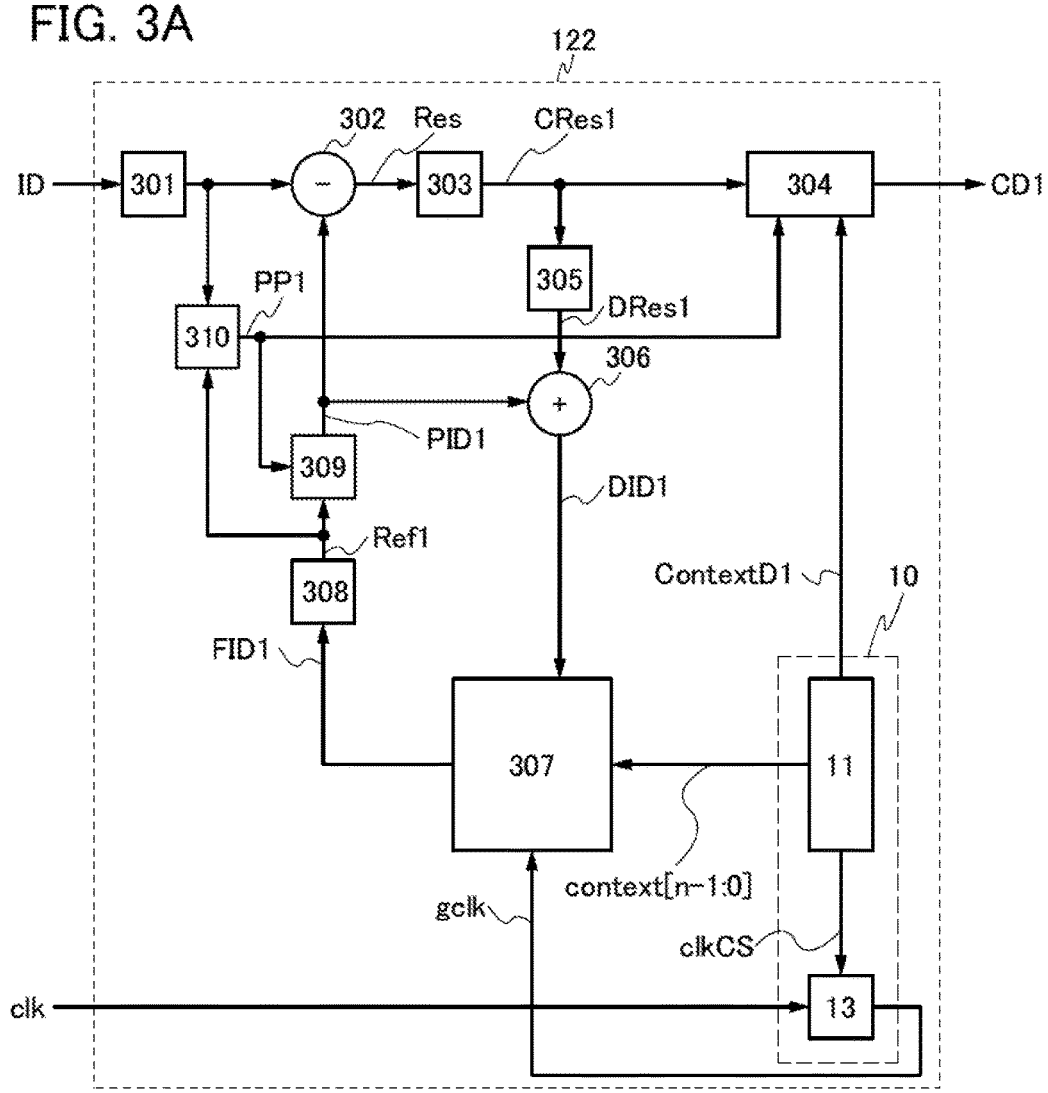
FIGS. 3A and 3B are block diagrams illustrating a configuration example of an encoder.

FIG. 3A is a block diagram illustrating a configuration example of the encoder 122. The encoder 122 includes a data memory 301, a subtractor 302, an image encoding circuit 303, a variable-length encoding circuit 304, an image decoding circuit 305, an adder 306, an image processing circuit 307, a frame memory 308, an inter-frame prediction circuit 309, a prediction parameter generation circuit 310, and a controller 10. The controller 10 includes a context signal generation circuit 11 and a clock signal generation circuit 13.

The data memory 301 has a function of retaining the image data ID. The image data ID retained in the data memory 301 can be output to the subtractor 302 and the prediction parameter generation circuit 310 in accordance with the operation timing of the encoder 122.

The subtractor 302 has a function of subtracting prediction image data PID1, which is generated by the inter-frame prediction circuit 309 described later, from the image data ID, thereby generating differential image data Res.

The image encoding circuit 303 has a function of performing DCT, DST, or the like on the differential image data Res to encode the differential image data Res, thereby generating encoded differential image data CRes1.

The variable-length encoding circuit 304 has a function of variable-length encoding the encoded differential image data CRes1 and a prediction parameter PP1 described later into codes. The variable-length encoding circuit 304 also has a function of adding context data ContextD1 described later to the header or the like of the variable-length encoded data to generate the encoded data CD1. The encoded data CD1 can be output from the encoder 122.

The image decoding circuit 305 has a function of decoding the encoded differential image data CRes1 by DCT, DST, or the like, thereby generating decoded differential image data DRes1.

The adder 306 has a function of adding the decoded differential image data DRes1 and the prediction image data PID1 generated by the inter-frame prediction circuit 309 described later, thereby generating decoded image data DID1.

The image processing circuit 307 has a function of performing image processing, such as gamma correction or noise rejection, on the decoded image data DID1 to generate image data FID1, which is corrected image data. The image processing circuit 307 includes a PLE to change the circuit configuration as will be described in detail. In other words, the image processing circuit 307 serves as a programmable logic circuit, which allows changing of the type of image processing to be executed, the level of image processing, and the like. For example, in the case where filtering processing is performed as the image processing, the strength of the filter can be changed.

Figure 3B:
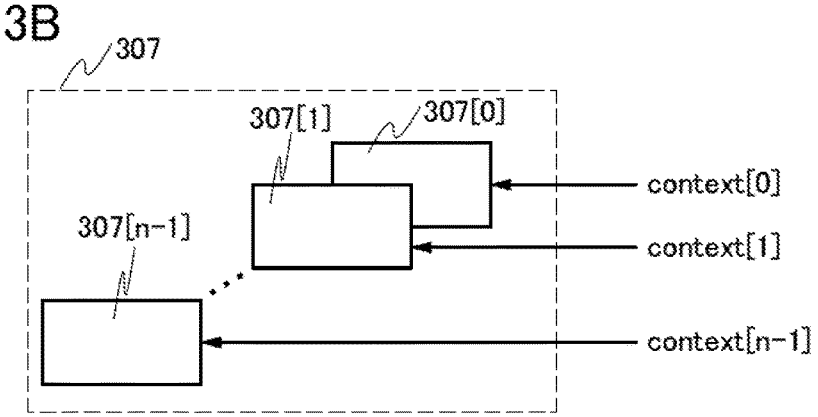

The context signal generation circuit 11 has functions of generating a context signal context that determines the circuit configuration of the image processing circuit 307 and outputting the context signal context to the image processing circuit 307. The context signal context can be, for example, an n-bit (n is an integer of 2 or more) signal. When the context signal context is an n-bit signal, the circuit configuration of the image processing circuit 307 can be selected from, for example, n types of circuit configurations of image processing circuits 307[0] to 307[n−1] as illustrated in FIG. 3B, which correspond to the logics of the context signals context. In that case, among the n-bit context signals context, for example, one-bit context signal context can be active whereas the other context signals context can be inactive. This enables the image processing circuit 307 to have a circuit configuration corresponding to the active context signal context. For example, in the case where a context signal context[t] (t is an integer greater than or equal to 0 and less than or equal to n−1) is active and the other context signals context are inactive, the image processing circuit 307 can have a configuration of an image processing circuit 307[t].

In this specification and the like, an active signal means that, for example, the signal has a high potential. In contrast, an inactive signal means that, for example, the signal has a low potential. The logic of the signal may be inverted.

When the same reference numerals used in this specification and the like need to be distinguished from one another, symbols for identification such as [0], [1], and [n] are added to the reference numerals in some cases. For example, symbols such as [0], [1], and [n−1] are used to distinguish a plurality of signals context from one another. Also in this specification and the like, symbols such as [0], [1], and [n−1] are sometimes added to the image processing circuit 307 to distinguish the n types of circuit configurations from one another.

In this specification and the like, changing of the logic of the context signal context is referred to as context switching in some cases. The following can be referred to as context switching, for example: the state where the context signal context[0] is active and the other context signals context are inactive is changed to the state where the context signal context[1] is active and the other context signals context are inactive.

The context signal generation circuit 11 has functions of generating context data ContextD1 and outputting the context data ContextD1 to the variable-length encoding circuit 304. The context data ContextD1 includes, for example, information on the active context signal context. Note that in the case where the context signal context is an n-bit signal, the context data ContextD1 can be $\log_2(n)$-bit data.

The context signal generation circuit 11 has functions of generating a clock control signal clkCS and outputting the clock control signal clkCS to the clock signal generation circuit 13.

The clock signal generation circuit 13 has a function of generating a clock signal gclk from a clock signal clk. The clock signal gclk can be output to the image processing circuit 307. The clock signal generation circuit 13 can output the clock signal gclk, which has a logic corresponding to that of the clock signal clk, to the image processing circuit 307 in the case where the clock control signal clkCS is active. In contrast, in the case where, for example, the clock control signal clkCS is inactive, the output of the clock signal gclk to the image processing circuit 307 can be stopped, namely, clock gating can be performed.

The frame memory 308 has a function of retaining the image data FID1. The frame memory 308 has a function of retaining the image data FID1 for one frame or two or more frames. The frame memory 308 also has a function of outputting the retained image data FID1 as reference image data Ref1 to the inter-frame prediction circuit 309 and the prediction parameter generation circuit 310.

The inter-frame prediction circuit 309 has a function of generating the prediction image data PID1 on the basis of the reference image data Ref1 and a prediction parameter PPI described later. As described above, the prediction image data PID1 can be output to the subtractor 302 and the adder 306.

The prediction parameter generation circuit 310 has a function of generating the prediction parameter PPI on the basis of the image data ID output from the data memory 301 and the reference image data Ref1 output from the frame memory 308. For example, the image data ID is compared with the reference image data Ref1, which is image data of the previous frame, and a motion vector is detected on the basis of the difference between these data. The motion vector can be used as the prediction parameter PPI. Note that as described above, the prediction parameter PPI can be output to the variable-length encoding circuit 304 and the inter-frame prediction circuit 309.

As described above, the prediction image data PID1 can be generated on the basis of the prediction parameter PPI and the reference image data Ref1, which is image data of a frame previous to the frame of the image data ID. That is, the inter-frame prediction circuit 309 can predict the image data ID on the basis of the reference image data Ref1 and the prediction parameter PPI, and generate the prediction image data PID1 from the predicted image data.

In the encoder 122 illustrated in FIG. 3A, differential image data Res that is a difference between the image data ID and the prediction image data PID1 is encoded in the image encoding circuit 303. This increases the encoding efficiency as compared with the case where the image data ID is directly encoded.

<Decoder>

Figure 4:
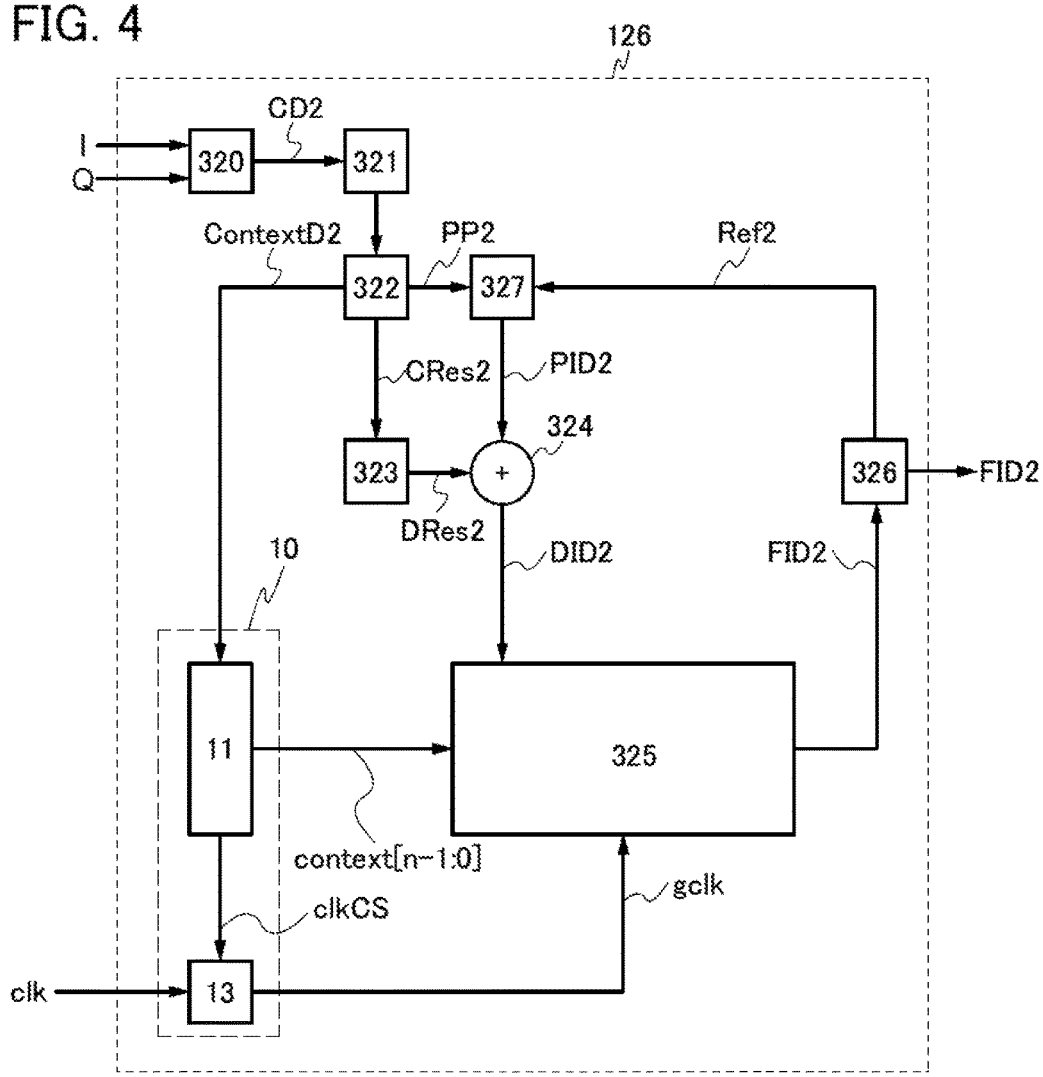
FIG. 4 is a block diagram illustrating a configuration example of a decoder.

FIG. 4 is a block diagram illustrating a configuration example of the decoder 126. The decoder 126 includes an analog to digital (A/D) converter circuit 320, a data memory 321, a variable-length decoding circuit 322, an image decoding circuit 323, an adder 324, an image processing circuit 325, a frame memory 326, an inter-frame prediction circuit 327, and the controller 10. As in the encoder 122, the controller 10 includes the context signal generation circuit 11 and the clock signal generation circuit 13.

The A/D converter circuit 320 has a function of converting the I signal and the Q signal, which are analog signals received from the demodulator 125 illustrated in FIG. 1, into digital signals. Note that the digital signals are referred to as encoded data CD2.

The data memory 321 has a function of retaining the encoded data CD2. The encoded data CD2 retained in the data memory 321 can be output to the variable-length decoding circuit 322 in accordance with the operation timing of the decoder 126.

The variable-length decoding circuit 322 has a function of decoding the encoded data CD2. As a result, encoded differential image data CRes2, a prediction parameter PP2, and context data ContextD2 are generated. The encoded differential image data CRes2 corresponds to the encoded differential image data CRes1 illustrated in FIG. 3A, the prediction parameter PP2 corresponds to the prediction parameter PPI illustrated in FIG. 3A, and the context data ContextD2 corresponds to the context data ContextD1 illustrated in FIG. 3A.

The image decoding circuit 323 has a function of decoding the encoded differential image data CRes2 to generate decoded differential image data DRes2.

The adder 324 has a function of adding the decoded differential image data DRes2 and prediction image data PID2 generated by the inter-frame prediction circuit 327 described later, thereby generating decoded image data DID2.

The image processing circuit 325 has a function of performing image processing on the decoded image data DID2 to generate image data FID2, which is corrected image data. The image processing circuit 325 as well as the image processing circuit 307 includes a PLE to change the circuit configuration.

The context signal generation circuit 11 has functions of generating a context signal context that determines the circuit configuration of the image processing circuit 325 and outputting the context signal context to the image processing circuit 325. Note that the context signal context output to the image processing circuit 325 preferably has the same number of bits as the context signal context output to the image processing circuit 307 included in the encoder 122. For example, the context signal context can be an n-bit signal. When the context signal context is an n-bit signal, similarly to the image processing circuit 307, the image processing circuit 325 can have n types of circuit configurations.

The context signal generation circuit 11 can control an active context signal on the basis of the context data ContextD2. As mentioned above, the context data ContextD2 corresponds to the context data ContextD1 illustrated in FIG. 3A. This allows the logic of the context signal context output to the image processing circuit 325 to correspond to the logic of the context signal context output to the image processing circuit 307 provided in the encoder 122. For example, among the context signals context output to the image processing circuit 307 provided in the encoder 122, the context signal context[0] is active and the context signals context[1] to context[n−1] are inactive. In that case, also among the context signals context output to the image processing circuit 325, for example, the context signal context[0] can be active and the context signals context[1] to context[n−1] can be inactive. Consequently, the encoder 122 and the decoder 126 can perform image processing with the image processing circuits having similar configurations.

As described above, the context signal generation circuit 11 has functions of generating a clock control signal clkCS and outputting the clock control signal clkCS to the clock signal generation circuit 13.

The clock signal generation circuit 13 has a function similar to that of the clock signal generation circuit 13 included in the encoder 122. The clock signal gclk generated by the clock signal generation circuit 13 can be output to the image processing circuit 325. The clock signal generation circuit 13 can control, on the basis of the logic of the clock control signal clkCS, whether clock gating is performed on the image processing circuit 325.

The frame memory 326 has a function of retaining the image data FID2. The frame memory 326 has a function of retaining the image data FID2 for one frame or two or more frames. The frame memory 326 also has functions of outputting the retained image data FID2 to the outside of the decoder 126 and outputting the retained image data FID2 as reference image data Ref2 to the inter-frame prediction circuit 327.

The inter-frame prediction circuit 327 has a function of generating prediction image data PID2 on the basis of the reference image data Ref2 and the prediction parameter PP2. As described above, the prediction image data PID2 can be output to the adder 324.

In one embodiment of the present invention, clock gating can be performed on the image processing circuit 307 or 325 when, for example, the context is being changed. This prevents a clock signal from being input to the PLE or the like provided in the image processing circuit 307 or 325 when the circuit configuration of the image processing circuit 307 or 325 is being changed. As a result, malfunction during the changing of the configuration of the image processing circuit 307 or 325 can be prevented even when the clock frequency of the clock signal clk or the like increases. That is, both the operating speed and the reliability of the semiconductor device can be improved in the broadcasting system 100.

<Image Processing Circuit>

Figure 5:
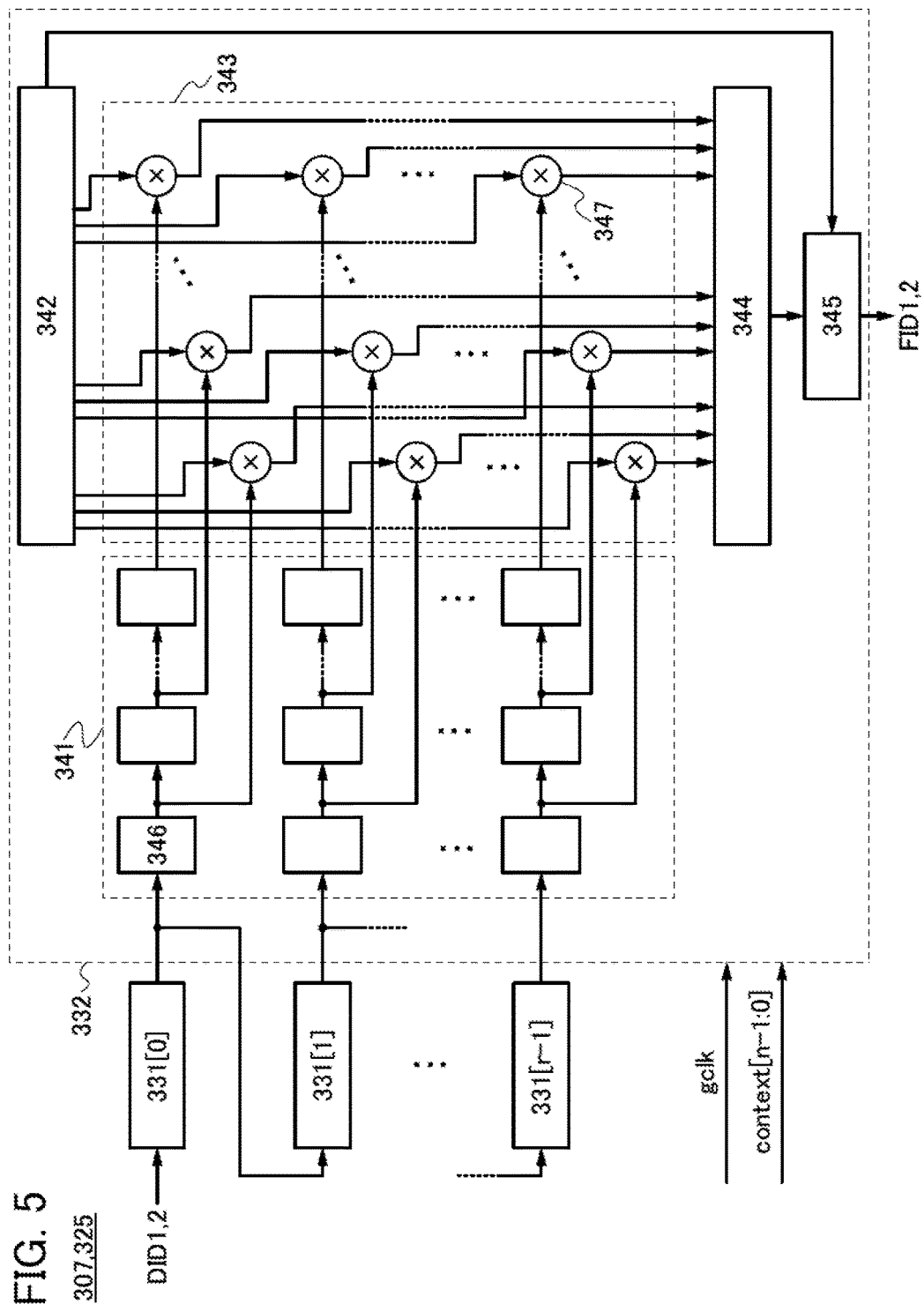
FIG. 5 is a block diagram illustrating a configuration example of an image processing circuit.

FIG. 5 is a block diagram illustrating a specific configuration example of the image processing circuits 307 and 325. As illustrated in FIG. 5, the image processing circuits 307 and 325 preferably have the same configuration. Note that image processing circuits other than the image processing circuits 307 and 325, e.g., the image processing circuits 121 and 127 illustrated in FIG. 1, can also have the configuration illustrated in FIG. 5. In that case, the operation method of the image processing circuits 307 and 325 can be applied to the image processing circuits 121 and 127.

The image processing circuits 307 and 325 each include memories 331[0] to 331[$r-1$] ($r$ is an integer of 2 or more) and a filter circuit 332. The filter circuit 332 includes a retention circuit 341, a weight coefficient setting circuit 342, a multiplier circuit 343, an adder circuit 344, and a divider circuit 345. In the retention circuit 341, for example, PLEs 346 of r rows and r columns, namely, r×r PLEs 346 can be provided. In the multiplier circuit 343, for example, multipliers 347 of r rows and r columns, namely, r×r multipliers 347 can be provided.

The memories 331[0] to 331[$r-1$] have a function of retaining the decoded image data DID1 or the decoded image data DID2. As the memories 331[0] to 331[$r-1$], line memories, frame memories, or the like can be used.

The retention circuit 341 has a function of retaining the decoded image data DID1 or the decoded image data DID2 read from the memories 331[0] to 331[$r-1$]. The PLE 346 in the retention circuit 341 includes a flip-flop circuit, and the decoded image data DID1 or the decoded image data DID2 can be setup and retained in the flip-flop circuit, as will be described later in detail.

The PLE 346 retaining the decoded image data DID1 or the decoded image data DID2 can be determined by the logic of the context signal context. Accordingly, the decoded image data DID1 or the decoded image data DID2 can be retained only in the PLEs 346 of p rows and q columns (p and q are each a natural number of r or less). In that case, only the multipliers 347 of p rows and q columns are used, i.e., the filter size can be reduced to p×q.

The weight coefficient setting circuit 342 has functions of determining a weight coefficient that is multiplied by image data output from the retention circuit 341, and outputting information on the weight coefficient to the multiplier 347 in the multiplier circuit 343. The weight coefficient setting circuit 342 includes a PLE, so that the circuit configuration can be changed by context switching to change the weight coefficient. Note that in the case where the filter size is reduced, for example, 0 can be output as the weight coefficient to the multiplier 347 that is not used. Alternatively, the weight coefficient setting circuit 342 can output no weight coefficient to the multiplier 347 that is not used.

The multiplier circuit 343 has a function of multiplying image data output from the retention circuit 341 by the weight coefficient output from the weight coefficient setting circuit 342. This calculation can be made with the multiplier 347 provided in the multiplier circuit 343.

The adder circuit 344 has a function of calculating the sum of output values of the multiplier circuit 343.

The divider circuit 345 has functions of dividing the output value of the adder circuit 344 by the sum of the weight coefficients, and outputting the image data FID1 or the image data FID2.

In the image processing circuits 307 and 325 with the configuration illustrated in FIG. 5, the weight coefficient is adjusted by changing the circuit configuration by context switching, which allows changing of the strength of the filter. For example, when a weight coefficient of 1 is input to all the multipliers 347, the filter circuit 332 can serve as an averaging filter.

<Operation of Decoder and the Like>

FIG. 6 is a timing chart showing an operation example of the decoder 126. For an operation example of the encoder 122 and the like, FIG. 6 can be referred to when reference numerals are changed as needed. In FIG. 6, n is 2 for simplicity. That is, the context signal generation circuit 11 can generate the context signal context[0] and the context signal context[1].

The timing chart of FIG. 6 shows the clock signal clk, the decoded image data DID2, the context signal context[0], the context signal context[1], the clock control signal clkCS, the clock signal gclk, and the image data FID2. The state of the image processing circuit 325 is also shown. Note that in FIG. 6, the initial state of the image processing circuit 325 means that the circuit configuration is not determined. The state [0] means that the image processing circuit 325 has a circuit configuration with the active context signal context[0] and the inactive context signal context[1]. The state [1] means that the image processing circuit 325 has a circuit configuration with the active context signal context[1] and the inactive context signal context[0].

In this specification and the like, the state [0] refers to the state where the image processing circuit 325 has a circuit configuration with the active context signal context[0] and the inactive context signal context[1]. The state [1] refers to the state where the image processing circuit 325 has a circuit configuration with the active context signal context[1] and the inactive context signal context[0].

In FIG. 6, the clock signal gclk changes at the same time as the clock signal clk except for the case of clock gating. However, there is a lag by propagation delay such as gate delay or RC delay in practice.

The potential of a signal or the like shown in FIG. 6 changes in synchronization with the rise or fall of the clock signal clk or the clock signal gclk. Here, even in the case where the potential of a signal changes in synchronization with the rise of the clock signal clk or the clock signal gclk in FIG. 6, the potential of the may change in synchronization with the fall of the clock signal clk or the clock signal gclk. Also, even in the case where the potential of a signal changes in synchronization with the fall of the clock signal clk or the clock signal gclk in FIG. 6, the potential of the signal may change in synchronization with the rise of the clock signal clk or the clock signal gclk.

The image processing circuit 325 is in the initial state when both the context signal context[0] and the context signal context[1] are at a low potential. For example, the image processing circuit 325 can be in the initial state when the decoded image data DID2 is not output to the image processing circuit 325. In this state, the clock control signal clkCS can be at a high potential.

When the context signal context[0] is at the high potential, the state of the image processing circuit 325 changes from the initial state to the state [0]. When the clock control signal clkCS is set to the low potential at this time, the output of the clock signal gclk to the image processing circuit 325 can be stopped, i.e., clock gating can be performed. This prevents the clock signal from being input to the PLE or the like in the image processing circuit 325 when the state of the image processing circuit 325 is being changed. As a result, malfunction during the changing of the state of the image processing circuit 325 can be prevented, leading to an improvement in the reliability of the semiconductor device included in the broadcasting system 100.

The image processing circuit 325 stops image processing during clock gating, and therefore, does not generate the image data FID2 even in the case where the decoded image data DID2 is input to the image processing circuit 325.

After the initial state of the image processing circuit 325 changes to the state [0], the clock control signal clkCS becomes at the high potential. Accordingly, the output of the clock signal gclk to the image processing circuit 325 restarts so that the image processing circuit 325 can perform image processing on the decoded image data DID2 to output the image data FID2.

When the context signal context[0] is at the low potential and the context signal context[1] is at the high potential, the state of the image processing circuit 325 changes from the state [0] to the state [1]. At this time, clock gating can be performed when the clock control signal clkCS is set to the low potential as in the case where the initial state of the image processing circuit 325 changes to the state [0].

In FIG. 6, clock gating for one clock is performed when the state of the image processing circuit 325 changes; alternatively, clock gating for two or more clocks may be performed. In that case, the clock frequency of the clock signal clk can be further increased as compared with the case where clock gating for one clock is performed. This results in an increase in the operating speed of the semiconductor device included in the broadcasting system 100.

<Controller>

Figure 7A:
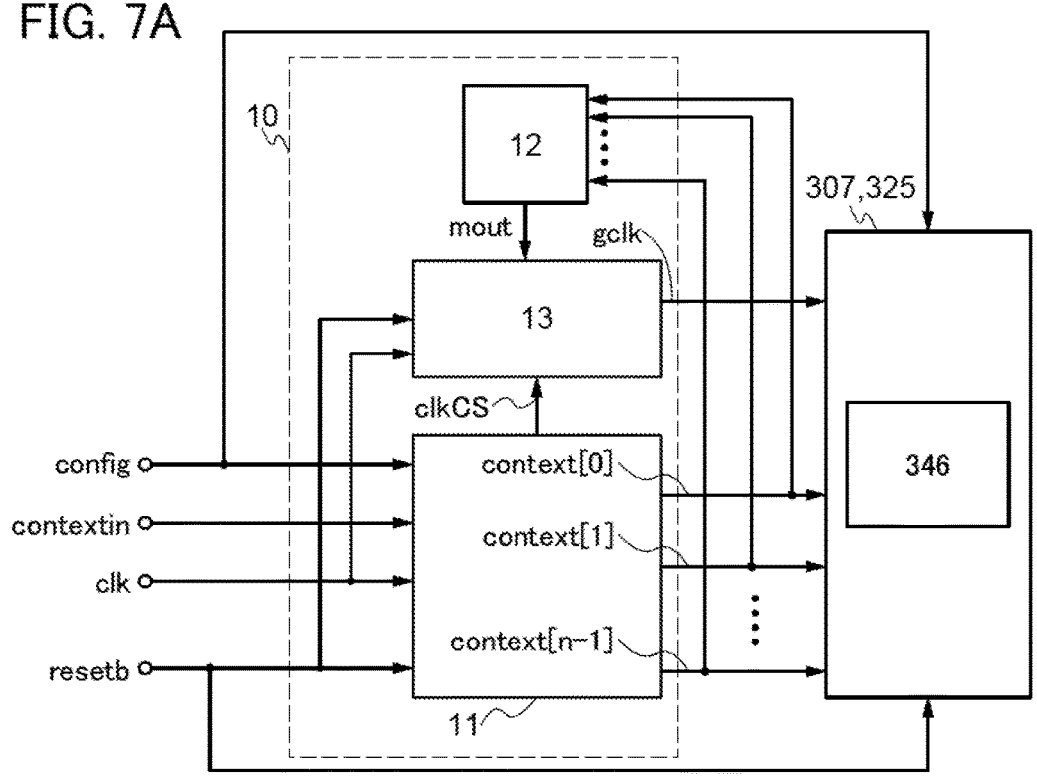
FIGS. 7A and 7B are block diagrams each illustrating a configuration example of a controller.

FIG. 7A is a block diagram illustrating a specific configuration example of the controller 10 and the image processing circuit. The controller 10 includes the context signal generation circuit 11, the clock signal generation circuit 13, and a configuration memory 12. As described above, the image processing circuits 307 and 325, to which the context signal context and the clock signal gclk are input, include a PLE such as the PLE 346.

The context signal generation circuit 11 can receive the clock signal clk, a reset inverted signal resetb, a configuration state signal config, and a context state signal contextin. The clock signal generation circuit 13 can receive the clock signal clk and the reset inverted signal resetb. The image processing circuits 307 and 325 can receive the context signal context, the clock signal gclk, the reset inverted signal resetb, and the configuration state signal config.

Not only the image processing circuits 307 and 325 but also other image processing circuits that include PLEs can receive the context signal context, the clock signal gclk, the reset inverted signal resetb, and the configuration state signal config, that is, can be operated with the controller 10.

In the case where the context signal context is an n-bit signal, the context state signal contextin can be a $\log_2(n)$-bit signal.

The clock signal clk serves as a clock signal that determines the operation timing of each circuit included in the controller 10. The reset inverted signal resetb serves as a reset signal for flip-flop circuits provided in the PLE such as the PLE 346 included in the image processing circuit 307, 325, or the like, as will be described later in detail. The configuration state signal config serves as a signal indicating a configuration operation state. The context state signal contextin serves as a signal for setting a context state.

The context signal generation circuit 11 has functions of generating the context signal context, which is necessary for context switching, and outputting the context signal context to the configuration memory 12 and a configuration memory provided in a PLE such as the PLE 346 included in the image processing circuit 307, 325, or the like. The context signal generation circuit also has functions of, as described above, generating the clock control signal clkCS and outputting the clock control signal clkCS to the clock signal generation circuit 13.

The configuration memory 12 has functions of retaining configuration data and generating an output signal mout corresponding to the retained configuration data.

The clock signal generation circuit 13 has a function of controlling whether to output or stop outputting the clock signal gclk to the image processing circuit 307, 325, or the like on the basis of the logic of the clock control signal clkCS and the logic of the output signal mout. For example, clock gating for one clock is performed with an inactive clock control signal clkCS after context switching starts in the case where the output signal mout is at the high potential, and no clock gating is performed in the case where the output signal mout is at the low potential.

In the case where the reset inverted signal resetb is active, the flip-flop circuits provided in the PLE such as the PLE 346 in the image processing circuit 307, 325, or the like can be reset so that data setup cannot be performed. In contrast, in the case where the reset inverted signal resetb is inactive, the reset states of the flip-flop circuits can be canceled to allow data setup depending on the clock signal gclk and the like. The details will be described later.

In this specification and the like, an active inverted signal means that, for example, the inverted signal has a low potential. In contrast, an inactive inverted signal means that, for example, the inverted signal has a high potential. The logic of the inverted signal may be inverted.

The configuration state signal config can be active while the configuration memory 12 performs configuration operation and can be inactive while the configuration memory 12 does not perform configuration operation.

Figure 7B:
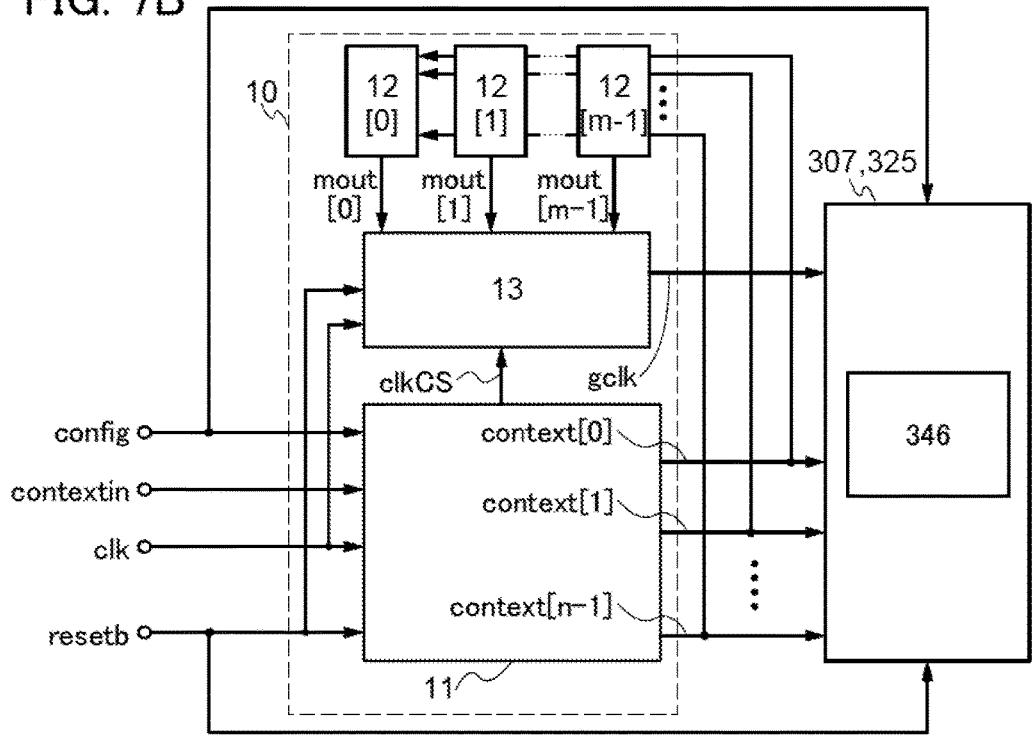

FIG. 7B illustrates a modification example of the controller 10, which is different from the controller 10 in FIG. 7A in including configuration memories 12[0] to 12[*m*−1] (m is an integer of 2 or more). In the controller 10 with the configuration illustrated in FIG. 7B, the configuration memories 12[0] to 12[*m*−1] have a function of generating the respective output signals mout[0] to mout[m−1]. In other words, the configuration memory 12 has a function of generating m-bit output signals mout.

With the configuration illustrated in FIG. 7B, for example, the clock signal generation circuit 13 can generate binary integer data on the basis of the logic of the output signals mout[0] to mout[m−1], which enables clock gating to be performed on the image processing circuit 307, 325, or the like for an integer number of clocks. The binary integer data can be generated to have the output signal mout[0] as the least significant bit (LSB) and the output signal mout[m−1] as the most significant bit (MSB), for example.

In the case where the output signal mout[1] is at the high potential and the other output signals mout are all at the low potential, for example, the clock signal generation circuit 13 can perform clock gating for two clocks. In the case where the output signals mout[0] and mout[1] are at the high potential and the other output signals mout are all at the low potential, for example, the clock signal generation circuit 13 can perform clock gating for three clocks. In the case where the output signal mout[m−1] is at the high potential and the other output signals mout are all at the low potential, for example, the clock signal generation circuit 13 can perform clock gating for $2^{m-1}$ clocks. In the case where the output signals mout[0] to mout[m−1] are all at the high potential, the clock signal generation circuit 13 can perform clock gating for $2^m-1$ clocks.

In the case where the output signal mout[0] is at the high potential and the other output signals mout are all at the low potential, for example, the clock signal generation circuit 13 can perform clock gating for one clock. In the case where the output signals mout[0] to mout[m−1] are all at the low potential, for example, the clock signal generation circuit 13 can perform no clock gating.

Note that in the case where m=1, the configuration of the controller 10 is similar to that of the controller 10 illustrated in FIG. 7A. Thus, in the case where m=1, clock gating for one clock is performed when the output signal mout[0] is at the high potential, and no clock gating is performed when the output signal mout[0] is at the low potential.

Figure 8:
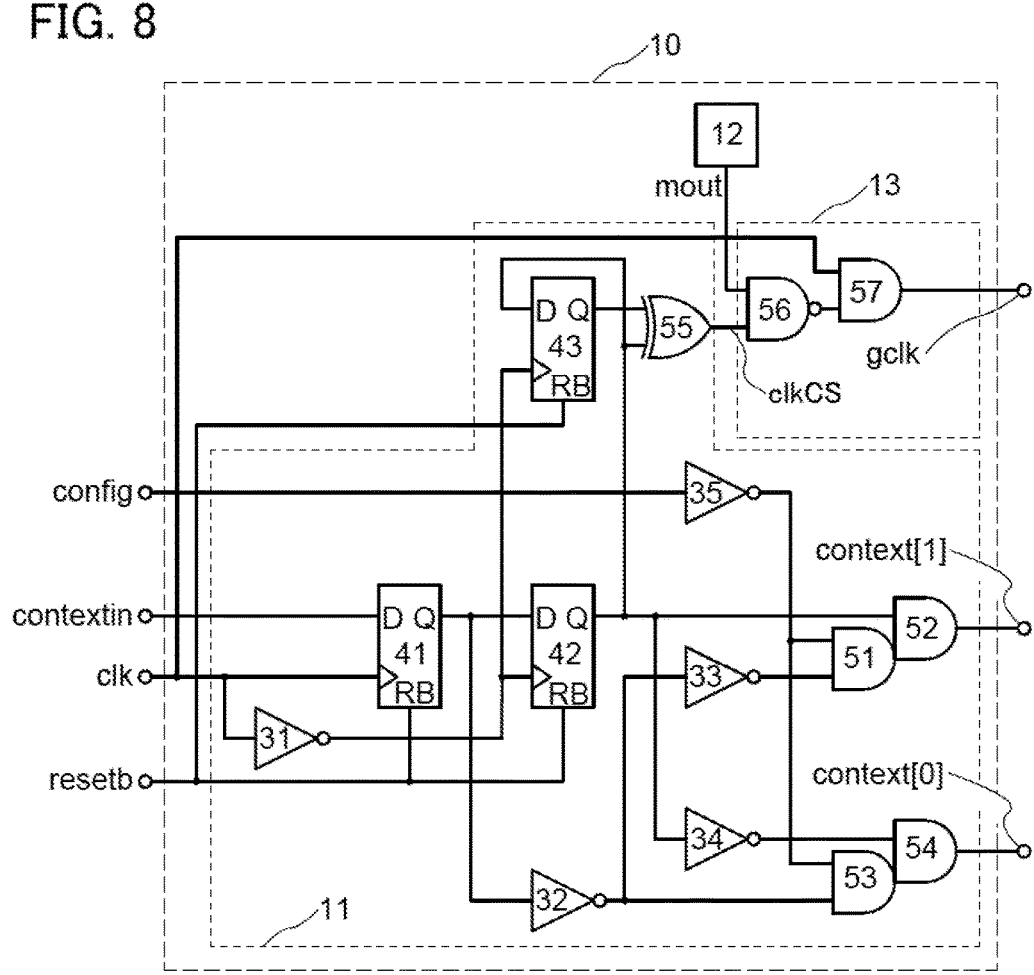
FIG. 8 is a circuit diagram illustrating a configuration example of a controller.

FIG. 8 is a circuit diagram illustrating a configuration example of the controller 10 (n=2) illustrated in FIG. 7A. That is, the context signal generation circuit 11 generates only the context signal context[0] and the context signal context[1] as the context signals context. Here, the context state signal contextin is a 1-bit signal. FIG. 9A to FIG. 17B also show the case where n is 2. The configurations and the like illustrated in FIG. 8 to FIG. 17B can be referred to as appropriate in the case where n is 3 or more.

The controller 10 includes, as described above, the context signal generation circuit 11, the configuration memory 12, and the clock signal generation circuit 13.

The context signal generation circuit 11 includes an inverter 31, an inverter 32, an inverter 33, an inverter 34, an inverter 35, a flip-flop circuit 41, a flip-flop circuit 42, a flip-flop circuit 43, an AND circuit 51, an AND circuit 52, an AND circuit 53, an AND circuit 54, and an XOR circuit 55. The clock signal generation circuit 13 includes a NAND circuit 56 and an AND circuit 57.

An input terminal of the inverter 31 is electrically connected to a clock input terminal of the flip-flop circuit 41 and a first input terminal of the AND circuit 57. An output terminal of the inverter 31 is electrically connected to a clock input terminal of the flip-flop circuit 42 and a clock input terminal of the flip-flop circuit 43.

An input terminal of the inverter 32 is electrically connected to a data output terminal of the flip-flop circuit 41 and a data input terminal of the flip-flop circuit 42. An output terminal of the inverter 32 is electrically connected to an input terminal of the inverter 33 and a second input terminal of the AND circuit 53.

An output terminal of the inverter 33 is electrically connected to a second input terminal of the AND circuit 51.

An input terminal of the inverter 34 is electrically connected to a data output terminal of the flip-flop circuit 42, a data input terminal of the flip-flop circuit 43, a first input terminal of the AND circuit 52, and a second input terminal of the XOR circuit 55. An output terminal of the inverter 34 is electrically connected to a first input terminal of the AND circuit 54.

An output terminal of the inverter 35 is electrically connected to a first input terminal of the AND circuit 51 and a first input terminal of the AND circuit 53.

A data output terminal of the flip-flop circuit 43 is electrically connected to a first input terminal of the XOR circuit 55.

An output terminal of the AND circuit 51 is electrically connected to a second input terminal of the AND circuit 52. An output terminal of the AND circuit 53 is electrically connected to a second input terminal of the AND circuit 54.

A first input terminal of the NAND circuit 56 is electrically connected to the configuration memory 12. A second input terminal of the NAND circuit 56 is electrically connected to an output terminal of the XOR circuit 55. An output terminal of the NAND circuit 56 is electrically connected to a second input terminal of the AND circuit 57.

The clock signal clk can be input to the clock input terminal of the flip-flop circuit 41 and the first input terminal of the AND circuit 57. The reset inverted signal resetb can be input to reset input terminals of the flip-flop circuits 41, 42, and 43. The configuration state signal config can be input to an input terminal of the inverter 35. The context state signal contextin can be input to a data input terminal of the flip-flop circuit 41.

The inverter 31 has a function of generating an inverted signal of the clock signal clk.

The flip-flop circuit 41 has a function of generating a data output signal synchronized with the rise of the clock signal clk from the context state signal contextin. In the case where the context state signal contextin is at the high potential, for example, the flip-flop circuit 41 generates a high-potential data output signal at the rise of the clock signal clk.

The flip-flop circuit 42 has a function of generating a data output signal synchronized with the fall of the clock signal clk from the data output signal generated by the flip-flop circuit 41. In the case where a high-potential data output signal is generated by the flip-flop circuit 41, for example, the flip-flop circuit 42 generates a high-potential data output signal at the fall of the clock signal clk.

A circuit consisting of the inverter 32, the inverter 34, the inverter 35, the AND circuit 53, and the AND circuit 54 has a function of generating the context signal context[0]. A circuit consisting of the inverter 32, the inverter 33, the inverter 35, the AND circuit 51, and the AND circuit 52 has a function of generating the context signal context[1]. Note that for both of the circuits, the data output signal of the flip-flop circuit 41, the data output signal of the flip-flop circuit 42, and the configuration state signal config are input signals.

The flip-flop circuit 43 has a function of generating a data output signal synchronized with the fall of the clock signal clk from the data output signal generated by the flip-flop circuit 42. Accordingly, the logic of the data output signal generated by the flip-flop circuit 43 is changed one clock after the logic change of the data output signal generated by the flip-flop circuit 42.

The XOR circuit 55 has a function of generating the clock control signal clkCS. The clock control signal clkCS has the high potential, i.e., is active when the logic of the data output signal generated by the flip-flop circuit 42 is different from the logic of the data output signal generated by the flip-flop circuit 43, whereas the clock control signal clkCS has the low potential, i.e., is inactive when the data output signals have the same logic. Context switching occurs at the same time as the logic change of the data output signal generated by the flip-flop circuit 42; thus, the XOR circuit 55 outputs a high-potential signal at the instant when context switching occurs, and outputs a low-potential signal at the next fall of the clock signal clk. In other words, the XOR circuit 55 enables a pulse signal to be obtained at the timing of context switching.

The NAND circuit 56 has a function of generating a control signal for clock gating performed on the image processing circuit 307, 325, or the like. Clock gating can be performed on the image processing circuit 307, 325, or the like in the case where the output signal mout is at the high potential and the clock control signal clkCS is at the high potential, and no clock gating can be performed in the other cases, for example.

The AND circuit 57 has a function of generating the clock signal gclk whose logic corresponds to the logic of the clock signal clk when a high-potential signal is output from the NAND circuit 56 and outputting the clock signal gclk whose potential is fixed at a low level when a low-potential is output from the NAND circuit 56.

Figure 9A:
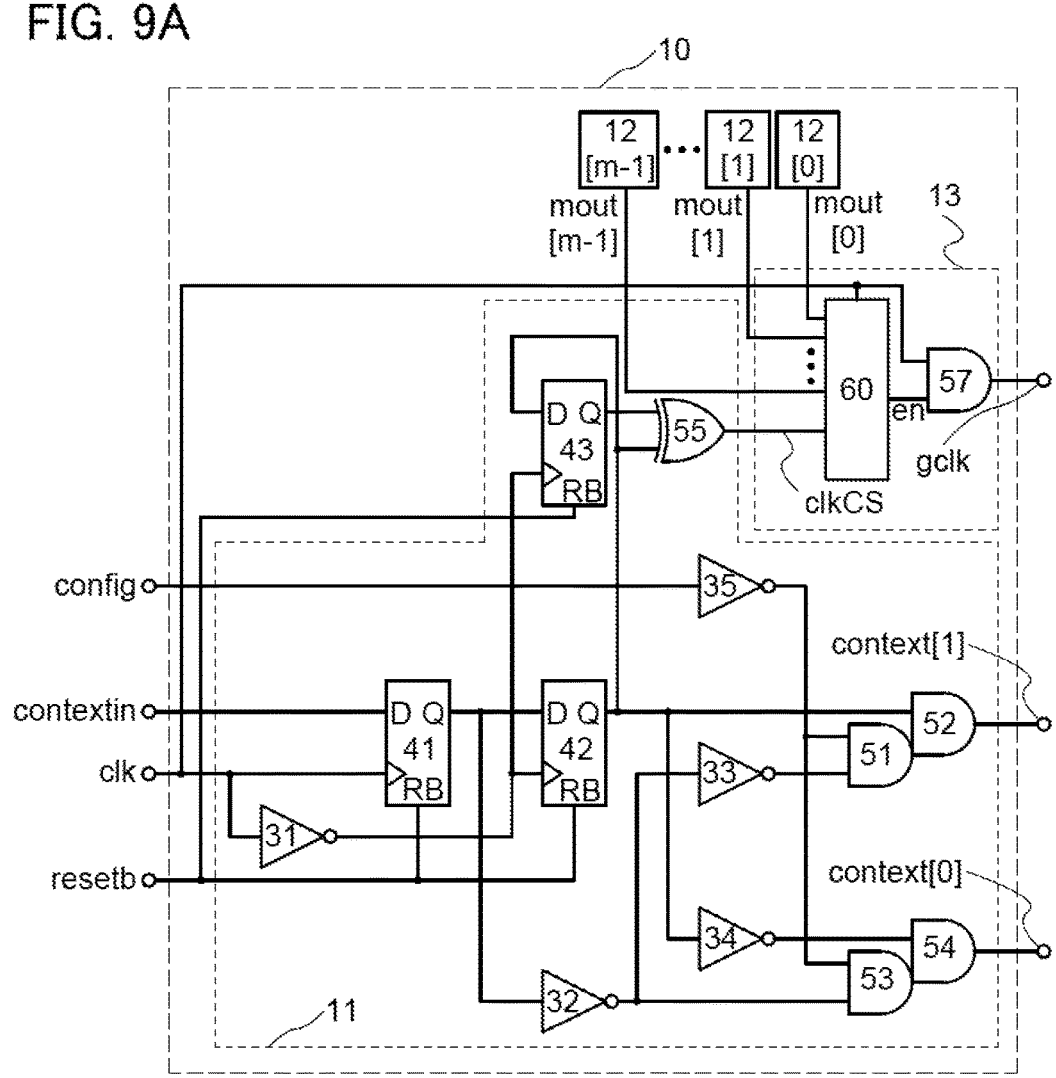
FIGS. 9A and 9B are a circuit diagram and a block diagram illustrating a configuration example of a controller.

FIG. 9A is a circuit diagram illustrating a configuration example of the controller 10 illustrated in FIG. 7B.

The controller 10 with the configuration illustrated in FIG. 9A is different from the controller 10 with the configuration illustrated in FIG. 8 in including a clock gating control circuit 60 instead of the NAND circuit 56 and including the configuration memories 12[0] to 12[$m$−1].

The clock signal clk, the output signals mout[0] to mout[m−1], and the clock control signal clkCS can be input to the clock gating control circuit 60.

The clock gating control circuit 60 has a function of outputting an enable signal en for controlling clock gating performed on the image processing circuit 307, 325, or the like. For example, the number of clocks during which clock gating is performed on the image processing circuit 307, 325, or the like is determined on the basis of the logic of the output signals mout[0] to mout[m−1], and the enable signal en having the low potential is output for the number of clocks. The enable signal en is input to the second input terminal of the AND circuit 57; thus, in a period during which the clock gating control circuit 60 outputs the low-potential enable signal en, the clock signal gclk is at the low potential regardless of the logic of the clock signal clk. Meanwhile, in a period during which the clock gating control circuit 60 outputs the high-potential enable signal en, the logic of the clock signal gclk corresponds to the logic of the clock signal clk. This means that clock gating can be performed on the image processing circuit 307, 325, or the like in a period during which the enable signal en is at the low potential.

Note that the logic of the enable signal en may be inverted. That is, the clock signal generation circuit 13 may be configured to perform clock gating on the image processing circuit 307, 325, or the like when the enable signal en is at the high potential.

Figure 9B:
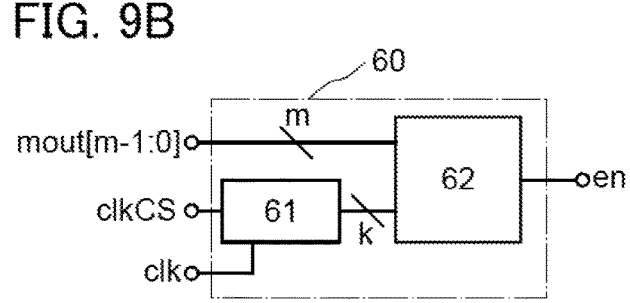

FIG. 9B illustrates a configuration example of the clock gating control circuit 60 illustrated in FIG. 9A. The clock gating control circuit 60 includes a counter circuit 61 and a comparator 62.

The clock signal clk and the clock control signal clkCS can be input to the counter circuit 61, and the output signals mout[0] to mout[m−1] can be input to the comparator 62.

The counter circuit 61 has functions of counting clock pulses of the clock signal clk and outputting k-bit (k is an integer of 2 or more) signals. The comparator 62 has functions of comparing the binary number based on the logic of the k-bit signals output from the counter circuit 61 and the binary number based on the logic of the m-bit output signals mout with each other and outputting the enable signal en whose logic is determined in accordance with the comparison result.

Described here is the operation of the clock gating control circuit 60. When the clock control signal clkCS is at the high potential, a register included in the counter circuit 61 is initialized. As a result, the k-bit signals output from the counter circuit 61 all have low potentials. Thus, the enable signal en becomes at the low potential, leading to the start of clock gating performed on the image processing circuit 307, 325, or the like.

Next, the counter circuit 61 starts counting in synchronization with the clock signal clk. After the counting starts, the comparator 62 compares the binary number based on the logic of the k-bit signals output from the counter circuit 61 and the binary number based on the logic of the m-bit output signals mout with each other, and outputs the high-potential enable signal en when the value output from the counter circuit 61 is greater than or equal to the value of the output signal mout. Accordingly, clock gating performed on the image processing circuit 307, 325, or the like terminates.

The above is the operation of the clock gating control circuit 60. Note that after clock gating terminates, the counter circuit 61 counts up to full count and then stops its operation while holding the counted value, for example. The term "full count" means that the k-bit signals output from the counter circuit 61 all become at the high potential.

Figure 10:
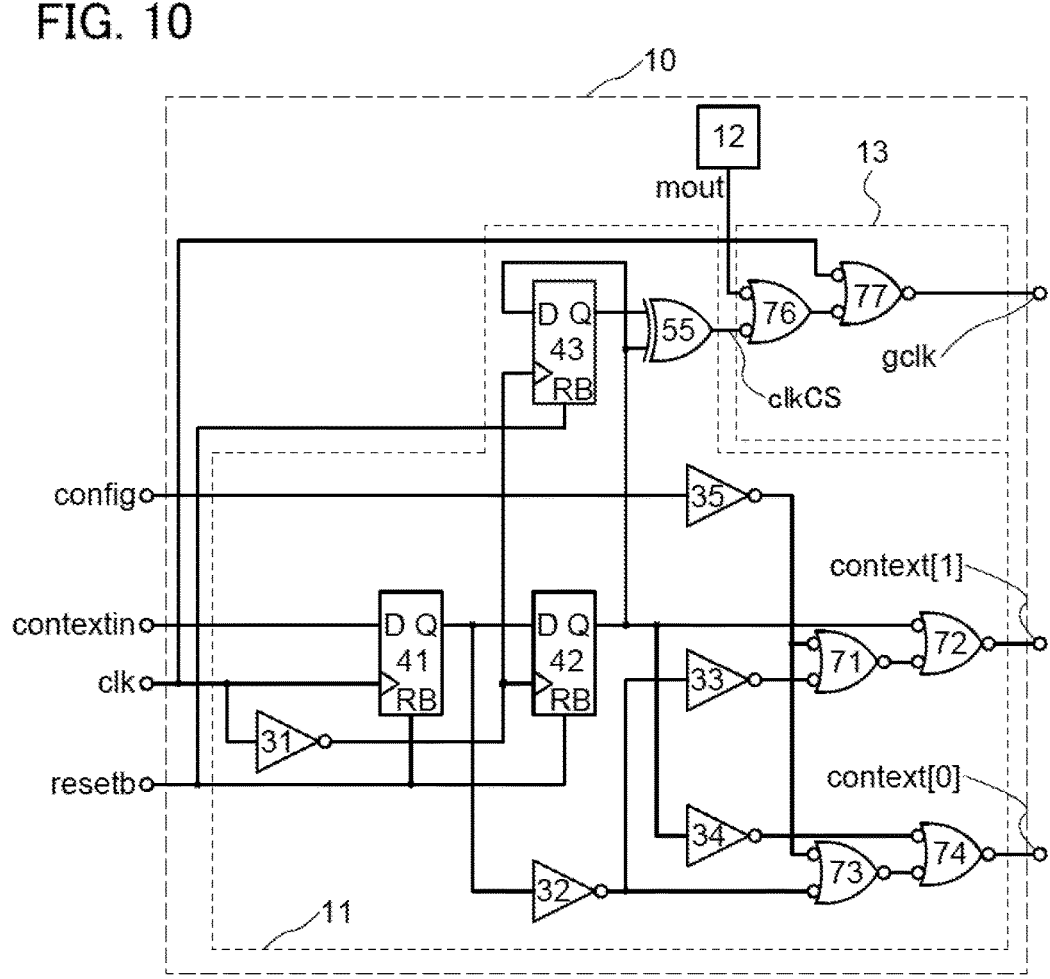
FIG. 10 is a circuit diagram illustrating a configuration example of a controller.
Figure 11:
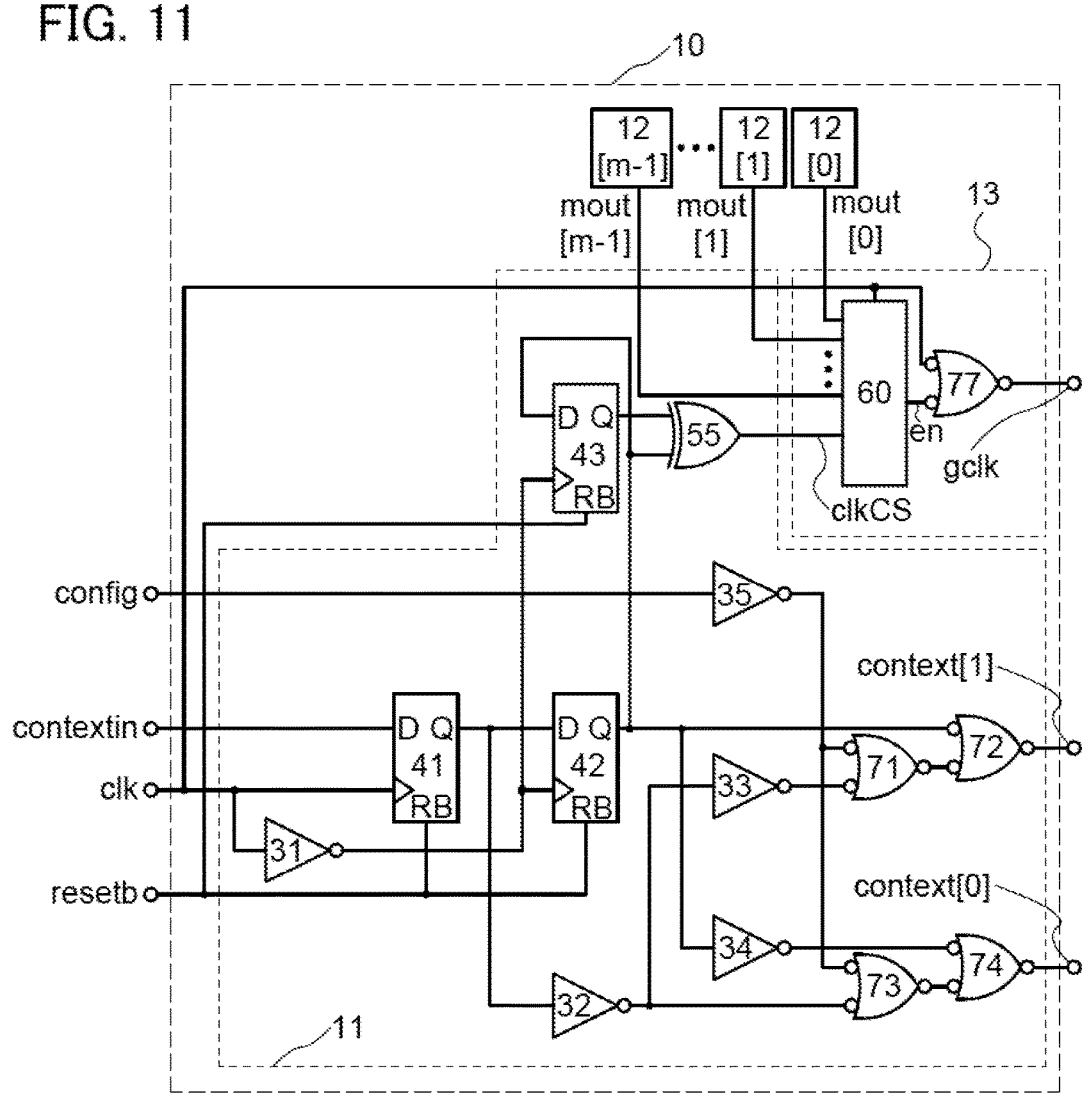
FIG. 11 is a circuit diagram illustrating a configuration example of a controller.

Note that the circuit configurations illustrated in FIG. 8 and FIGS. 9A and 9B are only examples. For example, the AND circuit 51, the AND circuit 52, the AND circuit 53, the AND circuit 54, the NAND circuit 56, and the AND circuit 57 in FIG. 8 may be replaced by a circuit 71, a circuit 72, a circuit 73, a circuit 74, a circuit 76, and a circuit 77, respectively, as illustrated in FIG. 10. For another example, the AND circuits 51 to 54 and the AND circuit 57 in FIG. 9A may be replaced by the circuits 71 to 74 and the circuit 77, respectively, as illustrated in FIG. 11.

<PLE>

Figure 12A:
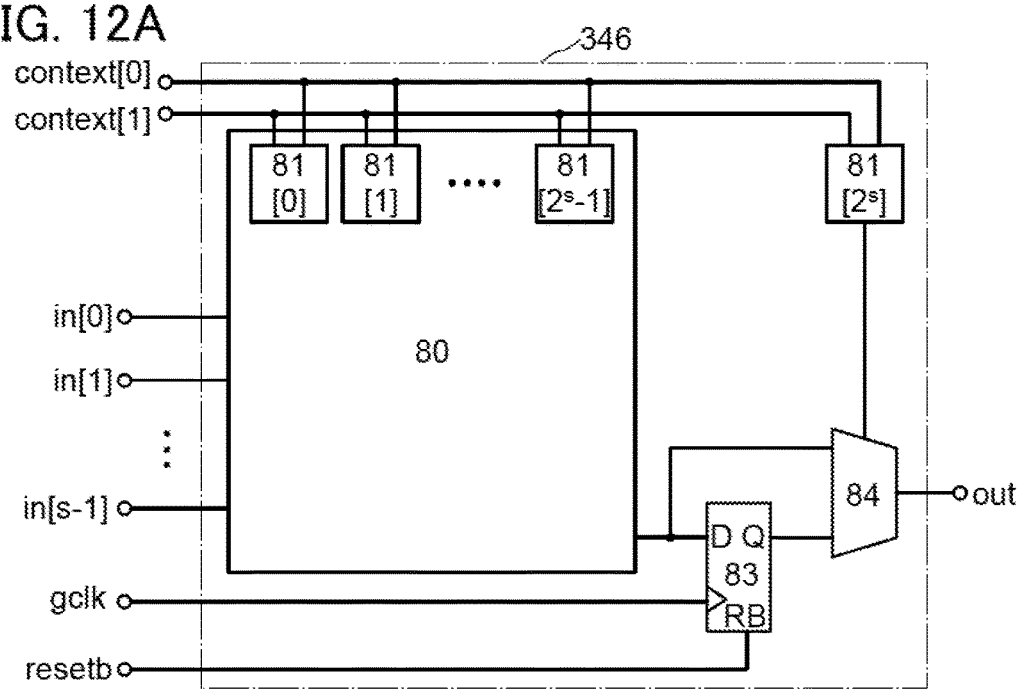
FIGS. 12A and 12B are circuit diagrams illustrating a configuration example of a PLE.
Figure 12B:
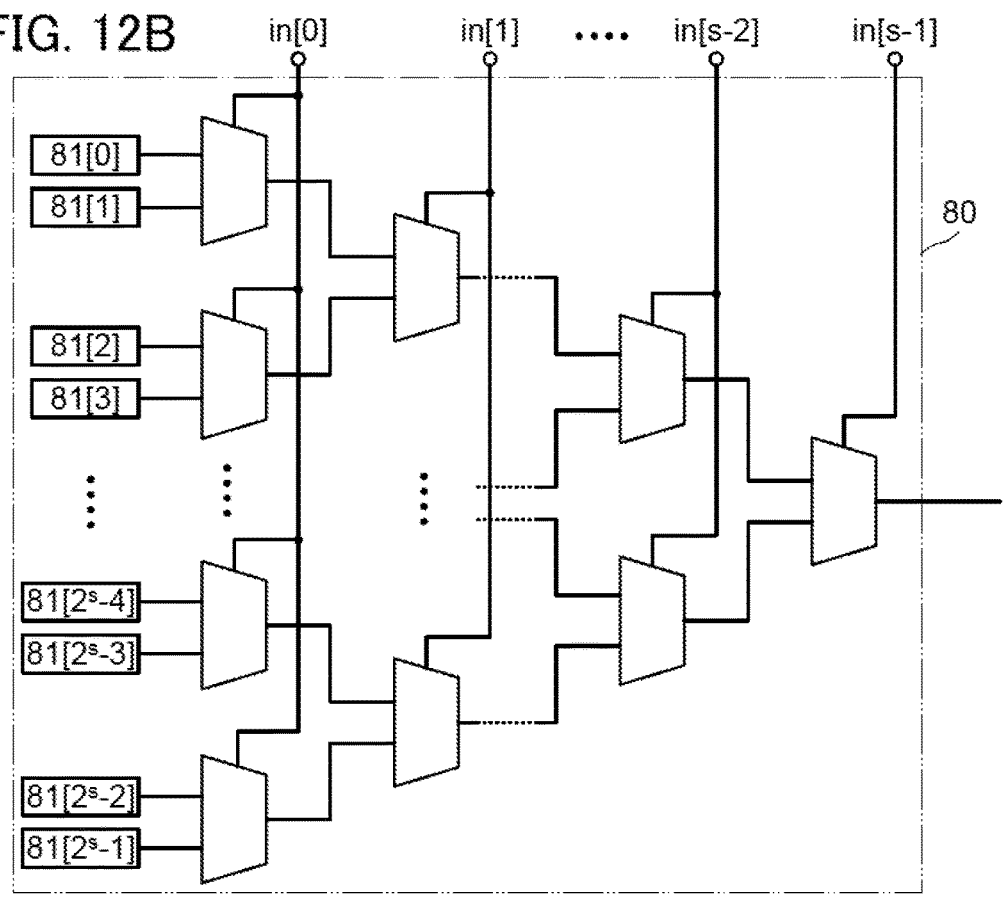

FIG. 12A is a circuit diagram illustrating a configuration example of a PLE such as the PLE 346 included in the image processing circuit 307, 325, or the like. The PLE such as the PLE 346 includes a look-up table 80, a flip-flop circuit 83, and a multiplexer 84. The look-up table 80 is an s-input look-up table (s is an integer of 2 or more) to which s signals can be input, and includes configuration memories 81[0] to 81[$2^s$]. FIG. 12B illustrates a configuration example of the look-up table 80 illustrated in FIG. 12A.

The look-up table 80 is electrically connected to a data input terminal of the flip-flop circuit 83 and a first input terminal of the multiplexer 84. The configuration memory 81[$2^s$] is electrically connected to a selection signal input terminal of the multiplexer 84. A data output terminal of the flip-flop circuit 83 is electrically connected to a second input terminal of the multiplexer 84.

Input signals in[0] to in[s−1] can be input to the look-up table 80. The context signals context[0] and context[1] can be input to the configuration memories 81[0] to 81[$2^s$]. The clock signal gclk can be input to a clock input terminal of the flip-flop circuit 83. The reset inverted signal resetb can be input to a reset input terminal of the flip-flop circuit 83.

The look-up table 80 has a function of outputting an output signal of one of the configuration memories 81[0] to 81[$2^s-1$] in accordance with the logic of the input signals in [0] to in[$2^s-1$], as illustrated in FIG. 12B. Similarly to the configuration memory 12, the configuration memories 81[0] to 81[$2^s$] each have functions of retaining configuration data and generating a signal corresponding to the retained configuration data. The flip-flop circuit 83 has a function of performing either retention or output to the second input terminal of the multiplexer 84, of the output signal from the look-up table 80 depending on the logic of the clock signal gclk. The multiplexer 84 has a function of outputting, as an output signal out, a signal with the logic that corresponds to the logic of one of the signal output from the look-up table 80 and the signal output from the data output terminal of the flip-flop circuit 83 in accordance with the logic of the signal output from the configuration memory 81[$2^s$].

<Configuration Memory>

Figure 13:
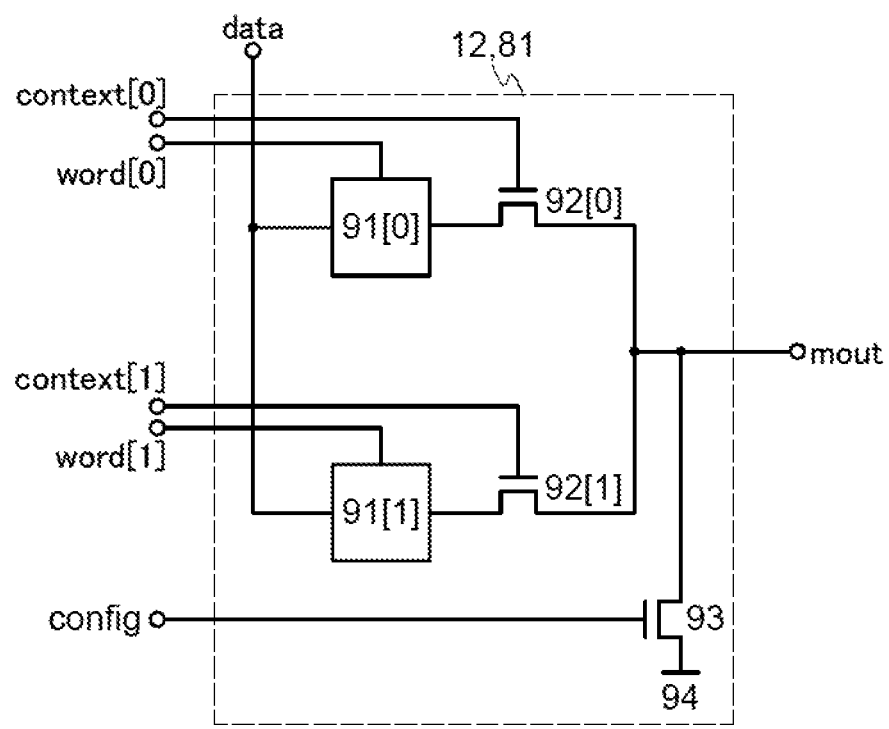
FIG. 13 is a circuit diagram illustrating a configuration example of a configuration memory.

FIG. 13 is a circuit diagram illustrating a configuration example for each of the configuration memory 12 illustrated in FIGS. 7A and 7B, and the like and the configuration memory 81 illustrated in FIGS. 12A and 12B. The configuration memory 12 and the configuration memory 81 each include a memory cell 91[0], a memory cell 91[1], a transistor 92[0], a transistor 92[1], a transistor 93, and a wiring 94.

Although FIG. 13 illustrates an example where the transistor 92[0], the transistor 92[1], and the transistor 93 are all n-channel transistors, one embodiment of the present invention is not limited thereto; some or all of the transistors may be p-channel transistors.

In this specification, an n-channel transistor is referred to as an n-ch transistor and a p-channel transistor is referred to as a p-ch transistor in some cases.

The memory cell 91[0] is electrically connected to one of a source and a drain of the transistor 92[0]. The memory cell 91[1] is electrically connected to one of a source and a drain of the transistor 92[1]. The other of the source and the drain of the transistor 92[0] is electrically connected to the other of the source and the drain of the transistor 92[1] and one of a source and a drain of the transistor 93. The other of the source and the drain of the transistor 93 is electrically connected to the wiring 94.

A signal data can be input to the memory cell 91[0] and the memory cell 91[1]. A signal word[0] can be input to the memory cell 91[0]. A signal word[1] can be input to the memory cell 91[1]. The context signal context[0] can be input to a gate of the transistor 92[0]. The context signal context[1] can be input to a gate of the transistor 92[1]. The configuration state signal config can be input to a gate of the transistor 93.

The memory cell 91[0] and the memory cell 91[1] each have a function of retaining configuration data. The transistor 92[0] has a function of determining, on the basis of the potential of the context signal context[0], whether or not to output data based on configuration data retained in the memory cell 91[0] as the output signal mout to the outside of the configuration memory 12 and the configuration memory 81. The transistor 92[1] has a function of determining, on the basis of the potential of the context signal context[1], whether or not to output data based on configuration data retained in the memory cell 91[1] as the output signal mout to the outside of the configuration memory 12 and the configuration memory 81.

That is, in the case where the context signal context[0] is at the high potential, the output signal mout becomes at the high potential when configuration data retained in the memory cell 91[0] is at the high potential, whereas the potential of the output signal mout becomes the low potential when configuration data retained in the memory cell 91[0] is at the low potential, for example. Furthermore, in the case where the context signal context[1] is at the high potential, the output signal mout becomes at the high potential when configuration data retained in the memory cell 91[1] is at the high potential, whereas the output signal mout becomes at the low potential when configuration data retained in the memory cell 91[1] is at the low potential, for example.

Note that the logic of the context signal context[0] and the context signal context[1] can be inverted as appropriate. Furthermore, the configuration memory 12 and the configuration memory 81 can each have a configuration in which the output signal mout becomes at the low potential when configuration data retained in the memory cell 91[0] is at the high potential and the output signal mout becomes at the high potential when configuration data retained in the memory cell 91[0] is at the low potential, for example. Alternatively, for example, a configuration can be employed in which the output signal mout becomes the low potential when configuration data retained in the memory cell 91[1] is at the high potential and the output signal mout becomes at the high potential when configuration data retained in the memory cell 91[1] is at the low potential.

The signal data has a function of supplying configuration data to the memory cell 91[0] and the memory cell 91[1]. The signal word[0] serves as a write control signal for controlling the writing of configuration data to the memory cell 91[0]. The signal word[1] serves as a write control signal for controlling the writing of configuration data to the memory cell 91[1].

The transistor 93 has a function of fixing the potential of the output signal mout at the potential of the wiring 94 during configuration operation. Note that a low potential can be applied to the wiring 94, for example.

Figure 14A:
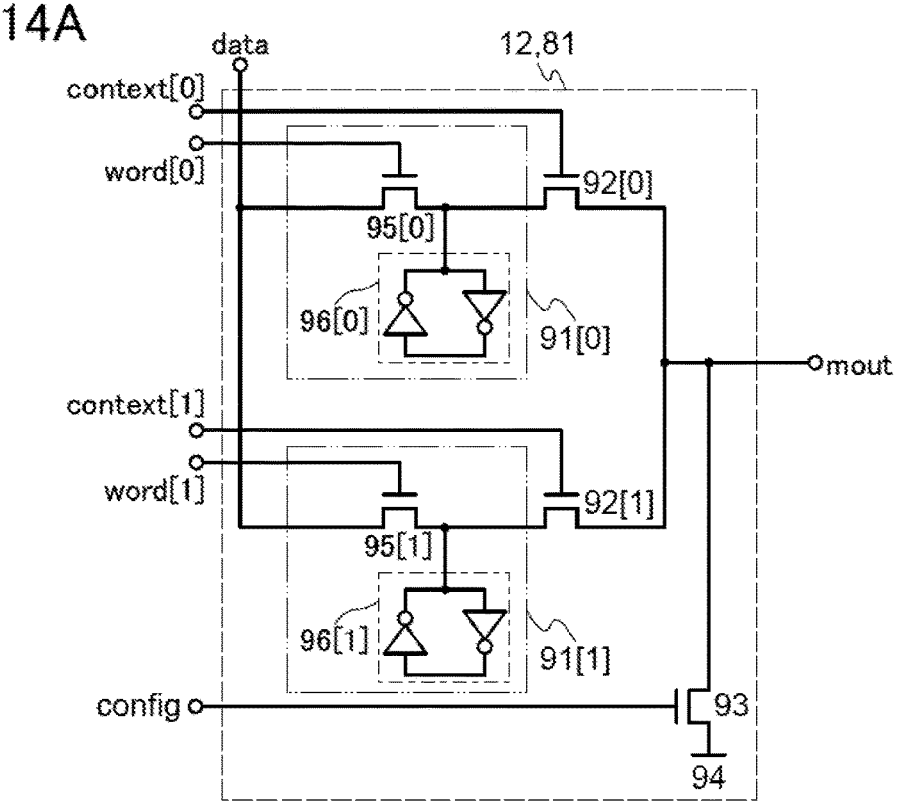
FIGS. 14A and 14B are circuit diagrams each illustrating a configuration example of a configuration memory.
Figure 14B:
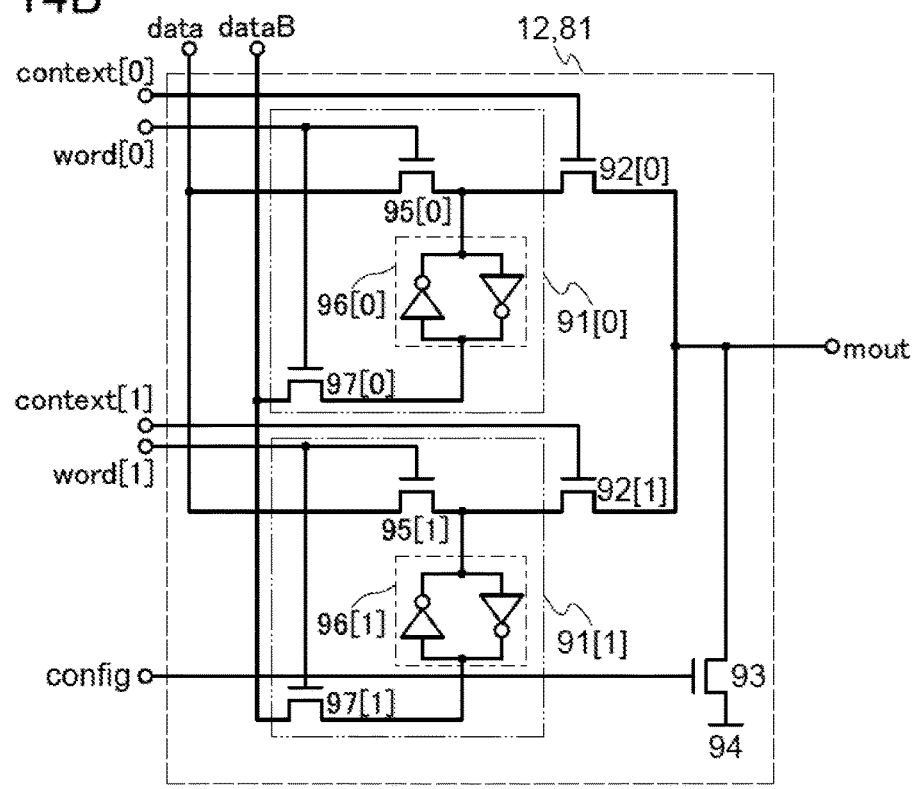

As illustrated in FIG. 14A, the memory cell 91[0] illustrated in FIG. 13 may include a transistor 95[0] and a latch circuit 96[0], and the memory cell 91[1] illustrated in FIG. 13 may include a transistor 95[1] and a latch circuit 96[1], for example. Alternatively, as illustrated in FIG. 14B, a signal dataB, which is data (complementary data) obtained by inverting the logic of the signal data, may be supplied to the latch circuit 96[0] and the latch circuit 96[1]. In that case, the signal dataB is supplied to the latch circuit 96[0] through a transistor 97[0] and to the latch circuit 96[1] through a transistor 97[1].

Figure 15A:
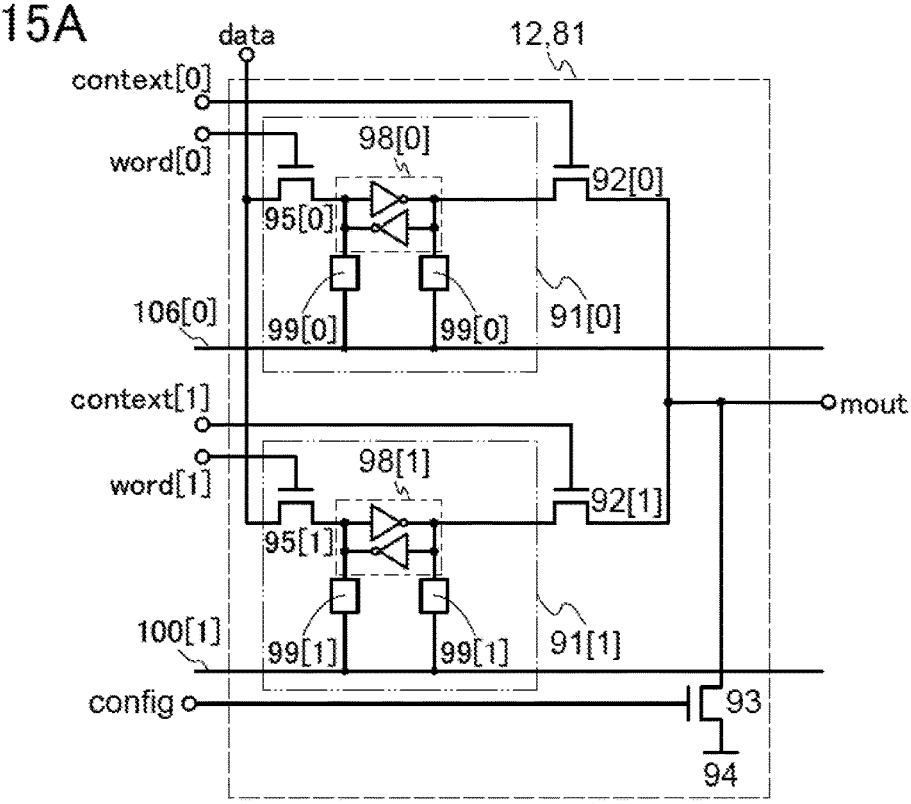
FIGS. 15A and 15B are circuit diagrams each illustrating a configuration example of a configuration memory.

As illustrated in FIG. 15A, a configuration may be employed in which the memory cell 91[0] includes the transistor 95[0], a latch circuit 98[0], magnetoresistive random access memories (MRAMs) 99[0], and a wiring 106[0] and the memory cell 91[1] includes the transistor 95[1], a latch circuit 98[1], MRAMs 99[1], and a wiring 106[1]. Alternatively, as illustrated in FIG. 15B, a configuration may be employed in which the latch circuit 98[0] is connected to the MRAMs 99[0] through transistors 101[0] and the latch circuit 98[1] is connected to the MRAMs 99[1] through transistors 101[1].

Figure 15B:
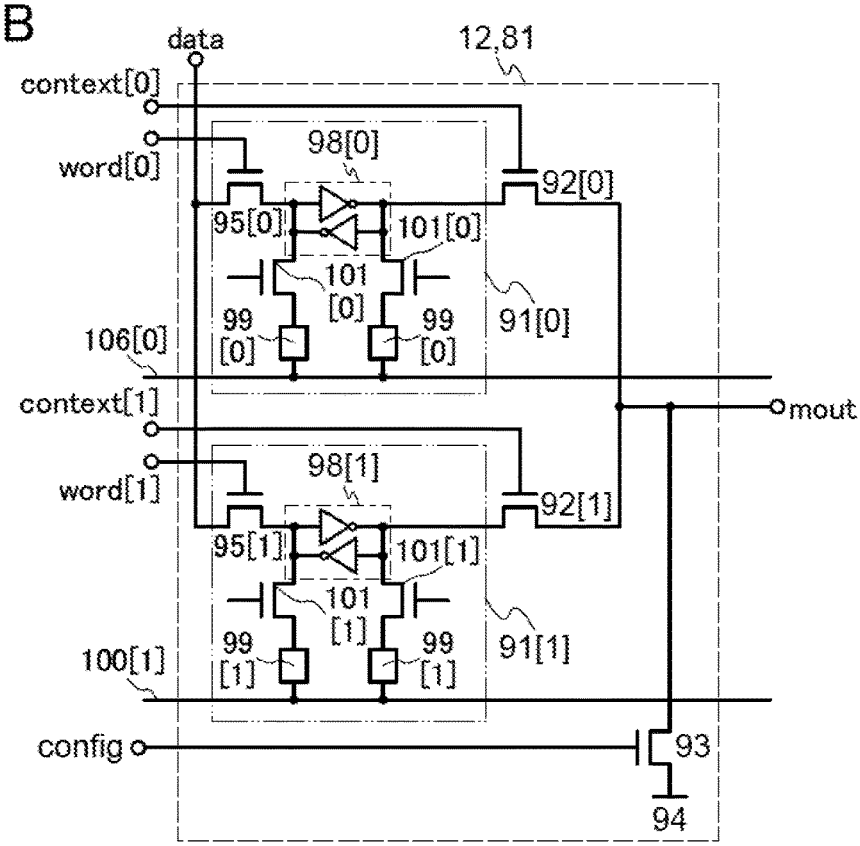

Note that the memory cell 91[0] and the memory cell 91[1] with the configurations illustrated in FIG. 15A or FIG. 15B do not necessarily include the latch circuit 98[0] and the latch circuit 98[1].

Figure 16:
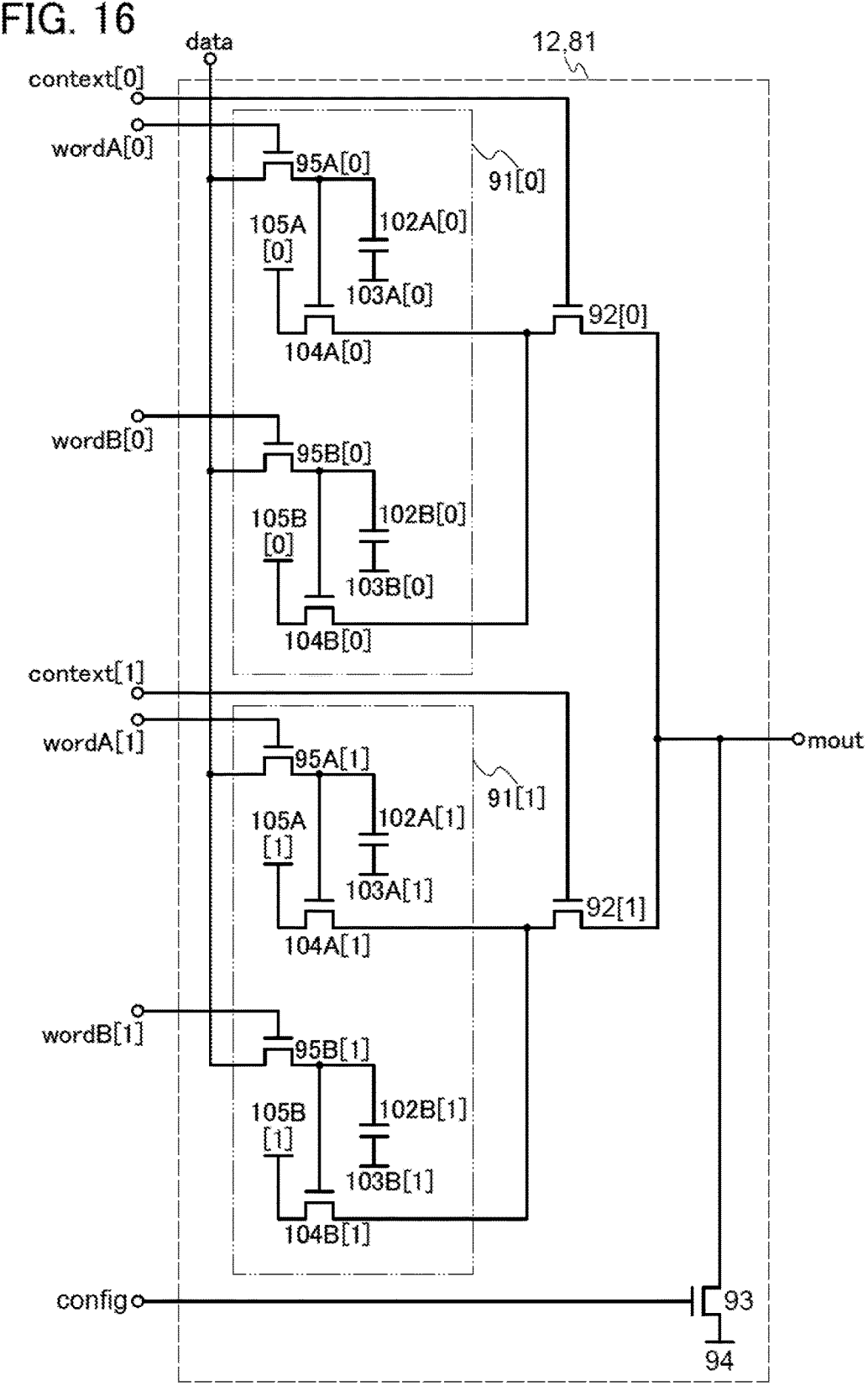
FIG. 16 is a circuit diagram illustrating a configuration example of a configuration memory.

The memory cell 91[0] and the memory cell 91[1] illustrated in FIG. 13 can have configurations illustrated in FIG. 16, for example. The memory cell 91[0] illustrated in FIG. 16 includes a transistor 95A[0], a transistor 95B[0], a capacitor 102A[0], a capacitor 102B[0], a wiring 103A[0], a wiring 103B[0], a transistor 104A[0], a transistor 104B[0], a wiring 105A[0], and a wiring 105B[0]. The memory cell 91[1] includes a transistor 95A[1], a transistor 95B[1], a capacitor 102A[1], a capacitor 102B[1], a wiring 103A[1], a wiring 103B[1], a transistor 104A[1], a transistor 104B[1], a wiring 105A[1], and a wiring 105B[1].

Although described here is an example where the transistor 95A[0], the transistor 95B[0], the transistor 95A[1], the transistor 95B[1], the transistor 104A[0], the transistor 104B[0], the transistor 104A[1], and the transistor 104B[1] are all n-ch transistors, one embodiment of the present invention is not limited thereto; some or all of the transistors may be p-ch transistors.

One of a source and a drain of the transistor 95A[0] is electrically connected to one terminal of the capacitor 102A[0] and a gate of the transistor 104A[0]. One of a source and a drain of the transistor 95B[0] is electrically connected to one terminal of the capacitor 102B[0] and a gate of the transistor 104B[0]. The other terminal of the capacitor 102A[0] is electrically connected to the wiring 103A[0]. The other terminal of the capacitor 102B[0] is electrically connected to the wiring 103B[0].

One of a source and a drain of the transistor 104A[0] is electrically connected to one of a source and a drain of the transistor 92[0] and one of a source and a drain of the transistor 104B[0]. The other of the source and the drain of the transistor 104A[0] is electrically connected to the wiring 105A[0]. The other of the source and the drain of the transistor 104B[0] is electrically connected to the wiring 105B[0].

One of a source and a drain of the transistor 95A[1] is electrically connected to one terminal of the capacitor 102A[1] and a gate of the transistor 104A[1]. One of a source and a drain of the transistor 95B[1] is electrically connected to one terminal of the capacitor 102B[1] and a gate of the transistor 104B[1]. The other terminal of the capacitor 102A[1] is electrically connected to the wiring 103A[1]. The other terminal of the capacitor 102B[1] is electrically connected to the wiring 103B[1].

One of a source and a drain of the transistor 104A[1] is electrically connected to one of a source and a drain of the transistor 92[1] and one of a source and a drain of the transistor 104B[1]. The other of the source and the drain of the transistor 104A[1] is electrically connected to the wiring 105A[1]. The other of the source and the drain of the transistor 104B[1] is electrically connected to the wiring 105B[1].

The wiring 103A[0], the wiring 103B[0], the wiring 103A[1], and the wiring 103B[1] can have a low potential, for example. Furthermore, the wiring 105A[0] and the wiring 105B[0] are supplied with potentials with opposite logic levels, and the wiring 105A[1] and the wiring 105B[1] are supplied with potentials with opposite logic levels. For example, the wiring 105B[0] is at the low potential when the wiring 105A[0] is at the high potential. For another example, the wiring 105B[1] is at the low potential when the wiring 105A[1] is at the high potential.

The signal data can be input to the other of the source and the drain of the transistor 95A[0], the other of the source and the drain of the transistor 95B[0], the other of the source and the drain of the transistor 95A[1], and the other of the source and the drain of the transistor 95B[1]. A signal wordA[0] can be input to a gate of the transistor 95A[0]. A signal wordB[0] can be input to a gate of the transistor 95B[0]. A signal wordA[1] can be input to a gate of the transistor 95A[1]. A signal wordB[1] can be input to a gate of the transistor 95B[1].

Note that two types of signals word[0] can be input to the memory cell 91[0] with the configuration illustrated in FIG. 16. In addition, two types of signals word[1] can be input to the memory cell 91[1] with the configuration illustrated in FIG. 16. The two types of signals word[0] are described as the signal wordA[0] and the signal wordB[0], and the two types of signals word[1] are described as the signal wordA[1] and the signal wordB[1].

The transistor 95A[0] has a function of controlling the writing of configuration data to the capacitor 102A[0]. The transistor 95B[0] has a function of controlling the writing of configuration data to the capacitor 102B[0]. The transistor 95A[1] has a function of controlling the writing of configuration data to the capacitor 102A[1]. The transistor 95B[1] has a function of controlling the writing of configuration data to the capacitor 102B[1].

The capacitor 102A[0], the capacitor 102B[0], the capacitor 102A[1], and the capacitor 102B[1] each have a function of retaining configuration data. The transistor 104A[0] has a function of amplifying configuration data retained in the capacitor 102A[0]. The transistor 104B[0] has a function of amplifying configuration data retained in the capacitor 102B[0]. The transistor 104A[1] has a function of amplifying configuration data retained in the capacitor 102A[1]. The transistor 104B[1] has a function of amplifying configuration data retained in the capacitor 102B[1].

Next, procedures for retention and reading of configuration data in the memory cell 91[0] and the memory cell 91[1] with the configurations illustrated in FIG. 16 will be described. Note that the wiring 105A[0] and the wiring 105A[1] are set at a high potential and the wiring 105B[0] and the wiring 105B[1] are set at low potential.

To retain high-potential configuration data in the memory cell 91[0], the signal data and the signal wordA[0] are set at the high potential. As a result, a charge is held in the capacitor 102A[0] and a high potential is applied to the gate of the transistor 104A[0]. Thus, the transistor 104A[0] is turned on. Since the wiring 105A[0] is at the high potential, a high-potential signal is output as the output signal mout when the context signal context[0] becomes at the high potential and the transistor 92[0] is turned on.

To retain low-potential configuration data in the memory cell 91[0], the signal data and the signal wordB[0] are set at the high potential. As a result, a charge is held in the capacitor 102B[0] and a high potential is applied to the gate of the transistor 104B[0]. Thus, the transistor 104B[0] is turned on. Since the wiring 105B[0] is at the low potential, a low-potential signal is output as the output signal mout when the context signal context[0] becomes at the high potential and the transistor 92[0] is turned on.

To retain high-potential configuration data in the memory cell 91[1], the signal data and the signal wordA[1] are set at the high potential. To retain low-potential configuration data in the memory cell 91[1], the signal data and the signal wordB[1] are set at the high potential.

In the memory cell 91[0] with the configuration illustrated in FIG. 16, a reduction in the off-state current of the transistor 95A[0] leads to long retention time of a charge written to the capacitor 102A[0], and a reduction in the off-state current of the transistor 95B[0] leads to long retention time of a charge written to the capacitor 102B[0]. Furthermore, a reduction in the off-state current of the transistor 95A[1] leads to long retention time of a charge written to the capacitor 102A[1], and a reduction in the off-state current of the transistor 95B[1] leads to long retention time of a charge written to the capacitor 102B[1]. Here, off-state current refers to current that flows between a source and a drain when a transistor is off. In the case of an n-ch transistor, for example, when its threshold voltage is approximately 0 V to 2 V, current flowing between a source and a drain when a gate voltage is negative with respect to source and drain voltages can be referred to as off-state current. An ultralow off-state current means that, for example, an off-state current per micrometer of channel width is lower than or equal to 100 zA (zeptoamperes). Since the off-state current is preferably as low as possible, the normalized off-state current is preferably lower than or equal to 10 zA/μm or lower than or equal to 1 zA/μm, further preferably lower than or equal to 10 yA/μm (yA: yoctoamperes). Note that 1 zA is $1 \times 10^{-21}$ A and 1 yA is $1 \times 10^{-24}$ A.

To obtain such an ultralow off-state current, a channel formation region of a transistor is formed using a semiconductor with a wide bandgap. An example of such a semiconductor is a metal oxide. A metal oxide has a bandgap of 3.0 eV or more; thus, a transistor whose semiconductor layer contains a metal oxide (an OS transistor) has a low leakage current caused by thermal excitation and has an ultralow off-state current. A channel formation region of an OS transistor is preferably formed using a metal oxide containing at least one of indium (In) and zinc (Zn). A typical example of such a metal oxide is an In-M-Zn oxide (the element M is Al, Ga, Y, or Sn, for example). By reducing impurities serving as electron donors, such as moisture or hydrogen, and also reducing oxygen vacancies, an i-type (intrinsic) or a substantially i-type metal oxide can be obtained. Here, such a metal oxide can be referred to as a highly purified metal oxide. By using a highly purified metal oxide, the off-state current normalized by channel width of an OS transistor can be as low as several yoctoamperes per micrometer to several zeptoamperes per micrometer.

In addition, the OS transistor has lower temperature dependence of off-state current characteristics than a transistor whose semiconductor layer is formed using silicon (hereinafter such a transistor is referred to as a Si transistor). Thus, the normalized off-state current of the OS transistor can be less than or equal to 100 zA even at high temperatures (e.g., 100° C. or higher). Accordingly, the use of an OS transistor as the transistor 95A[0] enables a charge written to the capacitor 102A[0] to be retained for a long time even in a high temperature environment, and the use of an OS transistor as the transistor 95B[0] enables a charge written to the capacitor 102B[0] to be retained for a long time even in a high temperature environment. Furthermore, the use of an OS transistor as the transistor 95A[1] enables a charge written to the capacitor 102A[1] to be retained for a long time even in a high temperature environment, and the use of an OS transistor as the transistor 95B[1] enables a charge written to the capacitor 102B[1] to be retained for a long time even in a high temperature environment. According to the above, a semiconductor device that is highly reliable even in a high temperature environment can be obtained.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor layer of a transistor is called an oxide semiconductor in some cases. That is, in the case where a metal oxide has at least one of amplifying, rectifying, and switching effects, the metal oxide can be referred to as a metal oxide semiconductor (OS, for short). In addition, an OS FET is a transistor including a metal oxide or an oxide semiconductor.

In this specification and the like, a metal oxide including nitrogen is also called a metal oxide in some cases. Moreover, a metal oxide including nitrogen may be called a metal oxynitride.

In this specification and the like, "c-axis aligned crystal (CAAC)" or "cloud-aligned composite (CAC)" may be stated. CAAC refers to an example of a crystal structure, and CAC refers to an example of a function or a material composition.

In this specification and the like, a CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or CAC metal oxide, separation of the functions can maximize each function.

In this specification and the like, the CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS or the CAC metal oxide, the conductive regions and the insulating regions each have a size of more than or equal to 0.5 nm and less than or equal to 10 nm, preferably more than or equal to 0.5 nm and less than or equal to 3 nm and are dispersed in the material, in some cases.

The CAC-OS or the CAC metal oxide includes components having different band gaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used in a channel region of a transistor, high current drive capability in the on state of the transistor, that is, high on-state current and high field-effect mobility, can be obtained.

In other words, a CAC-OS or CAC metal oxide can be called a matrix composite or a metal matrix composite.

Note that the transistor 92[0], the transistor 92[1], the transistor 93, the transistor 104A[0], the transistor 104B[0], the transistor 104A[1], and the transistor 104B[1] can be Si transistors. Since Si transistors have higher field-effect mobility than OS transistors, the amounts of current flowing in the transistor 92[0], the transistor 92[1], the transistor 93, the transistor 104A[0], the transistor 104B[0], the transistor 104A[1], and the transistor 104B[1] can be increased. Thus, the semiconductor device included in the broadcasting system 100 can operate at high speed.

Alternatively, the transistor 92[0], the transistor 92[1], the transistor 93, the transistor 104A[0], the transistor 104B[0], the transistor 104A[1], and the transistor 104B[1] can be OS transistors. In other words, all of the transistors included in the configuration memory 12 and the configuration memory 81 can be OS transistors.

The configurations of the memory cell 91[0] and the memory cell 91[1] are not limited to those illustrated in FIG. 14A to FIG. 16, and a resistance random access memory (ReRAM) or a flash memory may be included, for example.

Note that the circuit configurations illustrated in FIG. 12A to FIG. 16 are only examples, and any other configuration can be employed as long as one embodiment of the present invention can be achieved.

<Operation Method of Controller>

An operation example of the controller 10 having the configuration illustrated in FIG. 7A will be described using a timing chart in FIG. 17A, and an operation example of the controller 10 having the configuration illustrated in FIG. 7B will be described using a timing chart in FIG. 17B.

Figure 17A:
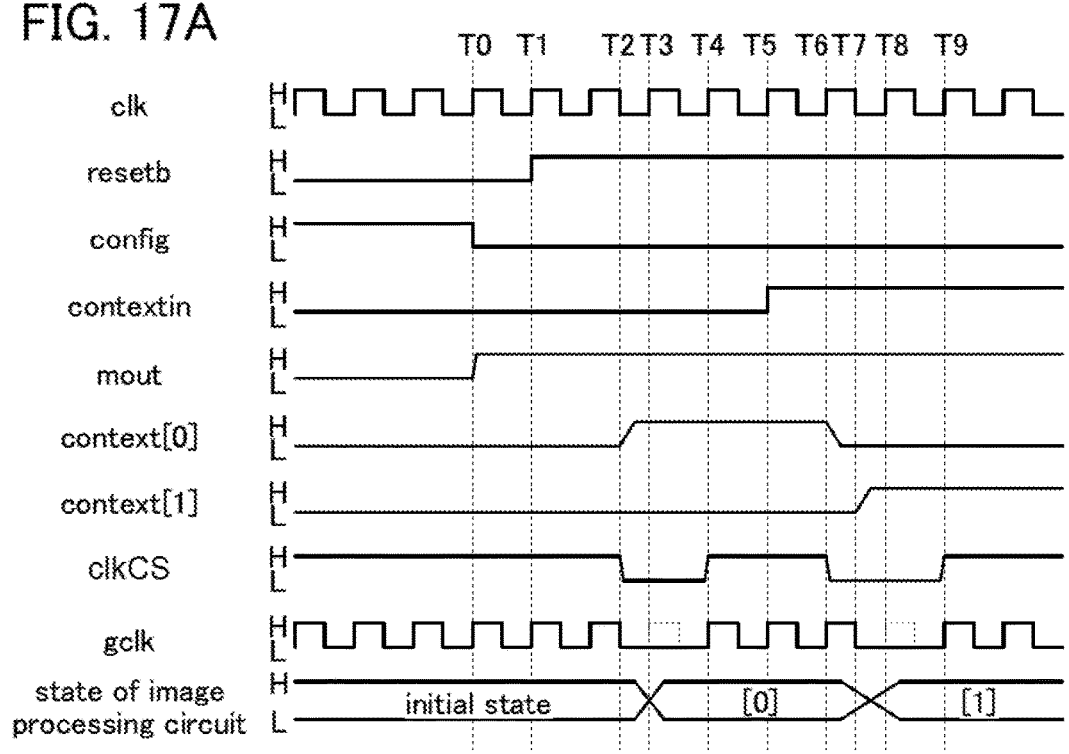
FIGS. 17A and 17B are timing charts each illustrating an operation example of a controller.
Figure 17B:
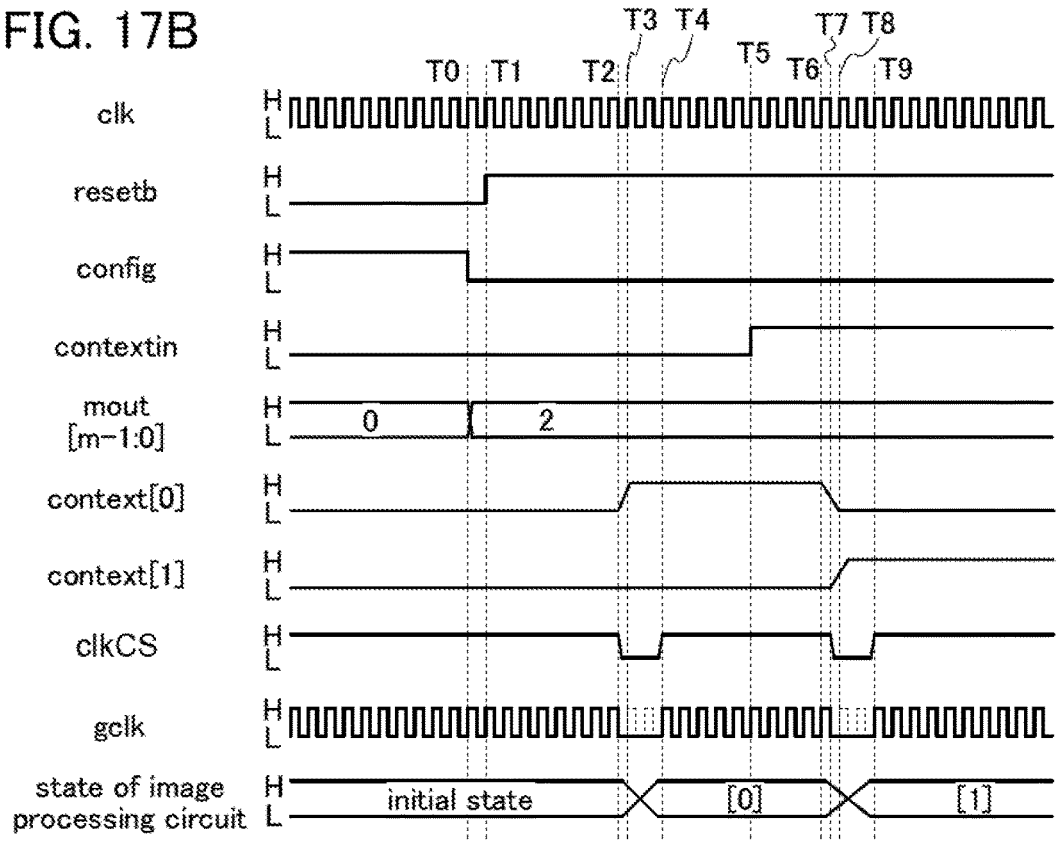

The timing charts in FIGS. 17A and 17B show the potentials of the clock signal clk, the reset inverted signal resetb, the configuration state signal config, the context state signal contextin, the output signal mout, the context signal context[0], the context signal context[1], the clock control signal clkCS, and the clock signal gclk. The timing charts in FIGS. 17A and 17B also show the state of an image processing circuit such as the image processing circuit 307 or 325 that includes a PLE and can be operated with the controller 10.

When the context signal context[0] is at a high potential, the image processing circuit can have a configuration based on configuration data retained in the memory cell 91[0] included in the configuration memory 81 or the like, for example. When the context signal context[1] is at a high potential, the image processing circuit can have a configuration based on configuration data retained in the memory cell 91[1] included in the configuration memory 81 or the like, for example.

In FIGS. 17A and 17B, the clock signal gclk changes at the same time as the clock signal clk except for the case of clock gating. However, there is a lag by propagation delay such as gate delay or RC delay in practice.

First, an operation example of the controller 10 having the configuration illustrated in FIG. 7A is described using the timing chart in FIG. 17A. Before Time T0, the configuration memory 12 performs configuration operation, and the configuration state signal config is at the high potential. The reset inverted signal resetb, the context state signal contextin, the output signal mout, the context signal context[0], and the context signal context[1] are at the low potential. In addition, the clock control signal clkCS is at the high potential.

In the image processing circuit, a potential that determines a circuit configuration is fixed at the initial value. In the case where the PLE such as the PLE 346 included in the image processing circuit has the configuration illustrated in FIG. 12A, for example, the signals in[0] to in[s−1] and signals output from the configuration memories 81[0] to 81[$2^s$] are all at the low potential. In that case, the circuit configuration of the image processing circuit is not determined, i.e., the image processing circuit is in the initial state.

At Time T0, the configuration memory 12 terminates configuration operation, and the configuration state signal config is set at the low potential in synchronization with the rise of the clock signal clk. After that, the potential of the output signal mout output from the configuration memory 12 becomes a potential corresponding to configuration data that is retained in the memory cell 91[0] illustrated in FIG. 13. Here, the output signal mout is at the high potential.

At Time T1, the reset inverted signal resetb is set at the high potential in synchronization with the rise of the clock signal clk. Thus, the reset states of the flip-flop circuits 83 and the like included in the image processing circuit are canceled.

At Time T2, the context signal context[0] is set at the high potential in synchronization with the fall of the clock signal clk. Thus, context switching starts, and the transition of the configuration of the image processing circuit from the initial state to the state [0] starts. When the clock control signal clkCS is set to the low potential at this time, the output of the clock signal gclk to the image processing circuit can be stopped, i.e., clock gating can be performed.

At Time T3, the clock signal clk rises, but the clock signal gclk remains at the low potential because clock gating for one clock is performed. Thus, data setup for the flip-flop circuits 83 and the like included in the image processing circuit can be prevented until the next rise of the clock signal clk. Although the transition from the initial state to the state [0] is not completed at Time T3, the transition to the state [0] is completed at the next rise of the clock signal gclk; thus, data setup for the flip-flop circuits 83 and the like included in the image processing circuit during context switching can be prevented. Accordingly, abnormal-data setup for the flip-flop circuits 83 and the like included in the image processing circuit can be prevented. This allows the data transfer between before and after context switching to be performed normally. As a result, malfunction during context switching can be prevented, so that both the operating speed and the reliability of the semiconductor device can be improved in the broadcasting system 100.

At Time T4, the clock control signal clkCS becomes at the high potential and clock gating terminates. As a result, the potential of the clock signal gclk corresponds to the potential of the clock signal clk.

At Time T5, the context state signal contextin is set to the high potential. Note that the context state signal contextin can be controlled asynchronously with the clock signal clk. This means that the context state signal contextin does not need to be set to the high potential at the time when the clock signal clk rises, for example.

At Time T6, the context signal context[0] is set to the low potential in synchronization with the rise of the clock signal clk. Then, at Time T7 when the clock signal clk falls, the context signal context[1] becomes at the high potential. Thus, context switching starts, and the transition of the configuration of the image processing circuit from the state

[0] to the state [1] starts. When the clock control signal clkCS is set to the low potential at this time, the output of the clock signal gclk to the image processing circuit can be stopped, i.e., clock gating can be performed.

At Time T8, the clock signal clk rises, but the clock signal gclk remains at the low potential because clock gating for one clock is performed. Thus, data setup for the flip-flop circuits 83 and the like included in the image processing circuit can be prevented until the next rise of the clock signal clk. Although the transition from the state [0] to the state [1] is not completed at Time T8, the transition to the state [1] is completed at the next rise of the clock signal gclk; thus, data setup for the flip-flop circuits 83 and the like included in the image processing circuit during context switching can be prevented. Accordingly, abnormal-data setup for the flip-flop circuits 83 and the like included in the image processing circuit can be prevented. This allows the data transfer between before and after context switching to be performed normally. As a result, malfunction during context switching can be prevented, so that both the operating speed and the reliability of the semiconductor device can be improved in the broadcasting system 100.

At Time T9, the clock control signal clkCS becomes at the high potential and clock gating terminates. As a result, the potential of the clock signal gclk corresponds to the potential of the clock signal clk.

Note that in the case where the output signal mout is at the low potential from Time T3 and Time T4 and from Time T8 to Time T9, clock gating is not performed and the potential of the clock signal gclk becomes equal to the potential of the clock signal clk. Except for the above, the operation of the controller 10 is the same as that when the output signal mout is at the high potential.

Next, the operation of the controller 10 and the like having the configuration illustrated in FIG. 7B is described using the timing chart in FIG. 17B. Before Time T0, the configuration memories 12[0] to 12[m−1] perform configuration operation, and the configuration state signal config is at the high potential. The reset inverted signal resetb, the context state signal contextin, the context signal context[0], the context signal context[1], and the output signals mout[0] to mout[m−1] are at the low potential. In addition, the clock control signal clkCS is at the high potential.

At Time T0, the configuration memories 12[0] to 12[m−1] terminate configuration operation, and the configuration state signal config is set at the low potential in synchronization with the rise of the clock signal clk. After that, the potentials of the output signals mout[0] to mout[m−1] become potentials corresponding to configuration data that is retained in the memory cell 91[0] included in the configuration memories 12[0] to 12[m−1]. Here, the output signal mout[1] is at the high potential and the other output signals mout are all at the low potential.

Note that when the output signal mout[0] is the LSB and the output signal mout[m−1] is the MSB, the case where the output signals mout[0] to mout[m−1] are all at the low potential is "0" in decimal form. Furthermore, the case where the output signal mout[1] is at the high potential and the other output signals mout are all at the low potential is "2" in decimal form. In FIG. 17B, the case where the output signals mout[0] to mout[m−1] are all at the low potential is shown as "0" and the case where the output signal mout[1] is at the high potential and the other output signals mout are all at the low potential is shown as "2."

The operation at Time T1, Time T2, Time T4 to Time T7, and Time T9 is similar to that illustrated in FIG. 17A. Clock gating for two clocks is performed at Time T3 and Time T8.

In that case, the clock frequency of the clock signal clk can be further increased as compared with the case where clock gating for one clock is performed. This results in an increase in the operating speed of the broadcasting system 100.

Note that the operations shown in FIGS. 17A and 17B are only examples. For example, the operation performed in synchronization with the rise of the clock signal clk or the clock signal gclk in FIGS. 17A and 17B can be performed in synchronization with the fall of the clock signal clk or the clock signal gclk. Furthermore, for example, the operation performed in synchronization with the fall of the clock signal clk or the clock signal gclk in FIGS. 17A and 17B can be performed in synchronization with the rise of the clock signal clk or the clock signal gclk.

The structures illustrated in FIG. 1, FIG. 3A to FIG. 5, and FIG. 7A to FIG. 16 can be combined as appropriate.

This embodiment can be implemented in appropriate combination with any of the structures described in the other embodiments.

Embodiment 2

This embodiment will describe a semiconductor device used for the broadcasting system.

<Image Sensor>

Figure 18A:
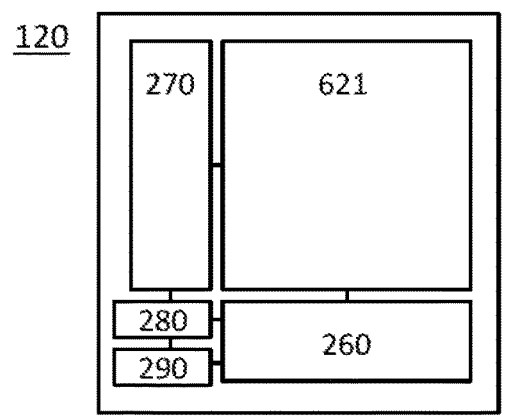
FIGS. 18A to 18C illustrate configuration examples an image sensor.

FIG. 18A is a plan view illustrating a configuration example of the image sensor 120. The image sensor 120 includes a pixel portion 621 and circuits 260, 270, 280, and 290. In this specification and the like, the circuits 260 to 290 and the like may be referred to as a "peripheral circuit" or a "driver." For example, the circuit 260 can be regarded as part of the peripheral circuit.

Figure 18B:
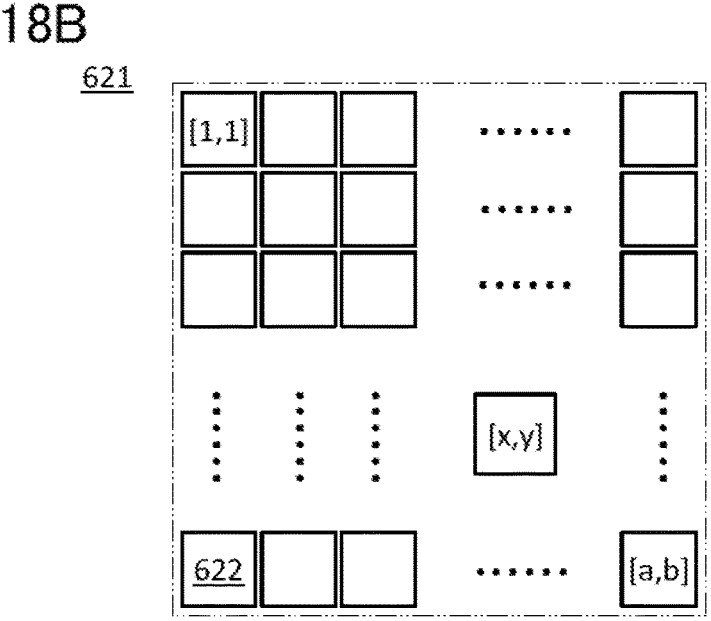

FIG. 18B illustrates a configuration example of the pixel portion 621. The pixel portion 621 includes a plurality of pixels 622 arranged in a matrix with a rows and b columns (a and b are each a natural number of greater than or equal to 2). Note that in FIG. 18B, x is a natural number of greater than or equal to 1 and smaller than or equal to a, and y is a natural number of greater than or equal to 1 and smaller than or equal to b.

The circuits 260 and 270 are connected to the plurality of pixels 622 and have a function of supplying signals for driving the plurality of pixels 622. The circuit 260 may have a function of processing an analog signal output from the pixels 622. The circuit 280 may have a function of controlling the operation timing of the peripheral circuit. For example, the circuit 280 may have a function of generating a clock signal. Furthermore, the circuit 280 may have a function of converting the frequency of a clock signal supplied from the outside. Moreover, the circuit 280 may have a function of supplying a reference potential signal (e.g., a ramp wave signal).

The peripheral circuit includes at least one of a logic circuit, a switch, a buffer, an amplifier circuit, and a converter circuit. Alternatively, transistors or the like included in the peripheral circuit may be formed using part of a semiconductor that is formed to form the pixel 622, which will be described later. A semiconductor device such as an IC chip may be used as part or the whole of the peripheral circuit.

Note that in the peripheral circuit, at least one of the circuits 260 to 290 may be omitted. For example, when one of the circuits 260 and 290 additionally has a function of the other of the circuits 260 and 290, the other of the circuits 260 and 290 may be omitted. For another example, when one of the circuits 270 and 280 additionally has a function of the other of the circuits 270 and 280, the other of the circuits 270 and 280 may be omitted. For further another example, a function of another peripheral circuit may be added to one of the circuits 260 to 290 to omit that peripheral circuit.

Figure 18C:
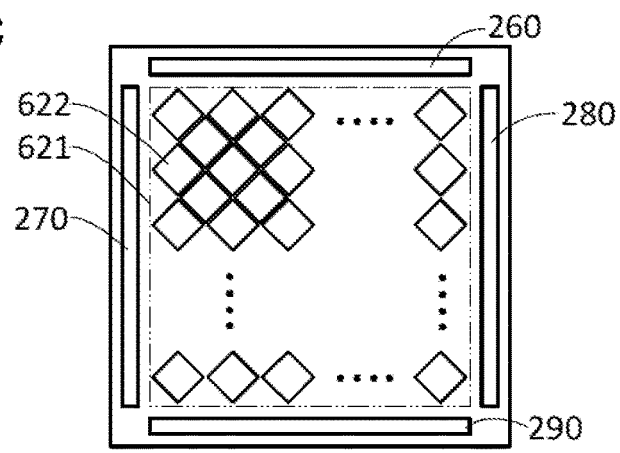

As illustrated in FIG. 18C, the circuits 260 to 290 may be provided along the periphery of the pixel portion 621. In the pixel portion 621 included in the image sensor 120, the pixels 622 may be obliquely arranged. When the pixels 622 are obliquely arranged, the distance between pixels (pitch) can be shortened in the row direction and the column direction. Accordingly, the quality of an image taken with the image sensor 120 can be improved.

The pixel portion 621 may be provided over the circuits 260 to 290 to overlap with the circuits 260 to 290. The provision of the pixel portion 621 over the circuits 260 to 290 to overlap with the circuits 260 to 290 can increase the area occupied by the pixel portion 621 for the image sensor 120. Accordingly, the light sensitivity, the dynamic range, the resolution, the reproducibility of a taken image, or the integration degree of the image sensor 120 can be increased.

The pixels 622 included in the image sensor 120 are used as subpixels, and each of the plurality of pixels 622 is provided with a filter that transmits light in a different wavelength range (color filter), whereby data for achieving color image display can be obtained.

Figure 19A:
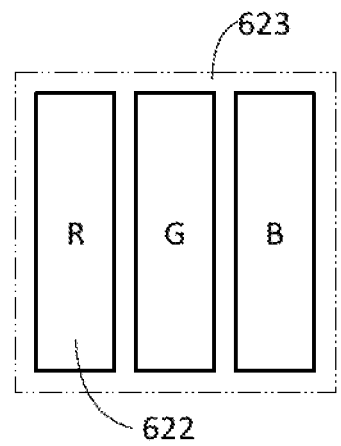
FIGS. 19A to 19D illustrate configuration examples of an image sensor.

FIG. 19A is a plan view illustrating an example of a pixel 623 with which a color image is obtained. The pixel 623 in FIG. 19A is provided with the pixel 622 provided with a color filter that transmits light in a red (R) wavelength range (also referred to as a "pixel 622R"), the pixel 622 provided with a color filter that transmits light in a green (G) wavelength range (also referred to as a "pixel 622G"), and the pixel 622 provided with a color filter that transmits light in a blue (B) wavelength range (also referred to as a "pixel 622B"). The pixel 622R, the pixel 622G, and the pixel 622B collectively function as one pixel 623.

The color filter used in the pixel 623 is not limited to red (R), green (G), and blue (B) color filters, and color filters that transmit light of cyan (C), yellow (Y), and magenta (M) may be used. The pixels 622 that sense light in at least three different wavelength ranges are provided in one pixel 623, whereby a full-color image can be obtained.

Figure 19B:
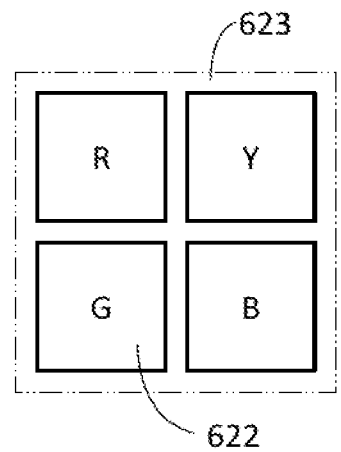
Figure 19C:
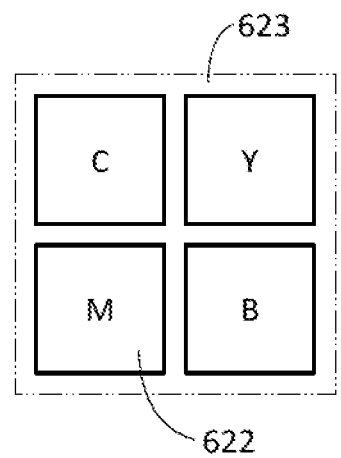

FIG. 19B illustrates the pixel 623 including the pixel 622 provided with a color filter that transmits yellow (Y) light, in addition to the pixels 622 provided with the color filters that transmit red (R), green (G), and blue (B) light. FIG. 19C illustrates the pixel 623 including the pixel 622 provided with the color filter that transmits blue (B) light, in addition to the pixels 622 provided with the color filters that transmit cyan (C), yellow (Y), and magenta (M) light. When the pixels 622 that sense light in four or more different wavelength ranges are provided in one pixel 623, the color reproducibility of an obtained image can be further increased.

Figure 19D:
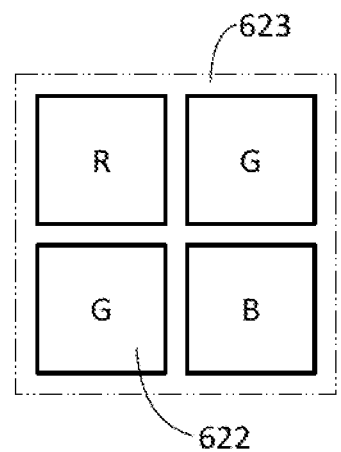

The pixel number ratio (or the ratio of light-receiving area) of the pixel 622R to the pixel 622G and the pixel 622B need not necessarily be 1:1:1. The pixel number ratio (the ratio of light-receiving area) of red to green and blue may be 1:2:1 (Bayer arrangement), as illustrated in FIG. 19D. Alternatively, the pixel number ratio (the ratio of light-receiving area) of red to green and blue may be 1:6:1.

Although the number of pixels 622 used in the pixel 623 may be one, two or more is preferable. For example, when the number of pixels 622 that sense light in the same wavelength range is two or more, the redundancy can be increased, and the reliability of the image sensor 120 can be increased.

When an infrared (IR) filter that transmits infrared light and absorbs or reflects light with a wavelength shorter than or equal to that of visible light is used as the filter, the image sensor 120 can sense infrared light. When an ultraviolet (UV) filter that transmits ultraviolet light and absorbs or reflects light with a wavelength longer than or equal to that of visible light is used as the filter, the image sensor 120 can sense ultraviolet light. When a scintillator that converts a radiant ray into ultraviolet light or visible light is used as the filter, the image sensor 120 can also function as a radiation detector that senses an X-ray or a γ-ray.

When a neutral density (ND) filter (dark filter) is used as the filter, output saturation, which occurs when a large amount of light is incident on a photoelectric conversion element (light-receiving element), can be prevented. With a combination of ND filters with different dimming capabilities, the dynamic range of the image sensor can be increased.

Figure 20A:
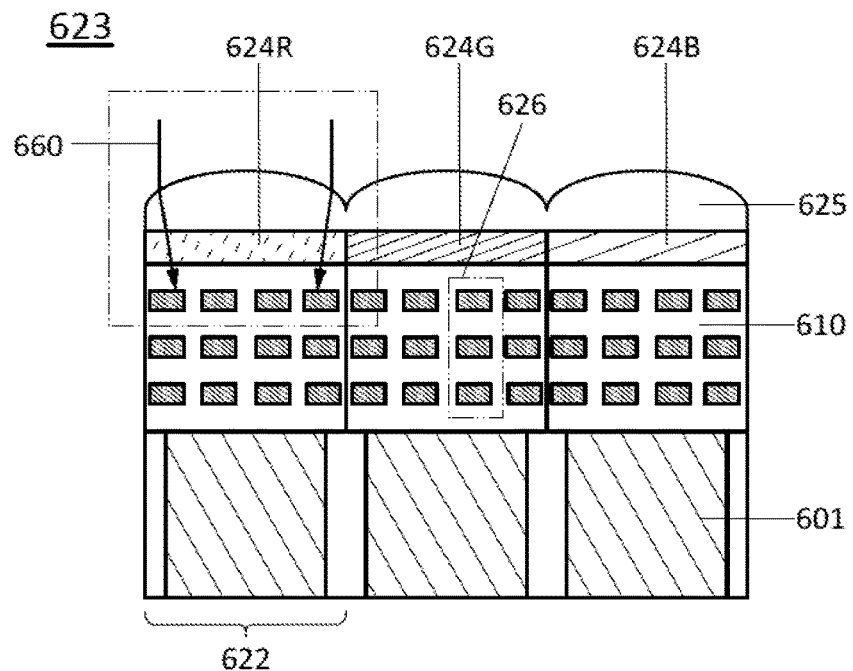
FIGS. 20A and 20B illustrate configuration examples of an image sensor.

Besides the above-described filter, the pixel 622 may be provided with a lens. An arrangement example of the pixel 622, a filter 624, and a lens 625 is described with reference to cross-sectional views in FIGS. 20A and 20B. With the lens 625, incident light can be efficiently received by a photoelectric conversion element. Specifically, as illustrated in FIG. 20A, light 660 can enter a photoelectric conversion element 601 through the lens 625, the filter 624 (a filter 624R, a filter 624G, and a filter 624B), a pixel driver 610, and the like which are formed in the pixel 622.

Figure 20B:
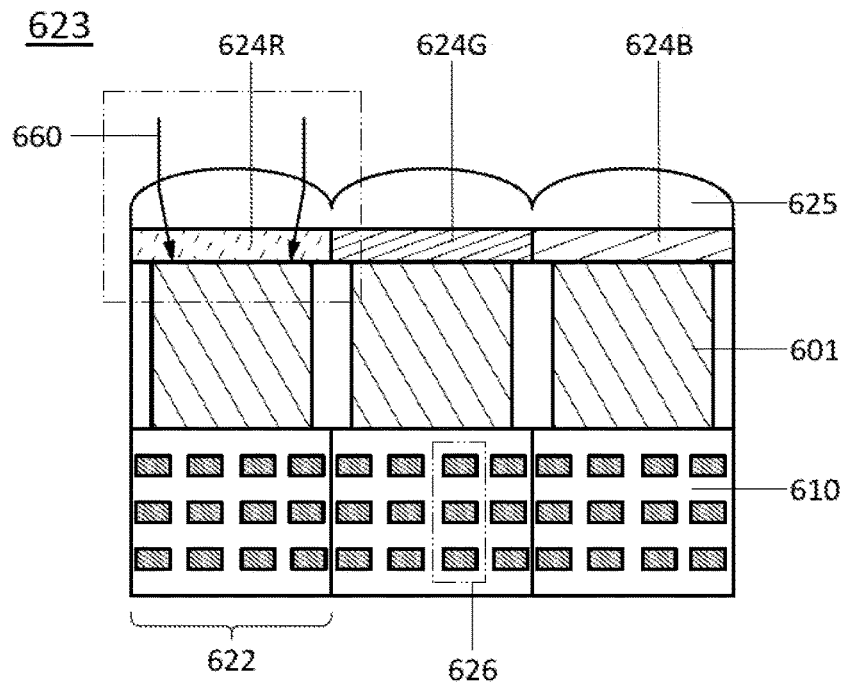

However, as illustrated in a region surrounded by a two-dot chain line, part of the light 660 indicated by arrows may be blocked by part of a wiring group 626, a transistor, a capacitor, and/or the like. Therefore, as illustrated in FIG. 20B, the lens 625 and the filter 624 may be formed on the photoelectric conversion element 601 side, so that the incident light can be efficiently received by the photoelectric conversion element 601. When the light 660 is incident from the photoelectric conversion element 601 side, the image sensor 120 can have high light sensitivity.

Figure 21A:
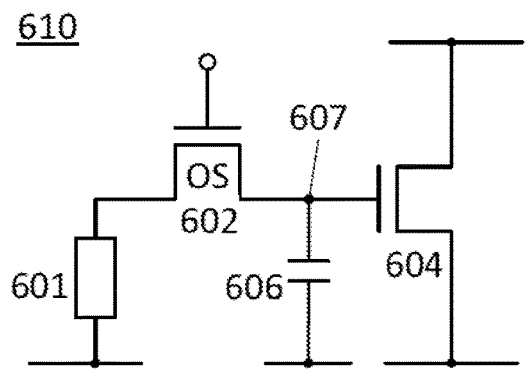
FIGS. 21A to 21C are circuit diagrams illustrating configuration examples of an image sensor.
Figure 21B:
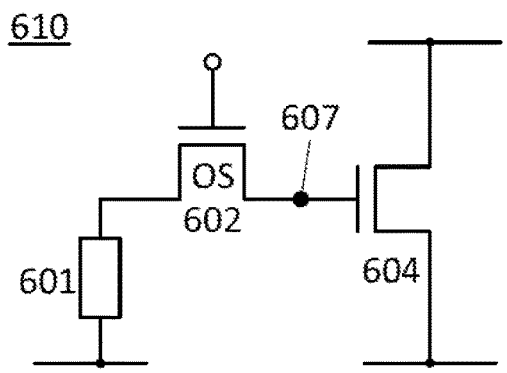
Figure 21C:
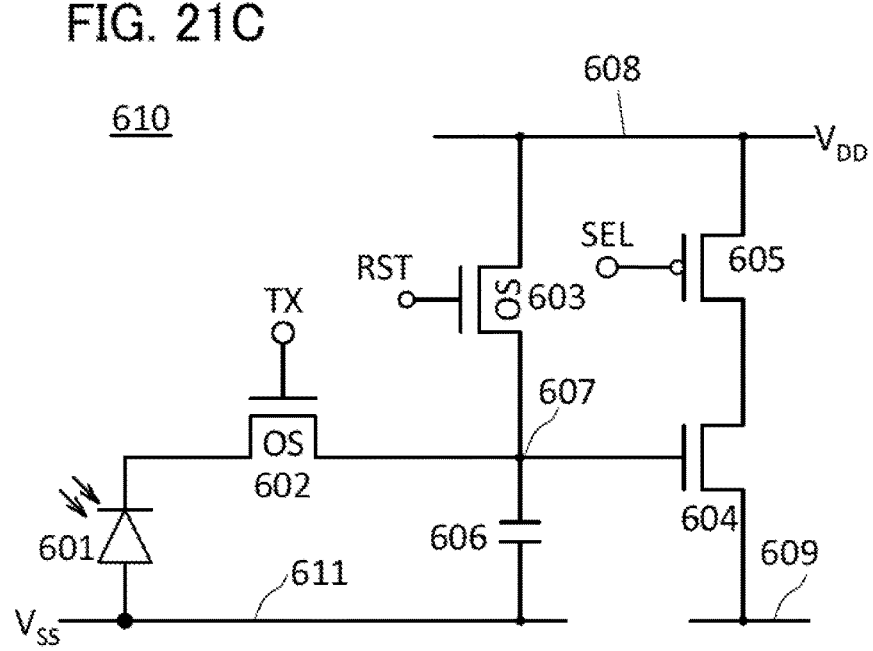

FIGS. 21A to 21C illustrate examples of the pixel driver 610 that can be used for the pixel portion 621. The pixel driver 610 illustrated in FIG. 21A includes a transistor 602, a transistor 604, and a capacitor 606 and is connected to the photoelectric conversion element 601. One of a source and a drain of the transistor 602 is electrically connected to the photoelectric conversion element 601, and the other of the source and the drain of the transistor 602 is electrically connected to a gate of the transistor 604 through a node 607 (a charge accumulation portion).

"OS" indicates that it is preferable to use an OS transistor described in Embodiment 1. The same applies to the other drawings. Since the off-state current of the OS transistor is extremely low, the capacitor 606 can be made small. Alternatively, the capacitor 606 can be omitted as illustrated in FIG. 21B. Furthermore, when the transistor 602 is an OS transistor, the potential of the node 607 is less likely to change. Thus, an image sensor that is less likely to be affected by noise can be provided. Note that the transistor 604 may be an OS transistor.

A diode element formed using a silicon substrate with a PN junction or a PIN junction can be used as the photoelectric conversion element 601. Alternatively, a PIN diode element or the like formed using an amorphous silicon film, a microcrystalline silicon film, or the like may be used. Alternatively, a diode-connected transistor may be used. Further alternatively, a variable resistor or the like utilizing a photoelectric effect may be formed using silicon, germanium, selenium, or the like.

The photoelectric conversion element may be formed using a material capable of generating electric charge by absorbing radiation. Examples of the material capable of generating electric charge by absorbing radiation include lead iodide, mercury iodide, gallium arsenide, CdTe, and CdZn.

The pixel driver 610 illustrated in FIG. 21C includes the transistor 602, a transistor 603, the transistor 604, a transistor 605, and the capacitor 606 and is connected to the photoelectric conversion element 601. In the pixel driver 610 illustrated in FIG. 21C, a photodiode is used as the photoelectric conversion element 601. One of the source and the drain of the transistor 602 is electrically connected to a cathode of the photoelectric conversion element 601. The other of the source and the drain of the transistor 602 is electrically connected to the node 607. An anode of the photoelectric conversion element 601 is electrically connected to a wiring 611. One of a source and a drain of the transistor 603 is electrically connected to the node 607. The other of the source and the drain of the transistor 603 is electrically connected to a wiring 608. The gate of the transistor 604 is electrically connected to the node 607. One of a source and a drain of the transistor 604 is electrically connected to a wiring 609. The other of the source and the drain of the transistor 604 is electrically connected to one of a source and a drain of the transistor 605. The other of the source and the drain of the transistor 605 is electrically connected to the wiring 608. One electrode of the capacitor 606 is electrically connected to the node 607. The other electrode of the capacitor 606 is electrically connected to the wiring 611.

The transistor 602 can function as a transfer transistor. A gate of the transistor 602 is supplied with a transfer signal TX. The transistor 603 can function as a reset transistor. A gate of the transistor 603 is supplied with a reset signal RST. The transistor 604 can function as an amplifier transistor. The transistor 605 can function as a selection transistor. A gate of the transistor 605 is supplied with a selection signal SEL. Moreover, $V_{DD}$ is supplied to the wiring 608, and Vss is supplied to the wiring 611.

Next, the operation of the pixel driver 610 in FIG. 21C will be described. First, the transistor 603 is turned on, so that $V_{DD}$ is supplied to the node 607 (reset operation). Then, the transistor 603 is turned off, so that $V_{DD}$ is held in the node 607. Next, the transistor 602 is turned on, so that the potential of the node 607 is changed in accordance with the amount of light received by the photoelectric conversion element 601 (accumulation operation). After that, the transistor 602 is turned off, so that the potential of the node 607 is held. Then, the transistor 605 is turned on, so that a potential corresponding to the potential of the node 607 is output from the wiring 609 (selection operation). By measuring the potential of the wiring 609, the amount of light received by the photoelectric conversion element 601 can be determined.

An OS transistor is preferably used as each of the transistors 602 and 603. Since the off-state current of the OS transistor can be extremely low as described above, the capacitor 606 can be small or omitted. Furthermore, when the transistors 602 and 603 are OS transistors, the potential of the node 607 is less likely to change. Thus, the image sensor 120 which is less likely to be affected by noise can be provided.

<Display Device>

The display device 113 includes, for example, at least one of the following: an EL (electroluminescent) element (e.g., an EL element including organic and inorganic materials, an organic EL element, or an inorganic EL element), an LED chip (e.g., a white LED chip, a red LED chip, a green LED chip, or a blue LED chip), a transistor (a transistor which emits light depending on current), an electron emitter, a display element using a carbon nanotube, a liquid crystal element, electronic ink, an electrowetting element, an electrophoretic element, a display element using micro electro mechanical systems (MEMS) (such as a grating light valve (GLV), a digital micromirror device (DMD), a digital micro shutter (DMS), MIRASOL (registered trademark), an interferometric modulation (IMOD) element, a MEMS shutter display element, an optical-interference-type MEMS display element, or a piezoelectric ceramic display), quantum dots, and the like.

Other than the above, the display device may include display media whose contrast, luminance, reflectivity, transmittance, or the like is changed by electric or electromagnetic action. For example, the display device may be a plasma display panel (PDP).

Examples of a display device using an EL element include an EL display. Examples of a display device using an electron emitter include a field emission display (FED) and an SED-type flat panel display (SED: surface-conduction electron-emitter display).

Examples of a display device containing quantum dots in each pixel include a quantum dot display. Note that quantum dots may be provided not as display elements but as part of a backlight used for a liquid crystal display device and the like. The use of quantum dots enables display with high color purity.

A quantum dot is a semiconductor nanocrystal with a size of several nanometers and contains approximately $1\times10^3$ to $1\times10^6$ atoms. Since the energy shift of quantum dots depends on their size, quantum dots made of the same substance emit light with different wavelengths depending on their size; thus, emission wavelengths can be easily adjusted by changing the size of quantum dots.

A quantum dot has an emission spectrum with a narrow peak, leading to emission with high color purity. In addition, a quantum dot is said to have a theoretical external quantum efficiency of approximately 100%, which far exceeds that of a fluorescent organic compound, i.e., 25%, and is comparable to that of a phosphorescent organic compound. Therefore, a quantum dot can be used as a light-emitting material to obtain a light-emitting element having high light-emitting efficiency. Furthermore, since a quantum dot which is an inorganic compound has high inherent stability, a light-emitting element which is favorable also in terms of lifetime can be obtained.

Examples of a material of a quantum dot include a Group 14 element in the periodic table, a Group 15 element in the periodic table, a Group 16 element in the periodic table, a compound of a plurality of Group 14 elements in the periodic table, a compound of an element belonging to any of Groups 4 to 14 in the periodic table and a Group 16 element in the periodic table, a compound of a Group 2 element in the periodic table and a Group 16 element in the periodic table, a compound of a Group 13 element in the periodic table and a Group 15 element in the periodic table, a compound of a Group 13 element in the periodic table and a Group 17 element in the periodic table, a compound of a Group 14 element in the periodic table and a Group 15 element in the periodic table, a compound of a Group 11 element in the periodic table and a Group 17 element in the periodic table, iron oxides, titanium oxides, spinel chalcogenides, and semiconductor clusters.

Specific examples include, but are not limited to, cadmium selenide; cadmium sulfide; cadmium telluride; zinc selenide; zinc oxide; zinc sulfide; zinc telluride; mercury sulfide; mercury selenide; mercury telluride; indium arsenide; indium phosphide; gallium arsenide; gallium phosphide; indium nitride; gallium nitride; indium antimonide; gallium antimonide; aluminum phosphide; aluminum arsenide; aluminum antimonide; lead selenide; lead telluride; lead sulfide; indium selenide; indium telluride; indium sulfide; gallium selenide; arsenic sulfide; arsenic selenide; arsenic telluride; antimony sulfide; antimony selenide; antimony telluride; bismuth sulfide; bismuth selenide; bismuth telluride; silicon; silicon carbide; germanium; tin; selenium; tellurium; boron; carbon; phosphorus; boron nitride; boron phosphide; boron arsenide; aluminum nitride; aluminum sulfide; barium sulfide; barium selenide; barium telluride; calcium sulfide; calcium selenide; calcium telluride; beryllium sulfide; beryllium selenide; beryllium telluride; magnesium sulfide; magnesium selenide; germanium sulfide; germanium selenide; germanium telluride; tin sulfide; tin selenide; tin telluride; lead oxide; copper fluoride; copper chloride; copper bromide; copper iodide; copper oxide; copper selenide; nickel oxide; cobalt oxide; cobalt sulfide; triiron tetraoxide; iron sulfide; manganese oxide; molybdenum sulfide; vanadium oxide; tungsten oxide; tantalum oxide; titanium oxide; zirconium oxide; silicon nitride; germanium nitride; aluminum oxide; barium titanate; a compound of selenium, zinc, and cadmium; a compound of indium, arsenic, and phosphorus; a compound of cadmium, selenium, and sulfur; a compound of cadmium, selenium, and tellurium; a compound of indium, gallium, and arsenic; a compound of indium, gallium, and selenium; a compound of indium, selenium, and sulfur; a compound of copper, indium, and sulfur; and combinations thereof. What is called an alloyed quantum dot, whose composition is represented by a given ratio, may also be used. For example, an alloyed quantum dot of cadmium, selenium, and sulfur is a means effective in obtaining blue light because the emission wavelength can be changed by changing the content ratio of elements.

As the quantum dot, any of a core-type quantum dot, a core-shell quantum dot, a core-multishell quantum dot, and the like can be used. Note that when a core is covered with a shell formed of another inorganic material having a wider band gap, the influence of defects and dangling bonds existing at the surface of a nanocrystal can be reduced. Since such a structure can significantly improve the quantum efficiency of light emission, it is preferable to use a core-shell or core-multishell quantum dot. Examples of the material of a shell include zinc sulfide and zinc oxide.

Quantum dots have a high proportion of surface atoms and thus have high reactivity and easily cohere together. For this reason, it is preferable that a protective agent be attached to, or a protective group be provided at the surfaces of quantum dots. The attachment of the protective agent or the provision of the protective group can prevent cohesion and increase solubility in a solvent. It can also reduce reactivity and improve electrical stability. Examples of the protective agent (or the protective group) include polyoxyethylene alkyl ethers such as polyoxyethylene lauryl ether, polyoxyethylene stearyl ether, and polyoxyethylene oleyl ether; trialkylphosphines such as tripropylphosphine, tributylphosphine, trihexylphosphine, and trioctylphoshine; polyoxyethylene alkylphenyl ethers such as polyoxyethylene n-octylphenyl ether and polyoxyethylene n-nonylphenyl ether; tertiary amines such as tri(n-hexyl)amine, tri(n-octyl)amine, and tri(n-decyl)amine; organophosphorus compounds such as tripropylphosphine oxide, tributylphosphine oxide, trihexylphosphine oxide, trioctylphosphine oxide, and tridecylphosphine oxide; polyethylene glycol diesters such as polyethylene glycol dilaurate and polyethylene glycol distearate; organic nitrogen compounds such as nitrogen-containing aromatic compounds, e.g., pyridines, lutidines, collidines, and quinolines; aminoalkanes such as hexylamine, octylamine, decylamine, dodecylamine, tetradecylamine, hexadecylamine, and octadecylamine; dialkylsulfides such as dibutylsulfide; dialkylsulfoxides such as dimethylsulfoxide and dibutylsulfoxide; organic sulfur compounds such as sulfur-containing aromatic compounds, e.g., thiophenes; higher fatty acids such as a palmitin acid, a stearic acid, and an oleic acid; alcohols; sorbitan fatty acid esters; fatty acid modified polyesters; tertiary amine modified polyurethanes; and polyethyleneimines.

Since the band gaps of quantum dots increase as their size decreases, the size is adjusted as appropriate so that light with a desired wavelength can be obtained. Light emission from the quantum dots is shifted to a blue color side, i.e., a high energy side, as the crystal size decreases; thus, the emission wavelengths of the quantum dots can be adjusted over wavelength regions of spectra of an ultraviolet region, a visible light region, and an infrared region by changing the size of quantum dots. The range of size (diameter) of quantum dots which is usually used is 0.5 nm to 20 nm, preferably 1 nm to 10 nm. The emission spectra are narrowed as the size distribution of the quantum dots gets smaller, and thus light can be obtained with high color purity. The shape of the quantum dots is not particularly limited and may be a spherical shape, a rod shape, a circular shape, or the like. Quantum rods which are rod-like shape quantum dots emit directional light polarized in the c-axis direction; thus, quantum rods can be used as a light-emitting material to obtain a light-emitting element with higher external quantum efficiency.

In most EL elements, to improve luminous efficiency, light-emitting materials are dispersed in host materials and the host materials need to be substances each having a singlet excitation energy or a triplet excitation energy higher than or equal to that of the light-emitting material. In the case of using a blue phosphorescent material, it is particularly difficult to develop a host material which has a triplet excitation energy higher than or equal to that of the blue phosphorescent material and which is excellent in terms of a lifetime. On the other hand, even when a light-emitting layer is composed of quantum dots and made without a host material, the quantum dots enable luminous efficiency to be ensured; thus, a light-emitting element which is favorable in terms of a lifetime can be obtained. In the case where the light-emitting layer is composed of quantum dots, the quantum dots preferably have core-shell structures (including core-multishell structures).

Examples of a display device including a liquid crystal element include a liquid crystal display device (e.g., a transmissive liquid crystal display, a transflective liquid crystal display, a reflective liquid crystal display, a direct-view liquid crystal display, and a projection liquid crystal display).

In a transflective liquid crystal display or a reflective liquid crystal display, some or all of pixel electrodes may function as reflective electrodes. For example, some or all of pixel electrodes may contain aluminum, silver, or the like. In this case, a memory circuit such as an SRAM can be provided under the reflective electrodes, leading to lower power consumption.

Examples of a display device including electronic ink, Electronic Liquid Powder (registered trademark), or an electrophoretic element include electronic paper.

Note that in the case of using an LED chip for a display element or the like, graphene or graphite may be provided under an electrode or a nitride semiconductor of the LED chip. Graphene or graphite may be a multilayer film in which a plurality of layers are stacked. Such a provision of graphene or graphite enables easy formation of a nitride semiconductor thereover, such as an n-type GaN semiconductor layer including crystals. Furthermore, a p-type GaN semiconductor layer including crystals or the like can be provided thereover, and thus the LED chip can be formed. Note that an AlN layer may be provided between the n-type GaN semiconductor layer including crystals and graphene or graphite. The GaN semiconductor layers included in the LED chip may be formed by MOCVD. Note that when the graphene is provided, the GaN semiconductor layers included in the LED chip can also be formed by a sputtering method.

In a display element including MEMS, a dry agent may be provided in a space where the display element is sealed (e.g., between an element substrate over which the display element is placed and a counter substrate opposed to the element substrate). Providing a dry agent can prevent MEMS and the like from becoming difficult to move or deteriorating easily because of moisture or the like.

Figure 22A:
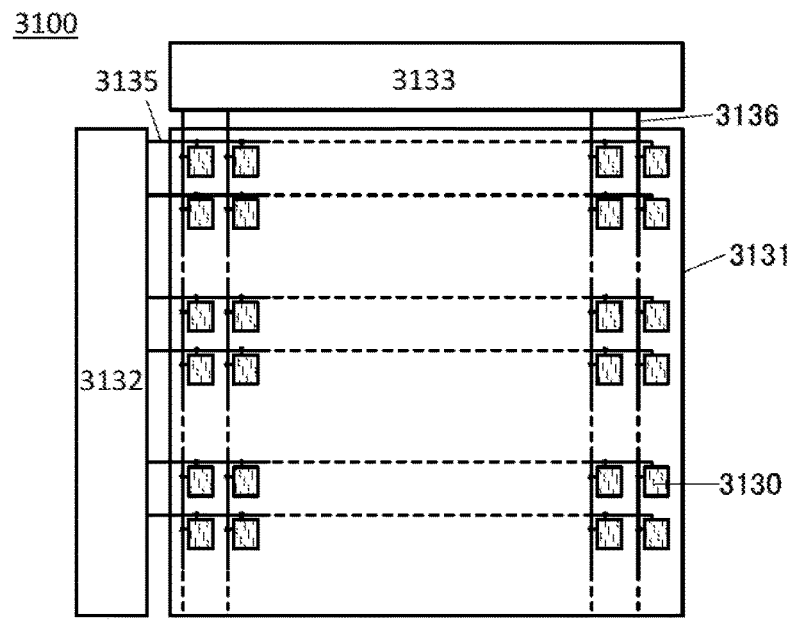
FIG. 22A is a block diagram illustrating a configuration example of a display portion.

FIG. 22A illustrates a configuration example of a display portion. A display portion 3100 in FIG. 22A includes a display area 3131 and circuits 3132 and 3133. The circuit 3132 functions as, for example, a scan line driver. The circuit 3133 functions as, for example, a signal line driver.

The display portion 3100 includes m scan lines 3135 that are arranged parallel or substantially parallel to each other and whose potentials are controlled by the circuit 3132, and n signal lines 3136 that are arranged parallel or substantially parallel to each other and whose potentials are controlled by the circuit 3133. The display area 3131 includes a plurality of pixels 3130 arranged in a matrix of m rows by n columns. Note that m and n are each an integer of 2 or more.

Each of the scan lines 3135 is electrically connected to the n pixels 3130 on the corresponding row among the pixels 3130 in the display area 3131. Each of the signal lines 3136 is electrically connected to the m pixels 3130 on the corresponding column among the pixels 3130.

Figure 22B:
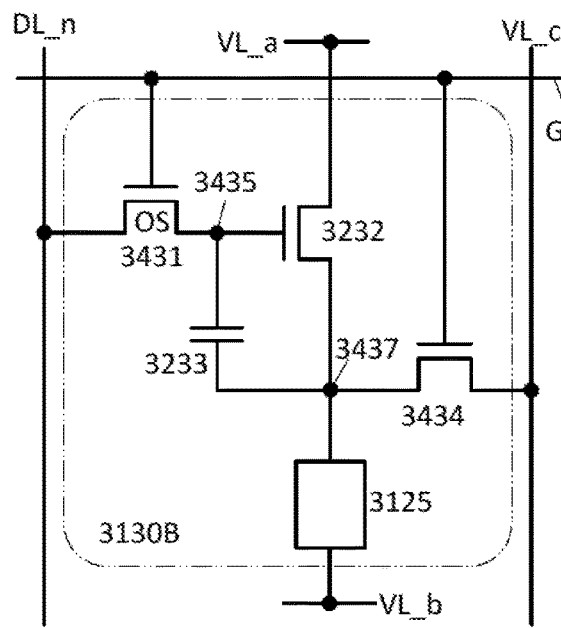
FIGS. 22B and 22C are circuit diagrams illustrating configuration examples of a pixel.
Figure 22C:
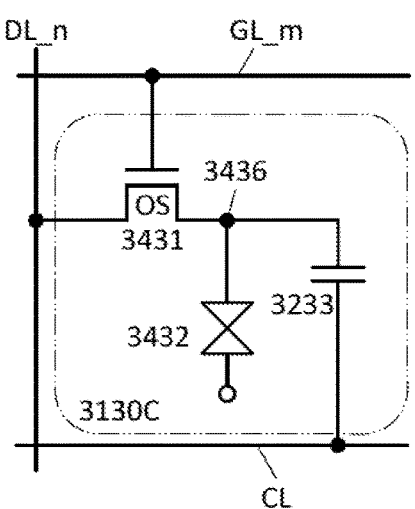

FIGS. 22B and 22C are circuit diagrams illustrating configuration examples of the pixel 3130. A pixel 3130B in FIG. 22B is a pixel of a self-luminous display device, and a pixel 3130C in FIG. 22C is a pixel of a liquid crystal display device.

The pixel 3130B includes a transistor 3431, a capacitor 3233, a transistor 3232, a transistor 3434, and a light-emitting element 3125. The pixel 3130B is electrically connected to the signal line 3136 on the n-th column to which a data signal is supplied (hereinafter referred to as a signal line DL_n), the scan line 3135 on the m-th row to which a gate signal is supplied (hereinafter referred to as a scan line GL_m), and potential supply lines VL_a and VL_b.

A plurality of pixels 3130B are each used as a subpixel, and the subpixels emit light in different wavelength ranges, so that a color image can be obtained. For example, a pixel 3130 that emits light in a red wavelength range, a pixel 3130 that emits light in a green wavelength range, and a pixel 3130 that emits light in a blue wavelength range are used as one pixel.

The combination of the wavelength ranges of light is not limited to red, green, and blue and may be cyan, yellow, and magenta. When subpixels that emit light in at least three different wavelength ranges are provided in one pixel, a color image can be displayed.

Alternatively, one or more colors of yellow, cyan, magenta, white, and the like may be added to red, green, and blue. For example, a subpixel that emits light in a yellow wavelength range may be added to subpixels that emit red, green, and blue. One or more of red, green, blue, white, and the like may be added to cyan, yellow, and magenta. For example, a subpixel that emits light in a blue wavelength range may be added to subpixels that emit cyan, yellow, and magenta. When subpixels that emit light in four or more different wavelength ranges are provided in one pixel, the reproducibility of colors of a displayed image can be further increased.

The pixel number ratio (or the ratio of light-emitting area) of red to green and blue used for one pixel need not be 1:1:1. For example, the pixel number ratio (or the ratio of light-emitting area) of red to green and blue may be 1:1:2. Alternatively, the pixel number ratio (or the ratio of light-emitting area) of red to green and blue may be 1:2:3.

A subpixel that emits white light may be combined with red, green, and blue color filters or the like to enable color display. Alternatively, a subpixel emitting light in a red wavelength range, a subpixel emitting light in a green wavelength range, and a subpixel emitting light in a blue wavelength range may be combined with a color filter transmitting light in a red wavelength, a color filter transmitting light in a green wavelength, and a color filter transmitting light in a blue wavelength, respectively.

The present invention is not limited to the application to a display device for color display but can also be applied to a display device for monochrome display.

The pixel 3130C illustrated in FIG. 22C includes the transistor 3431, the capacitor 3233, and a liquid crystal element 3432. The pixel 3130C is electrically connected to the signal line DL_n, the scan line GL_m, and a capacitor line CL.

The potential of one of a pair of electrodes of the liquid crystal element 3432 is set in accordance with the specifications of the pixel 3130C as appropriate. The alignment state of a liquid crystal in the liquid crystal element 3432 depends on data written to a node 3436. A common potential may be applied to the one of the pair of electrodes of the liquid crystal element 3432 included in each of the plurality of pixels 3130C. The potential of the capacitor line CL is set in accordance with the specifications of the pixel 3130C as appropriate. The capacitor 3233 functions as a storage capacitor for storing data written to the node 3436.

The liquid crystal element 3432 can employ any of the following modes: a TN mode, an STN mode, a VA mode, an axially symmetric aligned micro-cell (ASM) mode, an optically compensated birefringence (OCB) mode, a ferroelectric liquid crystal (FLC) mode, an antiferroelectric liquid crystal (AFLC) mode, an MVA mode, a patterned vertical alignment (PVA) mode, an IPS mode, an FFS mode, and a transverse bend alignment (TBA) mode. Other examples include an electrically controlled birefringence (ECB) mode, a polymer dispersed liquid crystal (PDLC) mode, a polymer network liquid crystal (PNLC) mode, and a guest-host mode. Note that the present invention is not limited to these modes, and various modes can be used.

Figure 23A:
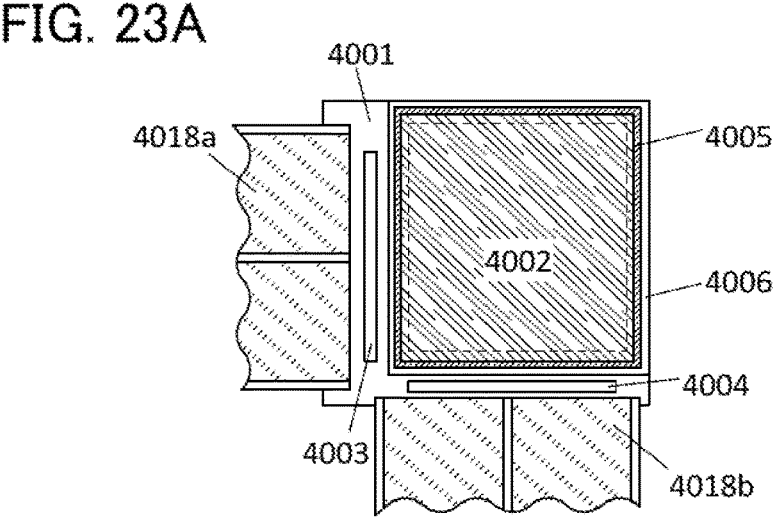
FIGS. 23A to 23C are top views illustrating structure examples of a display panel.

The device structure of the display panel will be described with reference to FIGS. 23A to 23C. In FIG. 23A, a sealant 4005 is provided so as to surround a pixel portion 4002 provided over a substrate 4001, and the pixel portion 4002 is sealed by the sealant 4005 and a substrate 4006. In FIG. 23A, a signal line driver 4003 and a scan line driver 4004 are mounted in a region different from the region surrounded by the sealant 4005 over the substrate 4001. The signal line driver 4003 is formed using a single crystal semiconductor transistor or a polycrystalline semiconductor transistor over another substrate. The same applies to the scan line driver 4004. Various signals and potentials are supplied to the signal line driver 4003, the scan line driver 4004, or the pixel portion 4002 through flexible printed circuits (FPCs) 4018a and 4018b.

Figure 23B:
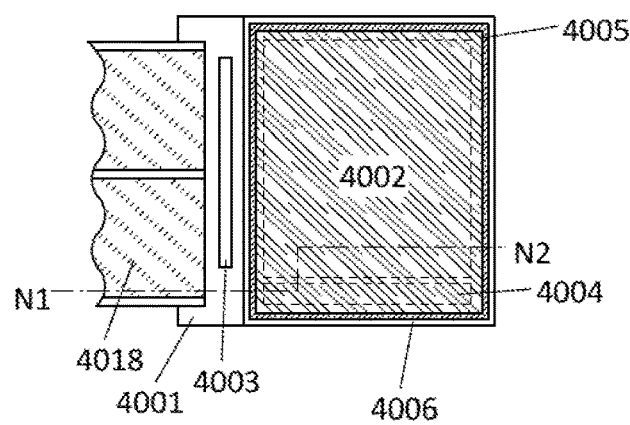
Figure 23C:
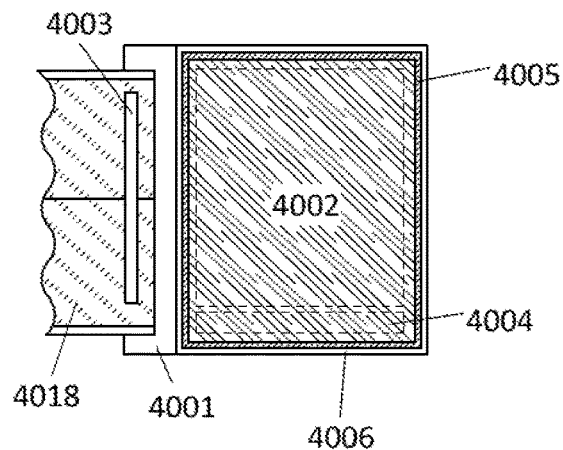

In FIGS. 23B and 23C, the sealant 4005 is provided so as to surround the pixel portion 4002 and the scan line driver 4004 that are provided over the substrate 4001. The substrate 4006 is provided over the pixel portion 4002 and the scan line driver 4004. Hence, the pixel portion 4002 and the scan line driver 4004 are sealed together with the display element by the substrate 4001, the sealant 4005, and the substrate 4006. In FIGS. 23B and 23C, a signal line driver 4003 is mounted in a region different from the region surrounded by the sealant 4005 over the substrate 4001. In FIGS. 23B and 23C, various signals and potentials are supplied to the signal line driver 4003, the scan line driver 4004, or the pixel portion 4002 through an FPC 4018.

Although FIGS. 23B and 23C each illustrate an example in which the signal line driver 4003 is formed separately and mounted on the substrate 4001, one embodiment of the present invention is not limited to this structure. The scan line driver may be separately formed and then mounted, or only part of the signal line driver or only part of the scan line driver may be separately formed and then mounted.

The connection method of a separately formed driver is not particularly limited; wire bonding, a chip on glass (COG), a tape carrier package (TCP), a chip on film (COF), or the like can be used. FIG. 23A illustrates an example in which the signal line driver 4003 and the scan line driver 4004 are mounted by a COG. FIG. 23B illustrates an example in which the signal line driver 4003 is mounted by a COG. FIG. 23C illustrates an example in which the signal line driver 4003 is mounted by a TCP. In some cases, the display device encompasses a panel in which a display element is sealed, and a module in which an IC or the like including a controller is mounted on the panel. The pixel portion and the scan line driver provided over the substrate 4001 include a plurality of transistors to which the transistor that is described in the above embodiment can be applied.

FIGS. 24A and 24B correspond to cross-sectional views taken along chain line N1-N2 in FIG. 23B. FIG. 24A illustrates a display panel 4000A of a liquid crystal display device, and FIG. 24B illustrates a display panel 4000B of a self-luminous display device.

The display panel 4000A has an electrode 4015, and the electrode 4015 is electrically connected to a terminal included in the FPC 4018 through an anisotropic conductive layer 4019. The electrode 4015 is electrically connected to a wiring 4014 in an opening formed in insulating layers 4112, 4111, and 4110. The display panel 4000A includes transistors 4010 and 4011 and a capacitor 4020. The capacitor 4020 includes a region where part of a source or drain electrode of the transistor 4010 overlaps with an electrode 4021 with the insulating layer 4103 interposed therebetween. The electrode 4021 is formed using the same conductive layer as the electrode 4017. The electrode 4015 is formed of the same conductive layer as a first electrode layer 4030, and the wiring 4014 is formed of the same conductive layer as source and drain electrodes of transistors 4010 and 4011. The same applies to the display panel 4000B.

The pixel portion 4002 and the scan line driver 4004 provided over the substrate 4001 include a plurality of transistors. In FIGS. 24A and 24B, the transistor 4010 included in the pixel portion 4002 and the transistor 4011 included in the scan line driver 4004 are illustrated as an example. The insulating layers 4112, 4111, and 4110 are provided over the transistors 4010 and 4011 in FIG. 24A, and a bank 4510 is further provided over the insulating layer 4112 in FIG. 24B.

In general, the capacitance of a capacitor provided in a pixel is set in consideration of leakage current or the like of transistors provided in the pixel so that charge can be held for a predetermined period. The capacitance of the capacitor may be set considering the off-state current of the transistor or the like. For example, when the aforementioned OS transistor is used in a pixel portion of a liquid crystal display device, the capacitance of the capacitor can be one-third or less, or one-fifth or less, of the capacitance of a liquid crystal. Using the OS transistor can omit the formation of a capacitor.

In FIG. 24A, a liquid crystal element 4013 includes the first electrode layer 4030, a second electrode layer 4031, and a liquid crystal layer 4008. Note that an insulating layer 4032 and an insulating layer 4033 functioning as alignment films are provided so that the liquid crystal layer 4008 is provided therebetween. The second electrode layer 4031 is provided on the substrate 4006 side, and the first electrode layer 4030 and the second electrode layer 4031 overlap with each other with the liquid crystal layer 4008 positioned therebetween.

A spacer 4035 is a columnar spacer obtained by selective etching of an insulating layer and is provided in order to control the distance between the first electrode layer 4030 and the second electrode layer 4031 (a cell gap). Alternatively, a spherical spacer may be used.

In the case where a liquid crystal element is used as the display element, thermotropic liquid crystal, low-molecular liquid crystal, high-molecular liquid crystal, polymer-dispersed liquid crystal, ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Alternatively, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which 5 weight percent or more of a chiral material is mixed is used for the liquid crystal layer in order to improve the temperature range. The liquid crystal composition which includes the liquid crystal exhibiting a blue phase and the chiral material has a short response time of 1 msec or less and is optically isotropic; therefore, alignment treatment is not necessary and viewing angle dependence is small. An alignment film does not need to be provided and rubbing treatment is thus not necessary; accordingly, electrostatic discharge damage caused by the rubbing treatment can be prevented and defects and damage of the liquid crystal display device in the manufacturing process can be reduced. Thus, the productivity of the liquid crystal display device can be improved.

Furthermore, it is possible to use a method called domain multiplication or multi-domain design, in which a pixel is divided into some regions (subpixels) and molecules are aligned in different directions in their respective regions.

The specific resistivity of the liquid crystal material is greater than or equal to $1\times10^9$ Ω·cm, preferably greater than or equal to $1\times10^{11}$ Ω·cm, and further preferably greater than or equal to $1\times10^{12}$ Ω·cm. Note that the specific resistivity in this specification is measured at 20° C.

In the OS transistor used in this embodiment, the current in an off state (the off-state current) can be made small. Accordingly, an electrical signal such as an image signal can be held for a longer period, and a writing interval can be set longer in an on state. This reduces the frequency of refresh operation, producing an effect of suppressing power consumption.

In the OS transistor, relatively high field-effect mobility can be obtained, whereby high-speed operation is possible. Consequently, when the above transistor is used in a pixel portion of a display device, high-quality images can be obtained. Since a driver portion and a pixel portion can be separately formed over one substrate with the use of the above transistor, the number of components of the display device can be reduced.

In the display device, a black matrix (a light-blocking layer), an optical member (an optical substrate) such as a polarizing member, a retardation member, or an anti-reflection member, and the like may be provided as appropriate. For example, circular polarization may be employed by using a polarizing substrate and a retardation substrate. In addition, a backlight, a sidelight, or the like may be used as a light source.

As the display element included in the display device, a light-emitting element utilizing electroluminescence (also referred to as an "EL element") can be used. An EL element includes a layer containing a light-emitting compound (also referred to as an "EL layer") between a pair of electrodes. By generating a potential difference between the pair of electrodes that is greater than the threshold voltage of the EL element, holes are injected to the EL layer from the anode side and electrons are injected to the EL layer from the cathode side. The injected electrons and holes are recombined in the EL layer, so that a light-emitting substance contained in the EL layer emits light.

EL elements are classified depending on whether a light-emitting material is an organic compound or an inorganic compound. In general, the former is referred to as an organic EL element, and the latter is referred to as an inorganic EL element.

In an organic EL element, by voltage application, electrons are injected from one electrode to the EL layer and holes are injected from the other electrode to the EL layer. Then, recombination of these carriers (the electrons and holes) makes the light-emitting organic compound form an excited state and emit light when it returns from the excited state to a ground state. Based on such a mechanism, such a light-emitting element is referred to as a current-excitation type light-emitting element.

In addition to the light-emitting compound, the EL layer may further include any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

The EL layer can be formed by an evaporation method (including a vacuum evaporation method), a transfer method, a printing method, an inkjet method, a coating method, or the like.

Inorganic EL elements are classified according to their element structures into a dispersed inorganic EL element and a thin-film inorganic EL element. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure where a light-emitting layer is sandwiched between dielectric layers, which are further sandwiched between electrodes, and its light emission mechanism is localized type light emission that utilizes inner-shell electron transition of metal ions. Note that description is given here using an organic EL element as a light-emitting element.

In order to extract light emitted from the light-emitting element, at least one of a pair of electrodes is transparent. The light-emitting element that is formed over a substrate together with a transistor can have a top emission structure in which light emission is extracted through the surface opposite to the substrate; a bottom emission structure in which light emission is extracted through the surface on the substrate side; or a dual emission structure in which light emission is extracted through the side opposite to the substrate and the substrate side.

In FIG. 24B, a light-emitting element 4513 is electrically connected to the transistor 4010 in the pixel portion 4002. The light-emitting element 4513 has, but is not limited to, the stacked-layer structure including the first electrode layer 4030, a light-emitting layer 4511, and the second electrode layer 4031. The structure of the light-emitting element 4513 can be changed as appropriate depending on a direction in which light is extracted from the light-emitting element 4513, or the like.

The bank 4510 is formed using an organic insulating material or an inorganic insulating material. It is particularly preferable that the bank 4510 be formed using a photosensitive resin material to have an opening over the first electrode layer 4030 so that a side surface of the opening slopes with continuous curvature.

The light-emitting layer 4511 may be formed using a single layer or a plurality of layers stacked.

A protective layer may be formed over the second electrode layer 4031 and the bank 4510 in order to prevent entry of oxygen, hydrogen, moisture, carbon dioxide, or the like into the light-emitting element 4513. For the protective layer, silicon nitride, silicon nitride oxide, aluminum oxide, aluminum nitride, aluminum oxynitride, aluminum nitride oxide, diamond like carbon (DLC), or the like can be used. In addition, in a space which is enclosed by the substrate 4001, the substrate 4006, and the sealant 4005, a filler 4514 is provided for sealing. It is preferable that, in this manner, the light-emitting element be packaged (sealed) with a protective film (such as a laminate film or an ultraviolet curable resin film) or a cover member with high air-tightness and little degasification so that the light-emitting element is not exposed to the outside air.

As the filler 4514, an ultraviolet curable resin or a thermosetting resin can be used as well as an inert gas such as nitrogen or argon. For example, polyvinyl chloride (PVC), an acrylic resin, polyimide, an epoxy resin, a silicone resin, polyvinyl butyral (PVB), or ethylene vinyl acetate (EVA) can be used. A drying agent may be contained in the filler 4514.

A glass material such as a glass frit, or a resin that is curable at room temperature such as a two-component-mixture-type resin, a light curable resin, a thermosetting resin, and the like can be used for the sealant 4005. A drying agent may be contained in the sealant 4005.

In addition, if needed, an optical film, such as a polarizing plate, a circularly polarizing plate (including an elliptically polarizing plate), a retardation plate (a quarter-wave plate or a half-wave plate), or a color filter, may be provided as appropriate on a light-emitting surface of the light-emitting element. Further, the polarizing plate or the circularly polarizing plate may be provided with an anti-reflection film. For example, anti-glare treatment by which reflected light can be diffused by projections and depressions on the surface so as to reduce the glare can be performed.

When the light-emitting element has a microcavity structure, light with high color purity can be extracted. Furthermore, when a microcavity structure and a color filter are used in combination, the glare can be reduced and visibility of a display image can be increased.

The first electrode layer and the second electrode layer (also called pixel electrode layer, common electrode layer, counter electrode layer, or the like) for applying voltage to the display element may have light-transmitting properties or light-reflecting properties, which depends on the direction in which light is extracted, the position where the electrode layer is provided, the pattern structure of the electrode layer, and the like.

The first electrode layer 4030 and the second electrode layer 4031 can be formed using a light-transmitting conductive material such as indium oxide containing tungsten oxide, indium zinc oxide containing tungsten oxide, indium oxide containing titanium oxide, indium tin oxide, indium tin oxide containing titanium oxide, indium zinc oxide, or indium tin oxide to which silicon oxide is added.

The first electrode layer 4030 and the second electrode layer 4031 each can also be formed using one or plural kinds selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); alloys thereof; and nitrides thereof.

Alternatively, a conductive composition containing a conductive high molecule (also called conductive polymer) can be used for the first electrode layer 4030 and the second electrode layer 4031. As the conductive high molecule, a so-called 7c-electron conjugated conductive high molecule can be used. Examples include polyaniline or a derivative thereof, polypyrrole or a derivative thereof, polythiophene or a derivative thereof, and a copolymer of two or more of aniline, pyrrole, and thiophene or a derivative thereof.

Figures 25A, 25B:
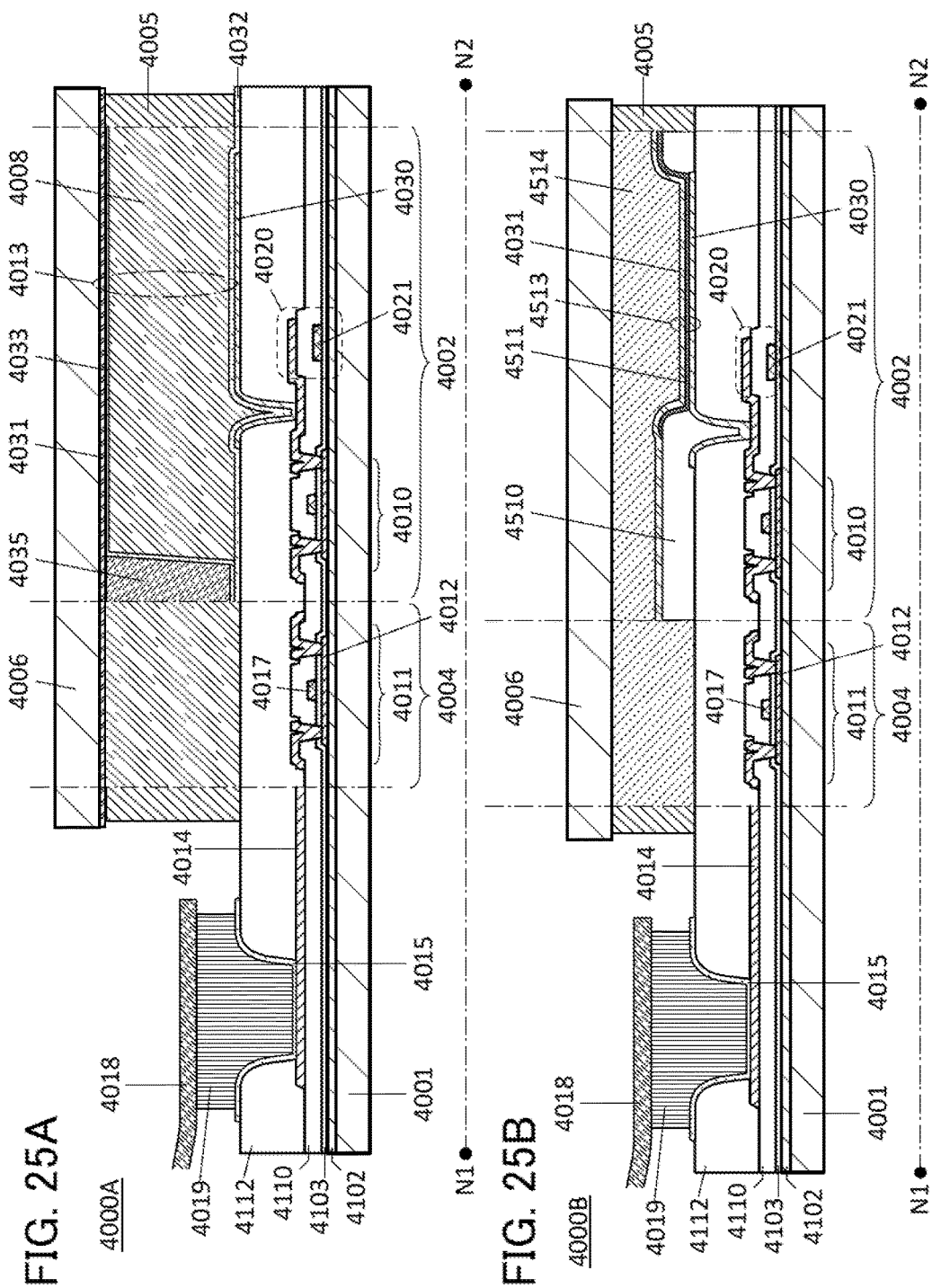
FIGS. 25A and 25B are cross-sectional views illustrating structure examples of a display panel.

FIG. 25A is a cross-sectional view in the case where top-gate transistors are provided as the transistors 4011 and 4010 in FIG. 24A. Similarly, FIG. 25B illustrates a cross-sectional view in which top-gate transistors are provided as the transistors 4011 and 4010 illustrated in FIG. 24B.

In each of the transistors 4010 and 4011, the electrode 4017 functions as a gate electrode. The wiring 4014 functions as a source electrode or a drain electrode. The insulating layer 4103 functions as a gate insulating film. The transistors 4010 and 4011 each include a semiconductor layer 4012. For the semiconductor layer 4012, crystalline silicon, polycrystalline silicon, amorphous silicon, a metal oxide, an organic semiconductor, or the like may be used. Impurities may be introduced to the semiconductor layer 4012, if necessary, to increase the conductivity of the semiconductor layer 4012 or control the threshold value of the transistor.

This embodiment can be implemented in appropriate combination with any of the structures described in the other embodiments.

Embodiment 3

This embodiment will describe components used for the display panel and the like.

<Substrate>

A material having a flat surface can be used for the substrate included in the display panel and the like. The substrate through which light from the display element is extracted is formed using a material that transmits the light. For example, a material such as glass, quartz, ceramics, sapphire, or an organic resin can be used.

The weight and thickness of the display panel and the like can be reduced using a thin substrate. Furthermore, a flexible display panel and the like can be obtained using a substrate that is thin enough to have flexibility.

The substrate through which light emission is not extracted does not need to have a light-transmitting property; therefore, besides the above-mentioned substrates, a metal substrate or the like can be used. A metal substrate is preferable because its high thermal conductivity enables heat to be easily conducted to the whole substrate, thereby suppressing a local temperature rise in the display panel and the like. To obtain flexibility or bendability, the thickness of the metal substrate is preferably greater than or equal to 10 μm and less than or equal to 200 μm, further preferably greater than or equal to 20 μm and less than or equal to 50 μm.

Although there is no particular limitation on the material of the metal substrate, for example, a metal such as aluminum, copper, or nickel or an alloy such as an aluminum alloy or stainless steel can be favorably used.

Alternatively, a substrate subjected to insulation treatment, such as a metal substrate whose surface is oxidized or provided with an insulating film, may be used. For example, an insulating film may be formed by a coating method such as a spin coating method or a dipping method, an electrodeposition method, an evaporation method, or a sputtering method. Alternatively, an oxide film may be formed on the surface of the substrate by leaving or heating the substrate in an oxygen atmosphere or by an anodic oxidation method or the like.

Examples of a material which has flexibility and transmits visible light include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE) resin. It is particularly preferable to use a material with a low thermal expansion coefficient, for example, a polyamide imide resin, a polyimide resin, or PET, whose thermal expansion coefficients are lower than or equal to $30 \times 10^{-6}$/K. A substrate in which a glass fiber is impregnated with an organic resin or a substrate whose thermal expansion coefficient is reduced by mixing an inorganic filler with an organic resin can also be used. A substrate using such a material is lightweight, and thus, a display panel and the like using the substrate can also be lightweight.

In the case where the above material contains a fibrous body, a high-strength fiber of an organic compound or an inorganic compound is used as the fibrous body. The high-strength fiber specifically refers to a fiber with a high tensile elastic modulus or a high Young's modulus. Typical examples thereof include a polyvinyl alcohol-based fiber, a polyester-based fiber, a polyamide-based fiber, a polyethylene-based fiber, an aramid-based fiber, a polyparaphenylene benzobisoxazole fiber, a glass fiber, and a carbon fiber. As the glass fiber, a glass fiber using E glass, S glass, D glass, Q glass, or the like can be used. These fibers may be used in the form of a woven or nonwoven fabric, and a structure body obtained by curing a resin with which such a fibrous body is impregnated may be used as a flexible substrate. The structure body including the fibrous body and the resin is preferably used as a flexible substrate, in which case the reliability against damage due to bending or local pressure can be improved.

Alternatively, glass, metal, or the like that is thin enough to have flexibility can be used for the substrate. Alternatively, a composite material in which glass and a resin material are attached to each other with an adhesive layer may be used.

A hard coat layer (e.g., a silicon nitride layer or an aluminum oxide layer) which protects a surface of the display panel and the like from damage, a layer of a material that can disperse pressure (e.g., an aramid resin layer), or the like may be stacked over the flexible substrate. To suppress, for example, a decrease in the lifetime of the display element due to moisture or the like, an insulating film with low water permeability may be stacked over the flexible substrate. For example, an inorganic insulating material such as silicon nitride, silicon oxynitride, silicon nitride oxide, aluminum oxide, or aluminum nitride can be used.

The substrate may be formed by stacking a plurality of layers. In particular, when a glass layer is used, a barrier property against water and oxygen can be improved, and thus, a highly reliable display panel and the like can be provided.

<Transistor>

A transistor includes a conductive layer functioning as a gate electrode, a semiconductor layer, a conductive layer functioning as a source electrode, a conductive layer functioning as a drain electrode, and an insulating layer functioning as a gate insulating layer. In the above example, a bottom-gate transistor is used.

Note that there is no particular limitation on the structure of the transistor included in the display device of one embodiment of the present invention. For example, a planar transistor, a staggered transistor, or an inverted staggered transistor may be used. Furthermore, a top-gate transistor or a bottom-gate transistor may be used. Gate electrodes may be provided above and below a channel.

There is no particular limitation on the crystallinity of a semiconductor material used for the transistor, and an amorphous semiconductor or a semiconductor having crystallinity (a microcrystalline semiconductor, a polycrystalline semiconductor, a single-crystal semiconductor, or a semiconductor partly including crystal regions) may be used. A semiconductor having crystallinity is preferably used because deterioration of the transistor characteristics can be suppressed.

As a semiconductor material used for the transistor, a metal oxide whose energy gap is greater than or equal to 2 eV, preferably greater than or equal to 2.5 eV, further preferably greater than or equal to 3 eV can be used. A typical example thereof is a metal oxide containing indium, and for example, a CAC-OS described later can be used.

A transistor including a metal oxide which has a wider bandgap and a lower carrier density than silicon has a low off-state current; therefore, a charge accumulated in a capacitor that is series-connected to the transistor can be retained for a long time.

As the semiconductor layer, for example, a film represented by an In-M-Zn-based oxide which contains indium, zinc, and M (a metal such as aluminum, titanium, gallium, germanium, yttrium, zirconium, lanthanum, cerium, tin, neodymium, or hafnium) can be used.

In the case where the metal oxide included in the semiconductor layer is an In-M-Zn-based oxide, the atomic ratio of metal elements in a sputtering target used for depositing the In-M-Zn-based oxide preferably satisfies In M and Zn M. The atomic ratio of metal elements in such a sputtering target is preferably In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, In:M:Zn=5:1:8, or the like. Note that the atomic ratio of metal elements in the deposited semiconductor layer may deviate from the above atomic ratio of metal elements in the sputtering target within a range of ±40%.

The bottom-gate transistor described as an example in this embodiment is preferable because the number of manufacturing steps can be reduced. When a metal oxide, which can be formed at a lower temperature than polycrystalline silicon, is used for the semiconductor layer, even materials with low heat resistance can be used for a wiring, an electrode, or a substrate below the semiconductor layer, so that the range of choices of materials can be widened. For example, an extremely large glass substrate can be favorably used.

A metal oxide film with a low carrier density is used as the semiconductor layer. For the semiconductor layer, for example, a metal oxide whose carrier density is lower than or equal to $1 \times 10^{17}/cm^3$, preferably lower than or equal to $1 \times 10^{15}/cm^3$, further preferably lower than or equal to $1 \times 10^{13}/cm^3$, still further preferably lower than or equal to $1 \times 10^{11}/cm^3$, even further preferably lower than $1 \times 10^{10}/cm^3$, and higher than or equal to $1 \times 10^{-9}/cm^3$ can be used. Such a metal oxide is referred to as a highly purified intrinsic or substantially highly purified intrinsic metal oxide. Such a metal oxide has a low impurity concentration and a low density of defect states and can thus be regarded as having stable characteristics.

Note that, without limitation to the above examples, a material with an appropriate composition may be used in accordance with required semiconductor characteristics and electrical characteristics (e.g., field-effect mobility and threshold voltage) of the transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When the metal oxide included in the semiconductor layer contains silicon or carbon, which are elements belonging to Group 14, the number of oxygen vacancies in the semiconductor layer increases, so that an n-type layer is formed. Hence, the concentration of silicon or carbon (measured by secondary ion mass spectrometry) in the semiconductor layer is lower than or equal to $2 \times 10^{18}$ atoms/cm$^3$, preferably lower than or equal to $2 \times 10^{17}$ atoms/cm$^3$.

Alkali metal and alkaline earth metal might generate carriers when bonded to a metal oxide, in which case the off-state current of the transistor might increase. Therefore, the concentration of alkali metal or alkaline earth metal in the semiconductor layer, which is measured by secondary ion mass spectrometry, is lower than or equal to $1\times10^{18}$ atoms/cm$^3$, preferably lower than or equal to $2\times10^{16}$ atoms/cm$^3$.

When the metal oxide included in the semiconductor layer contains nitrogen, electrons serving as carriers are generated and the carrier density is increased, so that the semiconductor layer easily becomes n-type. Thus, a transistor which includes a metal oxide containing nitrogen is likely to have normally-on characteristics. Hence, the nitrogen concentration in the semiconductor layer, which is measured by secondary ion mass spectrometry, is preferably lower than or equal to $5\times10^{18}$ atoms/cm$^3$.

The semiconductor layer may have a non-single-crystal structure, for example. The non-single-crystal structure includes a CAAC-OS (c-axis aligned crystalline oxide semiconductor or c-axis aligned a-b-plane-anchored crystalline oxide semiconductor) including a c-axis aligned crystal, a polycrystalline structure, a microcrystalline structure, or an amorphous structure, for example. Among the non-single-crystal structures, the amorphous structure has the highest density of defect states, whereas the CAAC-OS has the lowest density of defect states.

A metal oxide film having an amorphous structure has, for example, disordered atomic arrangement and no crystalline component. In other words, an oxide film having an amorphous structure has, for example, a completely amorphous structure and no crystal part.

Note that the semiconductor layer may be a mixed film including two or more of the following regions: a region having an amorphous structure, a region having a microcrystalline structure, a region having a polycrystalline structure, a CAAC-OS region, and a region having a single-crystal structure. The mixed film has, for example, a single-layer structure or a stacked structure including two or more of the above-mentioned regions in some cases.

<Composition of CAC-OS>

Described below is the composition of a CAC-OS which can be used for a transistor disclosed in one embodiment of the present invention.

The CAC-OS is, for example, a metal oxide material with a composition in which elements are unevenly distributed in regions each having a size of greater than or equal to 0.5 nm and less than or equal to 10 nm, preferably greater than or equal to 1 nm and less than or equal to 2 nm, or a similar size. In the following description of a metal oxide, the state in which one or more metal elements are unevenly distributed in regions each having a size of greater than or equal to 0.5 nm and less than or equal to 10 nm, preferably greater than or equal to 1 nm and less than or equal to 2 nm, or a similar size and the regions including the metal element(s) are mixed is referred to as a mosaic pattern or a patch-like pattern.

Note that the metal oxide preferably contains at least indium. In particular, indium and zinc are preferably contained. In addition, one or more elements selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

As an example of the CAC-OS, an In—Ga—Zn oxide with the CAC composition (such an In—Ga—Zn oxide may be particularly referred to as CAC-IGZO) will be described. The CAC-IGZO has a composition with a mosaic pattern in which materials are separated into indium oxide ($InO_{X1}$, where X1 is a real number greater than 0) or indium zinc oxide ($In_{X2}Zn_{Y2}O_{Z2}$, where X2, Y2, and Z2 are each a real number greater than 0) and gallium oxide ($GaO_{X3}$, where X3 is a real number greater than 0) or gallium zinc oxide ($Ga_{X4}Zn_{Y4}O_{Z4}$, where X4, Y4, and Z4 are each a real number greater than 0), for example. Furthermore, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite metal oxide with a composition in which a region including $GaO_{X3}$ as a main component and a region including $In_{X2}Zn_{Y2}O_{Z2}$ or $InO_{X1}$ as a main component are mixed. In this specification, for example, when the atomic ratio of In to an element M in a first region is larger than the atomic ratio of In to the element M in a second region, the first region has a higher In concentration than the second region.

Note that a compound containing In, Ga, Zn, and O is known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compound has a single-crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In part of the material composition of a CAC-OS containing In, Ga, Zn, and O, nanoparticle regions including Ga as a main component and nanoparticle regions including In as a main component are observed. These nanoparticle regions are randomly dispersed in a mosaic pattern. Therefore, the crystal structure is a secondary element for the CAC-OS.

Note that the CAC-OS does not include a stacked structure of two or more films with different compositions. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In part of the composition of a CAC-OS which contains, instead of gallium, one or more metal elements selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like, nanoparticle regions including the metal element(s) as a main component(s) and nanoparticle regions including In as a main component are observed. These nanoparticle regions are randomly dispersed in a mosaic pattern.

The CAC-OS can be formed by a sputtering method under conditions where a substrate is not heated, for example. In the case of forming the CAC-OS by a sputtering method, one or more gases selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible; for example, the flow ratio of an oxygen gas is preferably higher than or equal to 0% and lower than 30%, further preferably higher than or equal to 0% and lower than or equal to 10%.

The CAC-OS is characterized in that no clear peak is observed in measurement using θ/2θ scan by an out-of-plane method, which is an X-ray diffraction (XRD) measurement method. That is, XRD shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in the plan-view direction and the cross-sectional direction.

For example, an energy dispersive X-ray spectroscopy (EDX) mapping image confirms that an In—Ga—Zn oxide with the CAC composition has a structure in which regions including $GaO_{X3}$ as a main component and regions including $In_{X2}Zn_{Y2}O_{Z2}$ or $InO_{X1}$ as a main component are unevenly distributed and mixed.

The CAC-OS has a structure and characteristics different from those of an IGZO compound in which metal elements are evenly distributed. That is, in the CAC-OS, regions including $GaO_{X3}$ or the like as a main component and regions including $In_{X2}Zn_{Y2}O_{Z2}$ or $InO_{X1}$ as a main component are phase-separated from each other in a mosaic pattern.

The conductivity of the region including $In_{X2}Zn_{Y2}O_{Z2}$ or $InO_{X1}$ as a main component is higher than that of the region including $GaO_{X3}$ or the like as a main component. In other words, when carriers flow through the region including $In_{X2}Zn_{Y2}O_{Z2}$ or $InO_{X1}$ as a main component, the metal oxide exhibits conductivity. Accordingly, when the regions including $In_{X2}Zn_{Y2}O_{Z2}$ or $InO_{X1}$ as a main component are distributed like clouds in the metal oxide, a high field-effect mobility (μ) can be achieved.

In contrast, the insulating property of the region including $GaO_{X3}$ or the like as a main component is higher than that of the region including $In_{X2}Zn_{Y2}O_{Z2}$ or $InO_{X1}$ as a main component. In other words, when the regions including $GaO_{X3}$ or the like as a main component are distributed in the metal oxide, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current ($I_{on}$) and a high field-effect mobility (μ) can be achieved.

A semiconductor element including a CAC-OS has a high reliability. Thus, the CAC-OS is suitably used for a variety of semiconductor devices typified by a display.

Alternatively, silicon may be used as a semiconductor in which a channel of the transistor is formed. Although amorphous silicon may be used as silicon, silicon having crystallinity is particularly preferable. For example, microcrystalline silicon, polycrystalline silicon, or single crystal silicon is preferably used. In particular, polycrystalline silicon can be formed at a lower temperature than single crystal silicon and has a higher field-effect mobility and a higher reliability than amorphous silicon.

The bottom-gate transistor described as an example in this embodiment is preferable because the number of manufacturing steps can be reduced. When amorphous silicon, which can be formed at a lower temperature than polycrystalline silicon, is used for the semiconductor layer, even materials with low heat resistance can be used for a wiring, an electrode, or a substrate below the semiconductor layer, so that the range of choices of materials can be widened. For example, an extremely large glass substrate can be favorably used. Meanwhile, a top-gate transistor is preferable because an impurity region is easily formed in a self-aligned manner and variation in characteristics or the like can be reduced. The top-gate transistor is particularly preferable when polycrystalline silicon, single crystal silicon, or the like is employed.

<Conductive Layer>

As examples of materials that can be used for a gate, a source, and a drain of the transistor, and conductive layers such as a variety of wirings and electrodes included in the display panel and the like, metals such as aluminum, titanium, chromium, nickel, copper, yttrium, zirconium, molybdenum, silver, tantalum, and tungsten and alloys containing these metals as their main components can be given. A single-layer structure or a stacked structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used. Copper containing manganese is preferably used because the shape controllability in etching is increased.

As a light-transmitting conductive material, a conductive oxide such as indium oxide, indium tin oxide, indium zinc oxide, zinc oxide, or zinc oxide to which gallium is added or graphene can be used. Alternatively, a metal material such as gold, silver, platinum, magnesium, nickel, tungsten, chromium, molybdenum, iron, cobalt, copper, palladium, or titanium or an alloy material containing the metal material can be used. Alternatively, a nitride of the metal material (e.g., titanium nitride) or the like may be used. In the case of using the metal material or the alloy material (or the nitride thereof), the thickness is set small enough to transmit light. Alternatively, a stacked film of any of the above materials can be used as the conductive layer. For example, a stacked film of indium tin oxide and an alloy of silver and magnesium is preferably used because the conductivity can be increased. These materials can also be used for conductive layers such as a variety of wirings and electrodes included in the display device and conductive layers (e.g., conductive layers functioning as a pixel electrode and a common electrode) included in the display element.

<Insulating Layer>

Examples of an insulating material that can be used for the insulating layers include resins such as an acrylic resin and an epoxy resin, a resin having a siloxane bond such as silicone, and inorganic insulating materials such as silicon oxide, silicon oxynitride, silicon nitride oxide, silicon nitride, and aluminum oxide.

The light-emitting element is preferably provided between a pair of insulating films with low water permeability, in which case impurities such as water can be prevented from entering the light-emitting element. Thus, a decrease in device reliability can be suppressed.

As an insulating film with low water permeability, a film containing nitrogen and silicon (e.g., a silicon nitride film or a silicon nitride oxide film), a film containing nitrogen and aluminum (e.g., an aluminum nitride film), or the like can be used. Alternatively, a silicon oxide film, a silicon oxynitride film, an aluminum oxide film, or the like may be used.

For example, the water vapor transmission rate of the insulating film with low water permeability is lower than or equal to $1\times10^{-5}$ [g/m$^2$·day], preferably lower than or equal to $1\times10^{-6}$ [g/m$^2$·day], further preferably lower than or equal to $1\times10^{-7}$ [g/m$^2$·day], and still further preferably lower than or equal to $1\times10^{-8}$ [g/m$^2$·day].

This embodiment can be implemented in appropriate combination with any of the structures described in the other embodiments.

Embodiment 4

This embodiment describes electronic devices to which the semiconductor device of one embodiment of the present invention can be applied.

Examples of the electronic device to which the semiconductor device of one embodiment of the present invention can be applied include a TV device, a monitor of a computer or the like, a digital camera, a digital video camera, a digital photo frame, a mobile phone (also referred to as a cellular phone or a mobile phone device), a portable game machine, a portable information terminal, an audio reproducing device, and a large game machine such as a pachinko machine. Particularly when the electronic devices are flexible, they can be embedded in an inside/outside wall of a house or a building or an interior/exterior of a car along the curved surfaces. FIGS. 26A to 26E illustrate structure examples of the electronic devices.

Figure 26A:
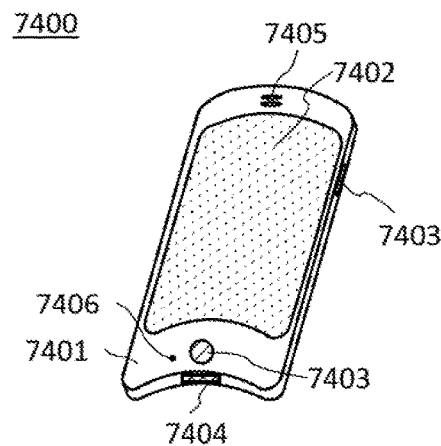
FIGS. 26A to 26E illustrate structure examples of electronic devices.

A cellular phone 7400 illustrated in FIG. 26A includes a display portion 7402 incorporated in a housing 7401, operation buttons 7403, an external connection port 7404, a speaker 7405, a microphone 7406, and the like. When the display portion 7402 of the cellular phone 7400 is touched with a finger or the like, data can be input to the cellular phone 7400. Furthermore, operations such as making a call and inputting a character can be performed by touch on the display portion 7402 with a finger or the like. The power can be turned on or off with the operation button 7403. In addition, types of images displayed on the display portion 7402 can be switched; for example, switching images from a mail creation screen to a main menu screen is performed with the operation button 7403.

The cellular phone 7400 including the semiconductor device of one embodiment of the present invention can operate at high speed.

Figure 26B:
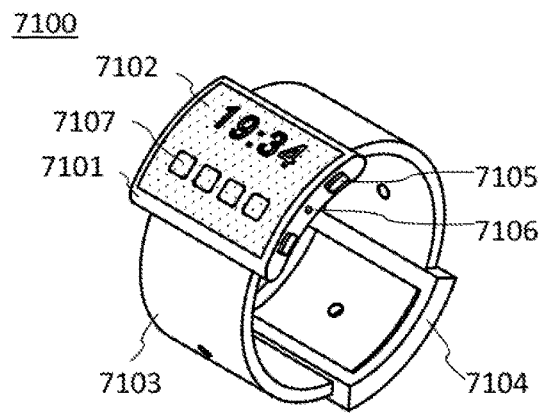

FIG. 26B illustrates an example of a watch-type portable information terminal. A portable information terminal 7100 illustrated in FIG. 26B includes a housing 7101, a display portion 7102, a band 7103, a buckle 7104, an operation button 7105, an input/output terminal 7106, and the like. The portable information terminal 7100 is capable of executing a variety of applications such as mobile phone calls, e-mailing, text viewing and editing, music reproduction, Internet communication, and computer games. The display surface of the display portion 7102 is bent, and images can be displayed on the bent display surface. Furthermore, the display portion 7102 includes a touch sensor, and operation can be performed by touching the screen with a finger, a stylus, or the like. For example, an application can be started by touching an icon 7107 displayed on the display portion 7102.

With the operation button 7105, a variety of functions such as time setting, ON/OFF of the power, ON/OFF of wireless communication, setting and cancellation of a silent mode, and setting and cancellation of a power saving mode can be performed. For example, the functions of the operation button 7105 can be set freely by setting the operating system incorporated in the portable information terminal 7100. The portable information terminal 7100 can employ near field communication that is a communication method based on an existing communication standard. In that case, for example, mutual communication between the portable information terminal 7100 and a headset capable of wireless communication can be performed, and thus hands-free calling is possible. Moreover, the portable information terminal 7100 includes the input/output terminal 7106, and data can be directly transmitted to and received from another information terminal via a connector. Power charging through the input/output terminal 7106 is possible. Note that the charging operation may be performed by wireless power feeding without using the input/output terminal 7106.

The portable information terminal 7100 including the semiconductor device of one embodiment of the present invention can operate at high speed.

Figure 26C:
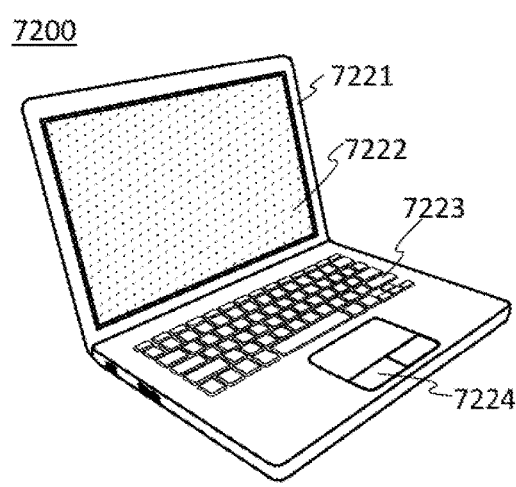

FIG. 26C illustrates a laptop personal computer (PC). A PC 7200 illustrated in FIG. 26C includes a housing 7221, a display portion 7222, a keyboard 7223, a pointing device 7224, and the like.

The PC 7200 including the semiconductor device of one embodiment of the present invention can operate at high speed.

Figure 26D:
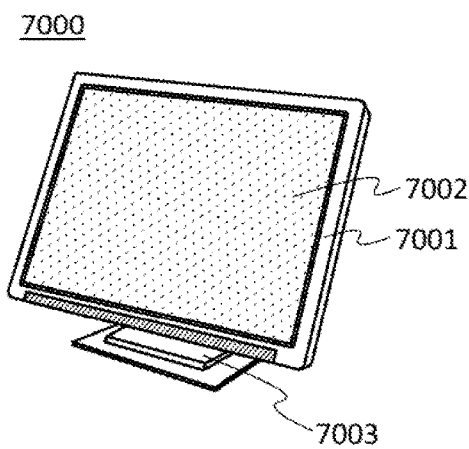

FIG. 26D illustrates a stationary display device. A display device 7000 illustrated in FIG. 26D includes a housing 7001, a display portion 7002, a supporting base 7003, and the like.

The display device 7000 including the semiconductor device of one embodiment of the present invention can operate at high speed.

Figure 26E:
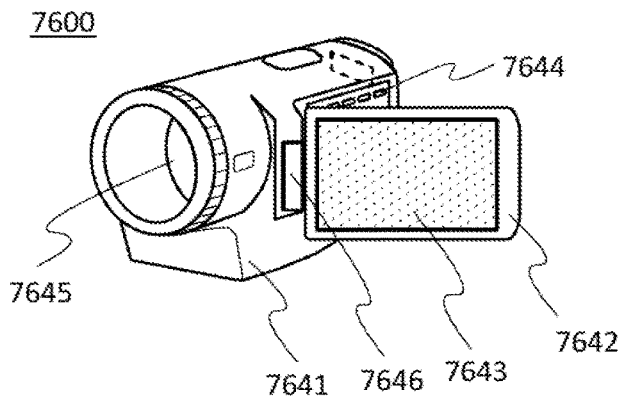

FIG. 26E illustrates a video camera 7600, which includes a first housing 7641, a second housing 7642, a display portion 7643, operation keys 7644, a lens 7645, a joint 7646, and the like.

The video camera 7600 including the semiconductor device of one embodiment of the present invention can operate at high speed.

In the case where the display portion of the above-described electronic device includes a large number of pixels represented by, for example, 4K or 8K, the electronic device preferably includes the receiver which is one embodiment of the present invention. When the above-described electronic device includes the receiver of one embodiment of the present invention, images can be received and displayed at high speed and with low power consumption.

This embodiment can be implemented in appropriate combination with any of the structures described in the other embodiments.

This application is based on Japanese Patent Application Serial No. 2016-202597 filed with Japan Patent Office on Oct. 14, 2016, the entire contents of which are hereby incorporated by reference.

REFERENCE NUMERALS

10: controller 11: context signal generation circuit 12: configuration memory 13: clock signal generation circuit 31: inverter 32: inverter 33: inverter 34: inverter 35: inverter 41: flip-flop circuit 42: flip-flop circuit 43: flip-flop circuit 51: AND circuit 52: AND circuit 53: AND circuit 54: AND circuit 55: XOR circuit 56: NAND circuit 57: AND circuit 60: clock gating control circuit 61: counter circuit 62: comparator 71: circuit 72: circuit 73: circuit 74: circuit 76: circuit 77: circuit 80: look-up table 81: configuration memory 83: flip-flop circuit 84: multiplexer 91: memory cell 92: transistor 93: transistor 94: wiring 95: transistor 95A: transistor 95B: transistor 96: latch circuit 97: transistor 98: latch circuit 99: MRAM 100: broadcasting system 101: transistor 102A: capacitor 102B: capacitor 103A: wiring 103B: wiring 104A: transistor 104B: transistor 105A: wiring 105B: wiring 106: wiring 110: imaging device 111: transmitter 112: receiver 113: display device 120: image sensor 121: image processing circuit 122: encoder 123: modulator 125: demodulator 126: decoder 127: image processing circuit 128: display portion 160: TV (television receiver) 161: broadcasting station 162: artificial satellite 163: radio tower 164: antenna 165: antenna 166A: radio wave 166B: radio wave 167A: radio wave 167B: radio wave 260: circuit 270: circuit 280: circuit 290: circuit 301: data memory 302: subtractor 303: image encoding circuit 304: variable-length encoding circuit 305: image decoding circuit 306: adder 307: image processing circuit 308: frame memory 309: inter-frame prediction circuit 310: prediction parameter generation circuit 320: A/D converter circuit 321: data memory 322: variable-length decoding circuit 323: image decoding circuit 324: adder 325: image processing circuit 326: frame memory 327: inter-frame prediction circuit 331: memory 332: filter circuit 341: retention circuit 342: weight coefficient setting circuit 343: multiplier circuit 344: adder circuit 345: divider circuit 346: PLE 347: multiplier 601: photoelectric conversion element 602: transistor 603: transistor 604: transistor 605: transistor 606: capacitor 607: node 608: wiring 609: wiring 610: pixel driver 611: wiring 621: pixel portion 622: pixel 622B: pixel 622G: pixel 622R: pixel 623: pixel 624: filter 624B: filter 624G: filter 624R: filter 625: lens 626: wiring group 660: light 3100: display portion 3125: light-emitting element 3130: pixel 3130B: pixel 3130C: pixel 3131: display area 3132: circuit 3133: circuit 3135: scan line 3136: signal line 3232: transistor 3233: capacitor 3431: transistor 3432: liquid crystal element 3434: transistor 3436: node 4000A: display panel 4000B: display panel 4001: substrate 4002: pixel portion 4003: signal line driver 4004: scan line driver 4005: sealant 4006: substrate 4008: liquid crystal layer 4010: transistor 4011: transistor 4012: semiconductor layer 4013: liquid crystal element 4014: wiring 4015: electrode 4017: electrode 4018: FPC 4018b: FPC 4019: anisotropic conductive layer 4020: capacitor 4021: electrode 4030: electrode layer 4031: electrode layer 4032: insulating layer 4033: insulating layer 4035: spacer 4103: insulating layer 4110: insulating layer 4111: insulating layer 4112: insulating layer 4510: bank 4511: light-emitting layer 4513: light-emitting element 4514: filler 7000: display device 7001: housing 7002: display portion 7003: supporting base 7100: portable information terminal 7101: housing 7102: display portion 7103: band 7104: buckle 7105: operation button 7106: input/output terminal 7107: icon 7200: PC 7221: housing 7222: display portion 7223: keyboard 7224: pointing device 7400: cellular phone 7401: housing 7402: display portion 7403: operation button 7404: external connection port 7405: speaker 7406: microphone 7600: video camera 7641: housing 7642: housing 7643: display portion 7644: operation key 7645: lens 7646: joint

The invention claimed is:

1. A semiconductor device comprising a decoder,
   wherein the decoder comprises a first circuit, a second circuit, a third circuit and a configuration memory,
   wherein the first circuit is configured to operate in synchronization with a clock signal,
   wherein the first circuit is configured to perform image processing,
   wherein a circuit configuration of the first circuit can be changed,
   wherein clock gating is performed on the first circuit when the circuit configuration of the first circuit is being changed,
   wherein the second circuit is configured to output the clock signal to the first circuit,
   wherein the second circuit is configured to perform clock gating,
   wherein the third circuit is configured to output a first signal to the first circuit,
   wherein the first circuit is configured to have a circuit configuration corresponding to a logic of the first signal,
   wherein the configuration memory is configured to retain configuration data,
   wherein the configuration memory is configured to generate a second signal corresponding to the configuration data, and
   wherein the second circuit performs clock gating for the number of clocks that is determined on the basis of a logic of the second signal.

2. The semiconductor device according to claim 1,
   wherein clock gating is performed on the first circuit to prevent the clock signal from being input to the first circuit.

3. The semiconductor device according to claim 1,
   wherein the first circuit comprises a programmable logic element, and
   wherein the programmable logic element comprises a flip-flop circuit.

4. A broadcasting system comprising:
   the semiconductor device according to claim 1; and
   a display device,
   wherein the semiconductor device is configured to receive a broadcasting signal and generate image data on the basis of the broadcasting signal, and
   wherein the display device is configured to display an image corresponding to the image data.

5. An electronic device comprising:
   the semiconductor device according to claim 1; and
   a display portion.

6. A semiconductor device comprising a decoder,
   wherein the decoder comprises a first circuit, a second circuit, a third circuit and first to m-th (m is a natural number) configuration memories,
   wherein the first circuit is configured to operate in synchronization with a clock signal,
   wherein the first circuit is configured to perform image processing,
   wherein a circuit configuration of the first circuit can be changed,
   wherein clock gating is performed on the first circuit when the circuit configuration of the first circuit is being changed,
   wherein the second circuit is configured to output the clock signal to the first circuit,
   wherein the second circuit is configured to perform clock gating, wherein the third circuit is configured to output a first signal to the first circuit,
wherein the first circuit is configured to have a circuit configuration corresponding to a logic of the first signal,
wherein the first to m-th configuration memories are configured to generate first to m-th output signals corresponding to configuration data retained in the respective first to m-th configuration memories,
wherein the second circuit is configured to generate binary integer data on the basis of logics of the first to m-th output signals, and
wherein the second circuit performs clock gating for an integer number of clocks.

7. The semiconductor device according to claim 6,
wherein clock gating is performed on the first circuit to prevent the clock signal from being input to the first circuit.

8. The semiconductor device according to claim 6,
wherein the first circuit comprises a programmable logic element, and
wherein the programmable logic element comprises a flip-flop circuit.

9. A broadcasting system comprising:
the semiconductor device according to claim 6; and
a display device,
wherein the semiconductor device is configured to receive a broadcasting signal and generate image data on the basis of the broadcasting signal, and
wherein the display device is configured to display an image corresponding to the image data.

10. An electronic device comprising:
the semiconductor device according to claim 6; and
a display portion.

* * * * *